United States Patent
Kazmaier et al.

(10) Patent No.: US 6,847,347 B1
(45) Date of Patent: Jan. 25, 2005

(54) ELECTROMAGNETOPHORETIC DISPLAY SYSTEM AND METHOD

(75) Inventors: Peter M. Kazmaier, Mississauga (CA); Hadi Mahabadi, Toronto (CA); Jaan Noolandi, Mississauga (CA); James Sharp, Burlington (CA); Francisco E. Torres, San Jose, CA (US)

(73) Assignee: Xerox Corporation, Stamford, CT (US)

( * ) Notice: Subject to any disclaimer, the term of this patent is extended or adjusted under 35 U.S.C. 154(b) by 422 days.

(21) Appl. No.: 09/643,670

(22) Filed: Aug. 17, 2000

(51) Int. Cl.[7] .................................................. G09G 3/34
(52) U.S. Cl. ........................... 345/107; 345/85; 345/86; 345/108
(58) Field of Search ........................... 345/107, 85, 86; 359/296

(56) References Cited

U.S. PATENT DOCUMENTS

| | | | |
|---|---|---|---|
| 2,326,634 A | 8/1943 | Gebhard et al. ............... 88/82 |
| 2,354,018 A | 7/1944 | Heltzer et al. ................. 88/82 |
| 2,354,048 A | 7/1944 | Palmquist .................... 40/135 |
| 2,354,049 A | 7/1944 | Palmquist .................... 40/135 |
| 2,407,680 A | 9/1946 | Palmquist et al. ............. 88/82 |
| 2,600,963 A | 6/1952 | Bland ............................ 49/58 |
| 2,684,788 A | 7/1954 | Bland ........................ 222/177 |
| 2,794,301 A | 6/1957 | Law et al. ..................... 49/84 |
| 2,950,985 A | 8/1960 | d'Adrian ..................... 117/33 |
| 2,965,921 A | 12/1960 | Bland ........................... 18/2.5 |
| 2,980,547 A | 4/1961 | d'Adrian ..................... 106/47 |
| 3,034,177 A | 5/1962 | Hooper ......................... 18/40 |
| 3,036,388 A | 5/1962 | Tate ............................. 35/66 |
| 3,063,388 A | 11/1962 | Magarian et al. ........... 105/376 |
| RE25,363 E | 4/1963 | Tate ............................. 35/66 |
| 3,150,947 A | 9/1964 | Bland ........................... 65/21 |
| 3,222,204 A | 12/1965 | Weber et al. ................. 117/27 |
| 3,243,273 A | 3/1966 | Bland ........................... 65/21 |
| 3,310,391 A | 3/1967 | Law .............................. 65/21 |
| 3,406,363 A | 10/1968 | Tate ............................ 335/302 |
| 3,594,065 A | 7/1971 | Marks ......................... 350/160 |
| 3,615,993 A | 10/1971 | French ........................ 156/155 |
| 3,617,333 A | 11/1971 | Brown ......................... 117/35 |
| 3,648,281 A | 3/1972 | Dahms et al. ............... 340/373 |
| 3,670,323 A * | 6/1972 | Sobel et al. ................. 345/107 |
| 3,795,435 A | 3/1974 | Schwab ...................... 350/105 |
| 3,915,771 A | 10/1975 | Gatzke et al. ................. 156/71 |
| 3,982,334 A | 9/1976 | Tate ............................. 35/66 |
| 4,001,140 A | 1/1977 | Foris et al. ................. 252/316 |
| 4,002,022 A | 1/1977 | Lopez ......................... 58/126 |
| 4,082,426 A | 4/1978 | Brown ........................ 350/105 |

(List continued on next page.)

FOREIGN PATENT DOCUMENTS

| | | |
|---|---|---|
| WO | WO 98/03896 | 1/1998 |
| WO | WO 98/41899 | 9/1998 |
| WO | WO 99/10767 | 3/1999 |

OTHER PUBLICATIONS

Gibbs, "The Reinvention of Paper," Scientific American: Technology and Business, Sep. 1998.
Mann, "Who will own your next good idea?" The Atlantic Monthly, Sep. 1998, vol. 282, pp. 57–82.
L.L. Lee, "A Magnetic–Particles Display," IEEE Transactions on Electron Devices, vol. ED–22, No. 9, Sep. 1975, pp. 758–765.

(List continued on next page.)

*Primary Examiner*—Kee M. Tung
*Assistant Examiner*—Tam Tran
(74) *Attorney, Agent, or Firm*—Finnegana, Henderson, Farabow, Garrett & Dunner, L.L.P.

(57) ABSTRACT

The present invention comprises an electromagnetophoretic ink material for use as electronic and magnetic display elements. In particular, the present invention relates to the preparation and use of microencapsulated aspect elements having both an electrostatic layer and a magnetic layer, and that can be addressed to produce a display aspect by the application of external electric fields and external magnetic fields.

20 Claims, 32 Drawing Sheets

U.S. PATENT DOCUMENTS

| | | | |
|---|---|---|---|
| RE29,742 E | 8/1978 | Tung | 2/412 |
| 4,117,192 A | 9/1978 | Jorgensen | 428/337 |
| 4,117,194 A | 9/1978 | Barbe et al. | 428/374 |
| 4,126,854 A | 11/1978 | Sheridon | 340/373 |
| 4,143,103 A | 3/1979 | Sheridon | 264/4 |
| 4,143,472 A | 3/1979 | Murata et al. | 35/66 |
| 4,229,732 A | 10/1980 | Hartstein et al. | 340/378.2 |
| 4,232,084 A | 11/1980 | Tate | 428/309 |
| 4,253,909 A | 3/1981 | Lee | 156/654 |
| 4,256,677 A | 3/1981 | Lee | 264/8 |
| 4,261,653 A | 4/1981 | Goodrich | 350/362 |
| 4,267,946 A | 5/1981 | Thatcher | 222/345 |
| 4,268,413 A | 5/1981 | Dabisch | 252/408 |
| 4,273,672 A | 6/1981 | Vassiliades | 252/316 |
| 4,283,438 A | 8/1981 | Lee | 427/47 |
| 4,288,788 A | 9/1981 | Rogers et al. | 340/378.2 |
| 4,299,880 A | 11/1981 | Arens | 428/304 |
| 4,367,920 A | 1/1983 | Tung et al. | 350/105 |
| 4,368,952 A | 1/1983 | Murata et al. | 350/362 |
| 4,374,889 A | 2/1983 | Arens | 428/207 |
| 4,381,616 A | 5/1983 | Saxer | 40/502 |
| 4,402,062 A | 8/1983 | Batchelder | 365/153 |
| 4,411,973 A | 10/1983 | Gilmour et al. | 430/7 |
| 4,417,543 A | 11/1983 | Lee | 118/620 |
| 4,418,098 A | 11/1983 | Maistrovich | 427/161 |
| 4,418,346 A | 11/1983 | Batchelder | 340/787 |
| 4,419,383 A | 12/1983 | Lee | 427/47 |
| 4,438,160 A | 3/1984 | Ishikawa et al. | 427/214 |
| 4,441,791 A | 4/1984 | Hornbeck | 350/360 |
| 4,457,723 A | 7/1984 | Tate | 434/409 |
| 4,492,435 A | 1/1985 | Banton et al. | 350/360 |
| 4,500,172 A | 2/1985 | Gagnon et al. | 350/331 R |
| 4,511,210 A | 4/1985 | Tung et al. | 350/105 |
| 4,532,608 A | 7/1985 | Wu | 365/127 |
| 4,569,857 A | 2/1986 | Tung et al. | 427/163 |
| 4,592,628 A | 6/1986 | Altman et al. | 350/486 |
| 4,627,689 A | 12/1986 | Asher | 350/362 |
| 4,632,517 A | 12/1986 | Asher | 350/362 |
| 4,675,476 A | 6/1987 | Kobayashi | 178/18 |
| 4,678,695 A | 7/1987 | Tung et al. | 428/120 |
| 4,688,900 A | 8/1987 | Doane et al. | 350/347 |
| 4,695,528 A | 9/1987 | Dabisch et al. | 430/290 |
| 4,701,024 A | 10/1987 | Kobayashi et al. | 350/331 |
| 4,710,732 A | 12/1987 | Hornbeck | 332/7.51 |
| 4,713,295 A | 12/1987 | Laroche | 428/406 |
| 4,721,649 A | 1/1988 | Belisle et al. | 428/325 |
| 4,725,494 A | 2/1988 | Belisle et al. | 428/325 |
| 4,729,687 A | 3/1988 | Arens | 401/198 |
| 4,740,266 A | 4/1988 | Wu | 156/633 |
| 4,781,789 A | 11/1988 | Wu | 156/633 |
| 4,781,790 A | 11/1988 | Wu | 156/633 |
| 4,783,236 A | 11/1988 | Wu | 156/633 |
| 4,795,243 A | 1/1989 | Suzuki | 350/362 |
| 4,795,528 A | 1/1989 | Wu | 156/633 |
| 4,810,431 A | 3/1989 | Leidner | 264/15 |
| 4,837,071 A | 6/1989 | Tagoku et al. | 428/195 |
| 4,877,253 A | 10/1989 | Arens | 273/240 |
| 4,890,902 A | 1/1990 | Doane et al. | 350/347 |
| 4,919,521 A | 4/1990 | Tada et al. | 350/362 |
| 4,931,019 A | 6/1990 | Park | 434/409 |
| 4,948,232 A | 8/1990 | Lange | 350/334 |
| 4,956,619 A | 9/1990 | Hornbeck | 330/4.3 |
| 4,991,941 A | 2/1991 | Kalmanash | 350/347 |
| 4,994,204 A | 2/1991 | Doane et al. | 252/299.01 |
| 5,006,422 A | 4/1991 | Sakurai et al. | 428/694 |
| 5,039,557 A | 8/1991 | White | 427/137 |
| 5,066,559 A | 11/1991 | Elmasry et al. | 430/111 |
| 5,075,186 A | 12/1991 | Sheridon | 430/47 |
| 5,128,203 A | 7/1992 | LaRoche | 428/325 |
| 5,131,736 A | 7/1992 | Alvarez | 359/886 |
| 5,151,032 A | 9/1992 | Igawa | 434/409 |
| 5,155,607 A | 10/1992 | Inoue et al. | 359/51 |
| 5,157,011 A | 10/1992 | Okabe et al. | 503/201 |
| 5,189,658 A | 2/1993 | Moses | 369/100 |
| 5,219,820 A | 6/1993 | Morohoshi et al. | 503/204 |
| 5,223,473 A | 6/1993 | Oliver et al. | 503/226 |
| 5,226,099 A | 7/1993 | Mignardi et al. | 385/19 |
| 5,233,459 A | 8/1993 | Bozler et al. | 359/230 |
| 5,249,000 A | 9/1993 | Okabe et al. | 346/151 |
| 5,251,048 A | 10/1993 | Doane et al. | 359/51 |
| 5,262,098 A | 11/1993 | Crowley et al. | 264/8 |
| 5,262,374 A | 11/1993 | Okabe et al. | 503/201 |
| 5,270,872 A | 12/1993 | Spry | 359/885 |
| 5,274,460 A | 12/1993 | Yamada et al. | 358/296 |
| 5,290,066 A | 3/1994 | Mody | 281/15.1 |
| 5,315,418 A | 5/1994 | Sprague et al. | 359/41 |
| 5,315,776 A | 5/1994 | Strawbridge et al. | 40/505 |
| 5,331,454 A | 7/1994 | Hornbeck | 359/224 |
| 5,344,594 A | 9/1994 | Sheridon | 264/4.1 |
| 5,351,995 A | 10/1994 | Booker | 283/117 |
| 5,354,598 A | 10/1994 | Arens | 428/195 |
| 5,363,222 A | 11/1994 | Ledebuhr | 359/40 |
| 5,383,008 A | 1/1995 | Sheridon | 355/256 |
| 5,384,067 A | 1/1995 | Doane et al. | 252/299.01 |
| 5,389,426 A | 2/1995 | Arens et al. | 428/195 |
| 5,389,945 A | 2/1995 | Sheridon | 345/85 |
| 5,397,503 A | 3/1995 | Yuasa et al. | 252/299.01 |
| 5,411,398 A | 5/1995 | Nakanishi et al. | 434/409 |
| 5,416,996 A | 5/1995 | Clemens et al. | 40/502 |
| 5,432,526 A | 7/1995 | Hyatt | 345/87 |
| 5,432,534 A | 7/1995 | Maruyama et al. | 347/172 |
| 5,459,602 A | 10/1995 | Sampsell | 359/234 |
| 5,469,020 A | 11/1995 | Herrick | 313/511 |
| 5,475,401 A | 12/1995 | Verrier et al. | 345/179 |
| 5,515,075 A | 5/1996 | Nakagiri et al. | 345/111 |
| 5,526,016 A | 6/1996 | Nakagiri et al. | 345/111 |
| 5,535,047 A | 7/1996 | Hornbeck | 359/295 |
| 5,582,700 A | 12/1996 | Bryning et al. | 204/450 |
| 5,604,027 A | 2/1997 | Sheridon | 428/323 |
| 5,627,562 A | 5/1997 | Skodlar | 345/111 |
| 5,659,330 A | 8/1997 | Sheridon | 345/84 |
| 5,667,924 A | 9/1997 | Ziolo | 430/39 |
| 5,703,671 A | 12/1997 | Narita et al. | 355/32 |
| 5,708,525 A | 1/1998 | Sheridon | 359/296 |
| 5,717,283 A | 2/1998 | Biegelsen et al. | 313/483 |
| 5,717,514 A | 2/1998 | Sheridon | 359/296 |
| 5,717,515 A | 2/1998 | Sheridon | 359/296 |
| 5,723,204 A | 3/1998 | Stefik | 428/206 |
| 5,724,064 A | 3/1998 | Stefik et al. | 345/105 |
| 5,731,792 A | 3/1998 | Sheridon | 345/84 |
| 5,737,115 A | 4/1998 | Mackinlay et al. | 359/296 |
| 5,739,801 A | 4/1998 | Sheridon | 345/84 |
| 5,739,946 A | 4/1998 | Iwanaga et al. | 359/296 |
| 5,751,268 A | 5/1998 | Sheridon | 345/107 |
| 5,754,332 A | 5/1998 | Crowley | 359/296 |
| 5,757,345 A | 5/1998 | Sheridon | 345/84 |
| 5,760,761 A | 6/1998 | Sheridon | 345/107 |
| 5,767,826 A | 6/1998 | Sherdon et al. | 345/84 |
| 5,777,782 A | 7/1998 | Sheridon | 359/296 |
| 5,784,189 A | 7/1998 | Bozler et al. | 359/254 |
| 5,808,593 A | 9/1998 | Sheridon | 345/84 |
| 5,808,783 A | 9/1998 | Crowley | 359/296 |
| 5,815,306 A | 9/1998 | Sheridon et al. | 359/296 |
| 5,821,624 A | 10/1998 | Pasch | 257/776 |
| 5,825,529 A | 10/1998 | Crowley | 359/296 |
| 5,828,441 A | 10/1998 | Narita et al. | 355/32 |
| 5,866,284 A | 2/1999 | Vincent | 430/37 |
| 5,869,929 A | 2/1999 | Eida et al. | 313/501 |
| 5,877,844 A | 3/1999 | Matsumoto | 355/35 |
| 5,891,479 A | 4/1999 | Sheridon | 425/8 |
| 5,892,497 A | 4/1999 | Robertson | 345/107 |

| | | | |
|---|---|---|---|
| 5,893,206 A | 4/1999 | Furlani et al. ............... 29/608 |
| 5,894,367 A | 4/1999 | Sheridon .................... 359/623 |
| 5,900,192 A | 5/1999 | Richley ......................... 264/8 |
| 5,900,858 A | 5/1999 | Richley ...................... 345/107 |
| 5,904,790 A | 5/1999 | Sheridon ..................... 156/83 |
| 5,906,743 A | 5/1999 | Cohen et al. ............ 210/502.1 |
| 5,914,805 A | 6/1999 | Crowley ..................... 359/296 |
| 5,917,646 A | 6/1999 | Sheridon .................... 359/296 |
| 5,919,409 A | 7/1999 | Sheridon ....................... 264/8 |
| 5,922,268 A | 7/1999 | Sheridon .................... 264/437 |
| 5,930,026 A | 7/1999 | Jacobson et al. .......... 359/296 |
| 5,940,054 A | 8/1999 | Harris .......................... 345/85 |
| 5,956,005 A | 9/1999 | Sheridon ..................... 345/84 |
| 5,961,804 A | 10/1999 | Jacobson et al. .......... 204/606 |
| 5,969,472 A | 10/1999 | Kisner ........................ 313/484 |
| 5,972,493 A | 10/1999 | Iwasaki et al. ............. 428/323 |
| 5,974,901 A | 11/1999 | Zborowski et al. ........ 73/865.5 |
| 5,975,680 A | 11/1999 | Wen et al. ..................... 347/43 |
| 5,976,428 A | 11/1999 | Richley ........................ 264/10 |
| 5,982,346 A | 11/1999 | Sheridon et al. ............ 345/85 |
| 5,986,629 A | 11/1999 | Smith et al. .................. 345/84 |
| 5,989,629 A | 11/1999 | Sacripante et al. .......... 427/180 |
| 6,014,116 A | 1/2000 | Haynes et al. ................. 345/1 |
| 6,014,247 A | 1/2000 | Winter et al. ............... 359/296 |
| 6,017,584 A | 1/2000 | Albert et al. ............. 427/213.3 |
| 6,034,807 A | 3/2000 | Little et al. .................. 359/227 |
| 6,038,059 A | 3/2000 | Silverman ................... 359/296 |
| 6,054,071 A | 4/2000 | Mikkelsen, Jr. ............ 264/1.36 |
| 6,054,809 A | 4/2000 | Haynes et al. .............. 313/505 |
| 6,055,091 A | 4/2000 | Sheridon et al. ............ 359/296 |
| 6,067,185 A | 5/2000 | Albert et al. ............... 359/296 |
| 6,072,621 A | 6/2000 | Kishi et al. ................. 359/296 |
| 6,097,531 A | 8/2000 | Sheridon .................... 359/296 |
| 6,110,538 A | 8/2000 | Sheridon .................... 427/457 |
| 6,118,419 A | 9/2000 | Smith et al. .................. 345/84 |
| 6,120,588 A | 9/2000 | Jacobson ................. 106/31.16 |
| 6,120,839 A | 9/2000 | Comiskey et al. ........ 427/213.3 |
| 6,122,094 A | 9/2000 | Silverman ................... 359/296 |
| 6,128,124 A | 10/2000 | Silverman ................... 359/296 |
| 6,130,773 A | 10/2000 | Jacobson et al. .......... 359/296 |
| 6,137,467 A | 10/2000 | Sheridon et al. ............ 345/107 |
| 6,147,791 A | 11/2000 | Sheridon .................... 359/296 |
| 6,162,321 A | 12/2000 | Silverman ................... 156/276 |
| 6,174,153 B1 | 1/2001 | Sheridon ....................... 425/3 |
| RE37,085 E | 3/2001 | Sheridon .................... 428/323 |
| 6,196,848 B1 | 3/2001 | Yamazaki ................... 434/409 |
| 6,197,228 B1 | 3/2001 | Sheridon .................... 264/1.36 |
| 6,211,998 B1 | 4/2001 | Sheridon .................... 359/296 |
| 6,222,513 B1 | 4/2001 | Howard et al. ............... 345/84 |
| 6,243,058 B1 | 6/2001 | Mikkelsen et al. ........... 345/84 |
| 6,251,329 B1 | 6/2001 | Sheridon .................... 264/427 |
| 6,262,707 B1 | 7/2001 | Sheridon .................... 345/111 |
| 6,383,619 B1 | 5/2002 | Engler et al. ............... 428/212 |
| 6,396,621 B1 | 5/2002 | Sheridon .................... 359/296 |
| 6,421,035 B1 | 7/2002 | Sheridon et al. .............. 345/85 |
| 6,428,868 B1 | 8/2002 | Sheridon et al. ........... 428/40.2 |
| 6,440,252 B1 | 8/2002 | Biegelsen et al. .......... 156/245 |
| 6,441,946 B1 | 8/2002 | Sheridon .................... 359/296 |
| 6,473,072 B1 | 10/2002 | Comiskey et al. .......... 345/173 |
| 6,480,322 B2 | 11/2002 | Engler et al. ............... 359/296 |
| 6,485,280 B1 | 11/2002 | Richley ......................... 425/8 |
| 6,487,002 B1 | 11/2002 | Biegelsen ................... 359/296 |
| 6,498,674 B1 | 12/2002 | Sheridon .................... 359/296 |
| 6,504,525 B1 | 1/2003 | Knights ...................... 345/107 |
| 6,518,948 B1 | 2/2003 | Berstis ....................... 345/107 |
| 6,521,145 B1 | 2/2003 | Engler et al. ............... 264/1.9 |
| 6,524,500 B2 | 2/2003 | Sheridon et al. ............. 264/1.7 |
| 6,531,997 B1 | 3/2003 | Gates et al. ................. 345/107 |
| 6,542,283 B1 | 4/2003 | Sheridon .................... 359/296 |
| 6,545,671 B1 | 4/2003 | Silverman ................... 345/179 |
| 6,549,327 B2 | 4/2003 | Foucher et al. ............. 359/296 |
| 6,556,470 B1 | 4/2003 | Vincent et al. .............. 365/151 |
| 6,559,820 B1 | 5/2003 | Mikkelsen, Jr. et al. ...... 345/84 |
| 6,570,700 B2 | 5/2003 | Engler et al. ............... 359/296 |
| 6,573,880 B1 | 6/2003 | Simoni et al. ................ 345/87 |
| 6,577,432 B2 | 6/2003 | Engler et al. ............... 359/296 |
| 6,588,131 B2 | 7/2003 | O'Connell, Jr. .............. 40/446 |
| 2002/0084539 A1 | 7/2002 | Sheridon et al. ................ 264/4 |
| 2002/0130831 A1 | 9/2002 | Engler et al. ............... 345/107 |
| 2002/0131148 A1 | 9/2002 | Engler et al. ............... 359/296 |
| 2002/0131149 A1 | 9/2002 | Engler et al. ............... 359/296 |
| 2002/0131150 A1 | 9/2002 | Engler et al. ............... 359/296 |
| 2002/0131151 A1 | 9/2002 | Engler et al. ............... 359/296 |
| 2002/0186197 A1 | 12/2002 | Biegelsen ................... 345/107 |
| 2002/0186450 A1 | 12/2002 | Foucher et al. ............. 359/296 |
| 2002/0186452 A1 | 12/2002 | Biegelsen ................... 359/296 |
| 2003/0046838 A1 | 3/2003 | O'Connell, Jr. .............. 40/452 |

OTHER PUBLICATIONS

L.L. Lee, "Fabrication of Magnetic Particles Displays," Proceeding of the S.I.D., vol. 18/3 & 4 1977, pp. 283–288.

"Xerox PARC and 3M to collaborate on electronic paper," Information Today, vol. 16, No. 8, Sep. 1999.

Mattis, "Screen Saviors," Business 2.0, Jul. 1999.

Comiskey et al., "An electrophoretic ink for all–printed reflective electronic displays," Nature, Jul. 16, 1998, vol. 394, pp. 253–255.

Klein, "Will the future be written in E–Ink?" The Wall Street Journal, Jan. 4, 2000.

Wisnieff, "Printing Screens," Nature, Jul. 16, 1998, vol. 394, Issue No. 6690, pp. 225 and 227.

* cited by examiner

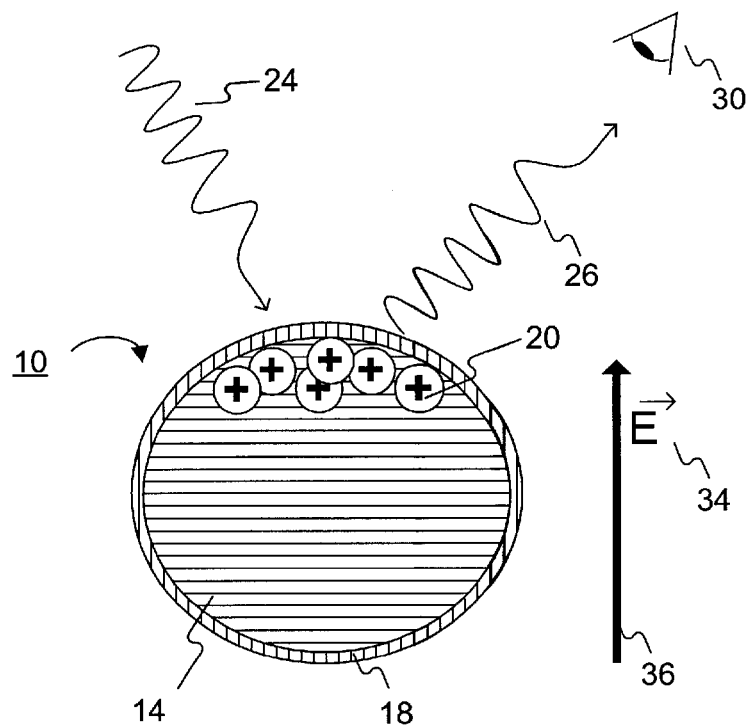
FIG. 4
(Prior Art)
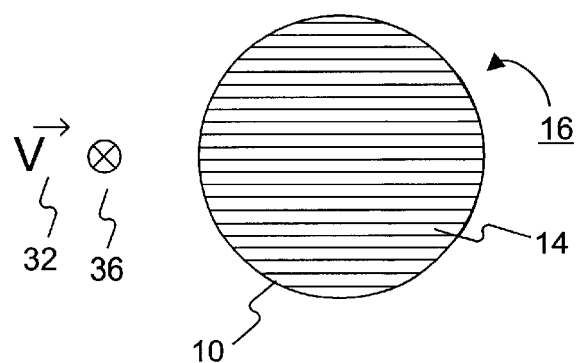
FIG. 5
(Prior Art)

ELECTROMAGNETOPHORETIC DISPLAY SYSTEM AND METHOD

RELATED APPLICATIONS

The following identified United States patent applications are relied upon and are fully incorporated herein by reference:

U.S. patent application entitled "System and method for rotatable element assembly and laminate substrate assembly," by David K. Biegelsen, Joseph, M. Crowley, and Alexander E. Silverman, filed on Dec. 17, 1999, and accorded Ser. No. 09/465,801.

U.S. patent application entitled "Rotating element sheet material with micro-structured substrate and method of use," by John Christopher Knights, filed on May 3, 2000, and accorded Ser. No. 09/563,504.

U.S. patent application entitled "Rotating element sheet material with generalized containment structure," by Nicholas K. Sheridon, filed on Apr. 14, 2000, and accorded Ser. No. 09/549,518.

U.S. patent application entitled "Rotating element sheet material with reversible highlighting," by Alexander E. Silverman, filed on Mar. 2, 2000, and accorded Ser. No. 09/517,522.

I. FIELD OF THE INVENTION

The present invention relates to the preparation and use of electromagnetophoretic ink for use as electronic and magnetic display elements. More particularly, the present invention relates to the preparation and use of microencapsulated aspect elements having both an electrostatic layer and a magnetic layer and that can be addressed to produce an aspect by the application of external electric fields and external magnetic fields.

II. BACKGROUND OF THE INVENTION

Display systems based upon the use of electrophoretic ink and magnetophoretic ink are a new category of display system that merge the attributes of conventional paper for conveying static images with the performance of conventional emissive displays for conveying dynamic images. In what follows, electrophoretic ink and magnetophoretic ink will be referred to collectively as "phoretic ink."

II.A. Introduction

Phoretic ink differs from conventional ink in that one "pigment" can present at least two aspects to an appropriately situated observer. This will be referred to as pigment branching. For example, the ability of a phoretic ink pigment to present two aspects will be referred to as two-valued pigment branching. The ability of a phoretic ink pigment to present three aspects will be referred to as three-valued pigment branching. Likewise, phoretic ink that has two-valued pigment branching capability will be referred to as two-valued phoretic ink. Similarly, phoretic ink that has three-valued pigment branching capability will be referred to as three-valued phoretic ink. The mechanics of pigment branching will be discussed in more detail below.

Because conventional ink has a one-to-one correspondence between pigment and color, (i.e., there is no pigment branching in conventional ink) the process of "addressing" conventional ink to produce an image consists in the precise placement of such pigments to specified points on a surface. For example, to "address" a conventional black and white image consisting of text and line drawings on a white surface, black pigment is applied to those points in the image designated as black, and is not applied to those points in the image designated as white. In contrast, and using the example of two-valued phoretic ink where one aspect is white and one aspect is black, the phoretic ink pigment is layered over the entire surface. The entire phoretic ink pigment may then be exposed to a first applied field in order to present a white aspect. Next, only those points on the surface designated as black may be exposed to a second applied field in order to present a black aspect. The method of addressing phoretic ink pigment, thus, is similar to the method of addressing conventional cathode ray tube displays, or conventional liquid crystal displays.

The mechanics of phoretic ink are based on the known phenomena of electrophoresis and magnetophoresis. Electrophoresis refers to the process of applying an electric field to charged elements within a medium such that the charged elements are translationally displaced. The medium is typically a solution and the lowest unit of electric charge is an electric monopole. Thus, translational motion of charged elements through a solution may be achieved by orienting an applied electric field vector parallel to the desired translational vector of the elements.

Magnetophoresis operates similar to electrophoresis with one qualification. That is, magnetophoresis refers to the process of applying a magnetic field to magnetically charged elements within a medium such that the magnetically charged elements are translationally displaced. The lowest unit of magnetic charge, however, is the magnetic dipole. Thus, the orientation of an applied magnetic field vector is not enough to cause translational displacement. Rather, it is the density of magnetic flux lines that determines whether translation occurs. Specifically, if a first region and a second region are situated such that magnetic flux lines converge in the direction of the first region from the second region, then a magnetic dipole will be translationally displaced in the direction of the first region from the second region. This is depicted in FIG. 1 and FIG. 2. In FIG. 1, vector field 32 is oriented in the direction of arrow 36. Also associated with vector field 32 and shown in FIG. 1 is a plurality of flux lines 66. Flux lines 66 are depicted as generally converging in the direction of second region 192 from first region 190. Therefore, the gradient field 46 of vector field 32 is oriented in the direction of arrow 48, which is the same direction as the direction of convergence of flux lines 66.

To further illustrate the significance of vector field versus a gradient field, FIG. 2 depicts vector field 32 oriented in the same direction as shown in FIG. 1. However, in FIG. 2, the flux lines converge in the direction of first region 190 from second region 192. Thus, the gradient field 46 of vector field 32 is in the direction shown by arrow 48. Therefore, even though vector field 32 has the same direction, FIGS. 1 and 2 depict gradient fields in different directions. FIG. 3 depicts the flux lines 66 associated with a magnetic field of a current loop 64, with a current 68 denoted by I. In FIG. 3, the magnetic flux lines 66 converge through the center of current loop 64. Therefore, the situation depicted in FIG. 1 may be achieved by placing current loop 64 coincident with second region 192. Furthermore, the situation depicted in FIG. 2 may be achieved by placing current loop 64 coincident with first region 190. As indicated in FIGS. 1 and 2, a measure of the convergence of magnetic flux lines is given by the gradient of a magnetic field:

$$\vec{\nabla} H \neq 0$$

Such a field H is an example of a gradient magnetic field. As generally used herein, "vector field" refers to a field whose amplitude in space is capable of having a magnitude and a direction. Vector fields of interest in the present invention include electric fields, magnetic fields, or electromagnetic fields. Furthermore, as used herein, "gradient field" refers to a vector field whose magnitude in a particular displacement direction is not uniform.

An element of two-valued phoretic ink as described, for example, in U.S. Pat. No. 5,930,026, herein incorporated by reference, is depicted in FIG. 4. The two-valued phoretic ink element 10 consists of a microencapsulated set of first aspect medium 14 and second aspect elements 20 within microencapsulation structure 18. The microencapsulation structure 18 can be chosen so as to be transparent to the incident electromagnetic energy of interest 24 and to the transmitted electromagnetic energy of interest 26 to observer 30. In addition, FIG. 4 corresponds to the use of an electric field 34 as the applied field, and corresponds to the use of visible light as the incident electromagnetic energy of interest 24 and the transmitted electromagnetic energy of interest 26 to observer 30. Although FIG. 4 depicts phoretic ink element 10 as spherically symmetric, it will be appreciated by one skilled in the art that phoretic ink element 10 may be of arbitrary shape. The diameter of phoretic ink element 10 may be of the order of magnitude of approximately 10 microns to 400 microns. "Diameter," as used herein, refers generally to an order of magnitude dimension corresponding to any of height, width, and depth of any microencapsulation structure or aspect elements. The use of "diameter" does not imply that circular or spherical geometry only is under consideration. The second aspect elements 20 in FIG. 4 are depicted as electrically charged particles. One skilled in the art will appreciate, however, that particles alone are not the only options for second aspect element 20. For example, second aspect element 20 could consist, for example, of a liquid drop with a high surface tension.

FIGS. 5 and 6 depict a perspective view of the top of phoretic ink element 10 in the presence of applied vector field 32. The symbol ⊗ indicates an arrow directed into the plane of the figure, and the symbol ⊙ indicates an arrow directed out of the plane of the figure. In FIG. 5, for applied vector field 32 directed into the plane of the figure indicated by arrow 36, observer 30 registers first aspect 16, corresponding to the view of first aspect medium 14. In this situation, all of second aspect elements 20 are translated away from the viewing aspect under the influence of applied field 32. In FIG. 6, for applied field 32 directed out of the plane of the figure indicated by arrow 36, observer 30 registers second aspect 22, corresponding to a view of second aspect elements 20. In this situation, all of second aspect elements 20 are translated towards the viewing aspect under the influence of applied field 32.

II.B. Branching Frequency and Aspect Stability

The branching frequency of a phoretic ink pigment can be defined as the inverse of the time elapsed between the viewing of first aspect 16 and second aspect 22 in the presence of applied field 32, where the applied field 32 may be awvector field or a gradient field. The formula for the branching frequency of electrophoretic ink element 10 of FIG. 4, is thus:

$$f = \frac{V \varepsilon \zeta}{6 \pi d^2 \eta}$$

where V is the potential difference associated with the electric field 34, $\eta$ is the viscosity of first aspect medium 14, $\varepsilon$ is the dielectric constant of first aspect medium 14, d is the displacement of second aspect elements 20, and $\zeta$ is the Zeta potential of the second aspect elements 20 within first aspect medium 14. The analog to the branching frequency for phoretic ink is the refresh rate for conventional emissive displays. Useful refresh rates for dynamic image viewing are in the range of 60 Hertz or higher. Based upon the above equation, branching frequencies that are in the 60 Hertz or higher range may be made by making d sufficiently small. Exemplary order-of-magnitude values for the above variables are: $\zeta$=600 millivolts; V=200 volts; $\eta$=10$^{-4}$ kilograms/(meter second); and $\varepsilon$=10$^{-13}$ (kilograms meter)/(second$^2$ volt$^2$).

Another useful property of phoretic ink is the ability to maintain a given aspect after the applied field for addressing is removed. This will be referred to as aspect stability. The mechanism for aspect stability in the above case is generally the energy associated with the attraction between the charged aspect elements 20 and microencapsulation structure 18, or "work function." A host of factors influence the magnitude of the energy associated with the work function including, but not limited to: surface tension of first aspect medium 14 in contact with second aspect element 20; the relative specific gravity of first aspect medium 14 to second aspect element 20; magnitude of charge on second aspect element 20; relative electronic permittivity of first aspect medium 14 and microencapsulation structure 18; "stickiness" of microencapsulation structure 18; and other residual fields that may be present. The applied field for addressing must be strong enough to overcome the work function in order to cause displacement; furthermore, the work function must be strong enough to maintain this aspect in the absence of an applied field for addressing. FIG. 7 depicts an exemplary diagram of the number of aspect elements displaced 54, N, as a function of applied field 32, V. The work function 52, $V_W$, corresponds to the magnitude of applied vector field 32 when the number of aspect elements displaced 54 has reached the saturation level 56, $N_S$, corresponding to the displacement of all aspect elements 20.

In FIG. 8, an element of two-valued phoretic ink 10 as disclosed, for example, in U.S. Pat. No. 5,411,398, herein incorporated by reference, and that corresponds to the use of a gradient magnetic field 38 is depicted. Again, the microencapsulation structure 18 is transparent to the incident electromagnetic energy of interest 24 and to the transmitted electromagnetic energy of interest 26. The second aspect elements 20 in FIG. 8 may be ferromagnetic particles such as magnetite $Fe_3O_4$. Again, one skilled in the art will appreciate that second aspect element 20 is not necessarily a solid. For example, second aspect element 20 in magnetophoretic ink element 10 may be a ferromagnetic liquid with a high surface tension. First aspect medium 14 is a non-magnetic liquid such as a mixture of isoparaffin solvent, titanium oxide, and nonionic surfactant, as disclosed, for example, in U.S. Pat. No. 5,151,032, herein incorporated by reference.

FIGS. 9 and 10 depict a perspective view of the top of phoretic ink element 10 in the presence of applied gradient field 46. Again, the symbol ⊗ indicates an arrow directed into the plane of the figure, and the symbol ⊙ indicates an arrow directed out of the plane of the figure. In FIG. 9, and in the presence of gradient magnetic field 46 directed to the bottom, as indicated by arrow 48, second aspect elements 20 translationally displace to the bottom of phoretic ink element 10 presenting first aspect 16. Conversely, in the presence of gradient magnetic field 46 directed to the top, as indicated by arrow 48 in FIG. 10, second aspect elements 20 translationally displace to the top of phoretic ink element 10 presenting second aspect 22 as indicated in FIG. 10.

The formula for the force exerted by a magnetic field $\vec{B}$ on a magnetic dipole $\vec{m}$ is $$\vec{F} = \vec{\Delta}(\vec{m} \cdot \vec{B})$$

Furthermore, where the gauge of the magnetic field is chosen to satisfy the condition $\vec{\Delta} \times \vec{B} = 0$, the above equation has the form:

$$\vec{F} = (\vec{m} \cdot \vec{\Delta})\vec{B}$$

The branching frequency in the case of magnetophoretic ink element 10 in FIGS. 9–10 is a function of medium viscosity, the size of the ferromagnetic element, and the magnitude of the gradient magnetic field 46. As disclosed, for example, in U.S. Pat. No. 5,411,398, hereinabove incorporated by reference, the larger the second aspect elements 20, the larger the branching frequency.

The mechanisms responsible for aspect stability in this case are the same as those cited above, with the exception that the second aspect elements 20 are not charged in this case. As has abeen disclosed in U.S. Pat. No. 4,536,428, herein incorporated by reference, when the specific gravity of second aspect elements 20 is lower than or equal to the specific gravity of the first aspect medium 14, the aspect stability is enhanced but branching frequency drops; contrariwise, when the specific gravity of the second aspect elements 20 is greater than the specific gravity of the first aspect medium 14, the branching frequency is enhanced while the aspect stability deteriorates. Accounting for the competing effects of aspect stability and branching frequency has been an issue in the construction of magnetophoretic ink elements. FIG. 11 depicts an exemplary diagram of the number of aspect elements displaced 54, N, as a function of applied field 46, $\vec{\Delta}$ V. The work function 53, $\vec{V} V_w$, corresponds to the magnitude of applied vector field 46 when the number of aspect elements displaced 54 has reached the saturation level 57, $N_s$, corresponding to the displacement of all aspect elements 20.

Another issue associated with magnetophoretic ink elements concerns the process of agglomeration. Because each of the second aspect elements 20 acts as a magnetic dipole, there is a tendency for the second aspect elements 20 to attract one another within the microencapsulated structure 18 to form one large element. The process of agglomeration, thus, affects branching frequency, aspect stability, as well as aspect resolution. Much of the work in the area of magnetophoretic ink elements has been the determination of optimal combinations of second aspect element 20, first aspect medium 14, and encapsulating structure 18 in order to balance competing effects, as above.

II.C. Phoretic ink With More Than two Aspects

Both phoretic ink element 10 depicted in FIGS. 4 and 8 are two-valued phoretic pigments. That is, each pigment can represent, at most, two aspects to a favorable situated observer, as depicted in FIGS. 5–6 and FIGS. 9–10. In order to generalize such a system to include more than two aspects on a macroscopic scale, there have been three options. Each of these options is considered in turn below.

II.C.1. First Option for Displaying More Than two Aspects

One option is to precisely correlate the position of a set of two-valued phoretic pigments with the addressing mechanism on a sub-pixel level. This is depicted in FIG. 12. There is first two-valued phoretic ink element 72, second two-valued phoretic ink element 74, and third two-valued phoretic ink element 76. A cross section of first two-valued phoretic ink element 72 and applied field 92 is depicted in FIG. 13. Similarly, a cross section of second two-valued phoretic ink element 74 and applied field 94 is depicted in FIG. 14. Further still, a cross section of third two-valued phoretic ink element 76 and applied field 96 is depicted in FIG. 15.

For purposes of illustration, first aspect medium 14 of the two-valued phoretic pigments of FIGS. 13–15 may be chosen so as to present a white-colored aspect to a favorably situated observer; meanwhile, second aspect element 120 of first two-valued phoretic pigment 72 may be chosen so as to present a yellow-colored aspect, third aspect element 130 of second two-valued phoretic pigment 74 may be chosen so as to present a cyan-colored aspect, and fourth aspect element 140 of third two-valued phoretic pigment 76 may be chosen so as to present a magenta-colored aspect. FIG. 12 also depicts first addressing region 82, second addressing region 84, and third addressing region 86. The basis for the addressing in this configuration is the location of the appropriate phoretic pigment within the appropriate addressing region.

In much the same way that conventional ink is addressed, first two-valued phoretic pigment 72, second two-valued phoretic pigment 74, and third two-valued phoretic pigment 76 are spatially applied as to be located only in first addressing region 82, second addressing region 84, and third addressing region 86, respectively. This array is microscopically repeated within each pixel 90. FIG. 12 depicts pixel 90 as triangular in shape. However, one skilled in the art will appreciate that pixel 90 may be in any shape, for example, rectangular. On a macroscopic level, therefore, the first addressing region 82, second addressing region 84, and third addressing region 86 may be manipulated by addressing means (not shown) to produce any three-color image possible.

The advantage of this technique is the ease with which two-valued phoretic inks with different aspects can be created. However, the disadvantage is the precise level of correlation between first addressing region 82, second addressing region 84, and third addressing region 86 and the placement of first two-valued phoretic pigment 72, second two-valued phoretic pigment 74, and third two-valued phoretic pigment 76 that is necessary in order for the display to function. In addition, there is a resulting loss in resolution due to the fact that a given pixel 90 area is at least three times the smallest addressing region, not including the buffer zone necessary to avoid cross-addressing problems.

An even more serious disadvantage of this technique has to do with limitations of reflective (as opposed to emissive displays). If one were to display a cyan color, then the two valued phoretic pigment for cyan would be turned on and all others turned off (white for example). In this mode, only one out of three pixels is reflecting red while two out of three are reflecting white. This leads to a very faint red color and a device of this type is disadvantaged with regards to an emissive display.

II.C.2. Second Option for Displaying More Than two Aspects

A second option for achieving a display with more than two aspects on a macroscopic scale is to mix together in one solution three different pigments, for example. This is depicted in FIG. 16, showing such a mixture applied within pixel 90. In this depiction, addressing region 88 may address any of the first two-valued phoretic pigment 72, second two-valued phoretic pigment 74, or third two-valued phoretic pigment 76.

The manner of addressing this type of composite phoretic ink pigment tends to be more complex. Specifically, one needs to be able to discriminate among the three different types of phoretic ink elements for addressing purposes. If we consider the process of electrophoresis, one manner in which this is accomplished is to use a different magnitude charge on each of the aspect elements. However, any manner of altering the work function associated with each of the phoretic ink elements will work. An exemplary graph of three work functions arranged step-like is depicted in FIG. 17. The lower threshold 102, $V_W^Y$, represents the threshold necessary to address the saturation number 112, $N_S^Y$, of the second aspect elements 120; the middle threshold 104, $V_W^C$, represents the threshold necessary to address both the saturation number 112, $N_S^Y$, of second aspect elements 120 and the saturation number 114, $N_S^C$, of third aspect elements 130; the highest threshold 106 represents the amount of energy necessary to address all of the saturation number 112, $N_S^Y$, of second aspect elements 120, the saturation number 114, $N_S^C$ of third aspect elements 130, and the saturation number 116, $N_S^M$, of fourth aspect elements 140.

The process of selectively addressing one of the three elements is, in general, a two-step process. Both third aspect elements 130 and fourth aspect elements 140 require two steps in order to be selectively displaced. The elements that may be addressed in one step only are second aspect elements 120.

For phoretic ink element 72 of FIG. 13 within a composite pigment as depicted in FIG. 16, the magnitude of applied field 92 that will displace second aspect elements 120 is lower than threshold 102 of FIG. 17. As long as the magnitude of the applied field is less than middle threshold 104 of FIG. 17, then neither third aspect elements 130 of FIG. 14 nor fourth aspect elements 140 of FIG. 15 will be displaced to a viewing aspect in FIG. 16.

Proceeding to phoretic ink element 74 of FIG. 14 within a composite pigment as depicted in FIG. 16, the magnitude of applied field 94 that will displace third aspect elements 130 and second aspect elements 120 is middle threshold 104 of FIG. 17. As long as the magnitude of the applied field is less than higher threshold 106 of FIG. 17, then fourth aspect elements 140 of FIG. 15 will not be displaced. In order to cause second aspect elements 120 of FIG. 13 to displace away from a viewing aspect in FIG. 16, a second step is required. The second step consists of directing a second applied field into the plane of FIG. 16 at lower threshold 102 of FIG. 17. Such a second step will leave third aspect elements 130 in a viewing aspect, and will displace second aspect elements 120 away from a viewing aspect.

Finally, for phoretic ink element 76 of FIG. 15 within a composite pigment as depicted in FIG. 16, the magnitude of applied field 96 that will displace fourth aspect elements 140, third aspect elements 130 of FIG. 14, and second aspect elements 120 of FIG. 13 is highest threshold 106 of FIG. 17. Again, in order to cause third aspect elements 130 of FIG. 14 and second aspect elements 120 of FIG. 13 to displace away from a viewing aspect in FIG. 16, a second step is required. The second step consists of directing a second applied field into the plane of FIG. 16 at middle threshold 104 of FIG. 17. Such a second step will leave fourth aspect elements 140 in a viewing aspect, and will displace third aspect elements 130 and second aspect elements 120 away from a viewing aspect.

Such a multi-threshold addressing scheme has been disclosed, for example, in U.S. Pat. No. 5,739,801, herein incorporated by reference. In U.S. Pat. No. 5,739,801, the application was to a twisting ball display; however, the basic problem of selectively addressing display elements that respond to different magnitude vector fields is identical to that of addressing a four-valued phoretic pigment.

The disadvantages associated with this type of four-valued aspect system include the lack of resolution again. Specifically, even though each addressing region 88 may address any of the three aspects, yellow, cyan, or magenta, the statistical distribution of elements (⅓) keeps the resolution low, and thus, the colors are not as richly saturated across the entire display 60 as they would be in the third option considered below.

II.C.3. Third Option for Displaying More Than two Aspects

The final option available in order to produce more than a two-aspect display on a macroscopic scale is to create higher-valued phoretic ink, such as four-valued phoretic ink. An element of four-valued phoretic ink is depicted in FIG. 18. Suitable examples are disclosed, for example, in U.S. Pat. No. 6,017,584, herein incorporated by reference. In FIG. 18, the applied field used for addressing is an electric field. Within four-valued phoretic ink element 78 is first aspect medium 14, second aspect elements 120, and third aspect elements 130, and fourth aspect elements 140. The addressing means for this type of phoretic ink element is the same type of multi-threshold scheme described above. Again, second aspect element 120, third aspect element 130, and fourth aspect element 140 are all discriminated upon, for addressing purposes, by some manner of increasing the work function for each one individually. For instance, in the exemplary four-valued phoretic ink element depicted in FIG. 18, it can be the magnitude of the charge that allows for addressing discrimination between the three aspect elements.

Again, the process of selectively addressing one of the three elements is, in general, a two-step process. Both third aspect elements 130 and fourth aspect elements 140 of FIG. 18 require two steps in order to be selectively displaced. The elements that may be addressed in one step only are second aspect elements 120.

As before, an exemplary graph of three work functions arranged step-like is depicted in FIG. 17. The lower threshold 102, $V_W^Y$, represents the threshold necessary to address the saturation number 112, $N_S^Y$, of the second aspect elements 120; the middle threshold 104, $V_W^C$, represents the threshold necessary to address both the saturation number 112, $N_S^Y$, of second aspect elements 120 and the saturation number 114, $N_S^C$, of third aspect elements 130; the highest threshold 106 represents the amount of energy necessary to address all of the saturation number 112, $N_S^Y$, of second aspect elements 120, the saturation number 114, $N_S^C$ of third aspect elements 130, and the saturation number 116, $N_S^M$, of fourth aspect elements 140.

For phoretic ink element 78 of FIG. 18, the magnitude of applied field 92 will displace second aspect elements 120 when it is at lower threshold 102 of FIG. 17. As long as the magnitude of the applied field is less than middle threshold 104 of FIG. 17, then neither third aspect elements 130 nor fourth aspect elements 140 will be displaced to the top of phoretic ink element 78.

The magnitude of applied field 92 will displace third aspect elements 130 and second aspect elements 120 of FIG. 18 when it is at middle threshold 104 of FIG. 17. As long as the magnitude of the applied field is less than higher threshold 106 of FIG. 17, then fourth aspect elements 140 will not be displaced. In order to cause second aspect elements 120 to displace away from the top of phoretic ink element 78, a second step is required. The second step consists of directing a second applied field towards the bottom of phoretic ink element 78 at lower threshold 102 of FIG. 17. Such a second step will leave third aspect elements 130 at the top of phoretic ink element 78, and will displace second aspect elements 120 towards the bottom of phoretic ink element 78.

Finally, the magnitude of applied field 92 in FIG. 18 will displace fourth aspect elements 140, third aspect elements 130, and second aspect elements 120 when it is at highest threshold 106 of FIG. 17. Again, in order to cause third aspect elements 130 and second aspect elements 120 to displace away from the top of phoretic ink element 78, a second step is required. The second step consists of directing a second applied field towards the bottom of phoretic ink element 78 at middle threshold 104 of FIG. 17. Such a second step will leave fourth aspect elements 140 at the top of phoretic ink element 78, and will displace third aspect elements 130 and second aspect elements 120 towards the bottom of phoretic ink element 78.

A display 60 based upon the use of phoretic ink element 78 is depicted in FIG. 19. Phoretic ink elements 78 depicted in pixel 90 are addressed in FIG. 19 to present the aspect associated with fourth aspect elements 140. Unlike the previously described displays, display 60 of FIG. 19 using phoretic ink elements 78 is capable of presenting a saturated aspect to favorably situated observer 30.

One skilled in the art will appreciate that phoretic ink element 78, from a macroscopic perspective, may present more than four aspects, since there is an admixture of aspect elements that it is also possible to address. For example, by applying the middle threshold, both the second aspect elements 120 and the third aspect elements 130 are translationally displaced to the top of the phoretic ink element 78. If second aspect elements 120 are yellow-colored, and third aspect elements are cyan-colored, then applying the middle threshold will produce a green-colored aspect to a favorable situated observer. Thus, in addition to presenting a cyan-colored aspect, a yellow-colored aspect, and a magenta-colored aspect, phoretic ink element 78 may present a green-colored aspect to observer 30. Other combinations are also possible.

In light of the foregoing, it remains desirable to fabricate a phoretic ink element that exhibits three-valued pigment branching, or higher-valued pigment branching, and that incorporates a relatively simple addressing scheme in order to produce a rich hue.

III. SUMMARY OF INVENTION

Accordingly, in a first embodiment of the present invention, electromagnetophoretic ink elements consist of a microencapsulation structure containing a first aspect medium and second aspect elements, where the second aspect elements are comprised of both a vector field addressable component and a gradient field addressable component.

In a second embodiment of the present invention, electromagnetophoretic ink elements consist of a microencapsulation structure containing a first aspect medium, second aspect elements, and third aspect elements, where the third aspect elements are comprised of a vector field addressable component, and the second aspect elements are comprised of both a vector field addressable component and a gradient field addressable component.

In a third embodiment of the present invention, electromagnetophoretic ink elements consist of a microencapsulation structure containing a first aspect medium, second aspect elements, and third aspect elements, where both the third aspect elements and second aspect elements are comprised of both a vector field addressable component and a gradient field addressable component.

In a fourth embodiment of the present invention, electromagnetophoretic ink elements consist of a microencapsulation structure containing a first aspect medium, second aspect elements, third aspect elements, and fourth aspect elements, where the fourth aspect elements are comprised of a vector field addressable component, and the third aspect elements and second aspect elements are comprised of both a vector field addressable component and a gradient field addressable component.

In a fifth embodiment of the present invention, electromagnetophoretic ink elements consist of a microencapsulation structure containing a first aspect medium, second aspect elements, third aspect elements, and fourth aspect elements, where all of the fourth aspect elements, third aspect elements, and second aspect elements are comprised of both a vector field addressable component and a gradient field addressable component.

In a first embodiment of a method for addressing consistent with the present invention, an addressing method for addressing electromagnetophoretic ink elements with second aspect elements comprising both vector field addressable and gradient field addressable components comprises applying, in a single step, a combination of a vector field and a gradient field.

In a second embodiment of a method for addressing consistent with the present invention, an addressing method for addressing electromagnetophoretic ink elements with second aspect elements containing both vector field addressable and gradient field addressable components, and third aspect elements containing vector field addressable components comprises applying, in a single step, a combination of a vector field and a gradient field.

In a third embodiment of a method for addressing consistent with the present invention, an addressing method for addressing electromagnetophoretic ink elements with second aspect elements and third aspect elements containing both vector field addressable and gradient field addressable components comprises applying, in a single step, a combination of a vector field and a gradient field.

In a fourth embodiment of a method for addressing consistent with the present invention, an addressing method for addressing electromagnetophoretic ink elements with second aspect elements and third aspect elements containing both vector field addressable and gradient field addressable components, and fourth aspect elements containing vector field addressable components comprises applying, in either a single step or in a two step process, a combination of a vector field and a gradient field.

Further still, in a fifth embodiment of a method for addressing consistent with the present invention, an addressing method for addressing electromagnetophoretic ink elements with second aspect elements, third aspect elements, and fourth aspect elements containing both vector field addressable and gradient field addressable components comprises applying, in either a single step or in a two step process, a combination of a vector field and a gradient field.

IV. BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings, FIG. 1 depicts a vector field where the gradient of the vector field is parallel to the vector field.

FIG. 4 is a phoretic ink element of the prior art in cross section view.

FIG. 5 is a perspective view of first aspect and applied field of the phoretic ink element of FIG. 4.

V. DETAILED DESCRIPTION

Figure 1:
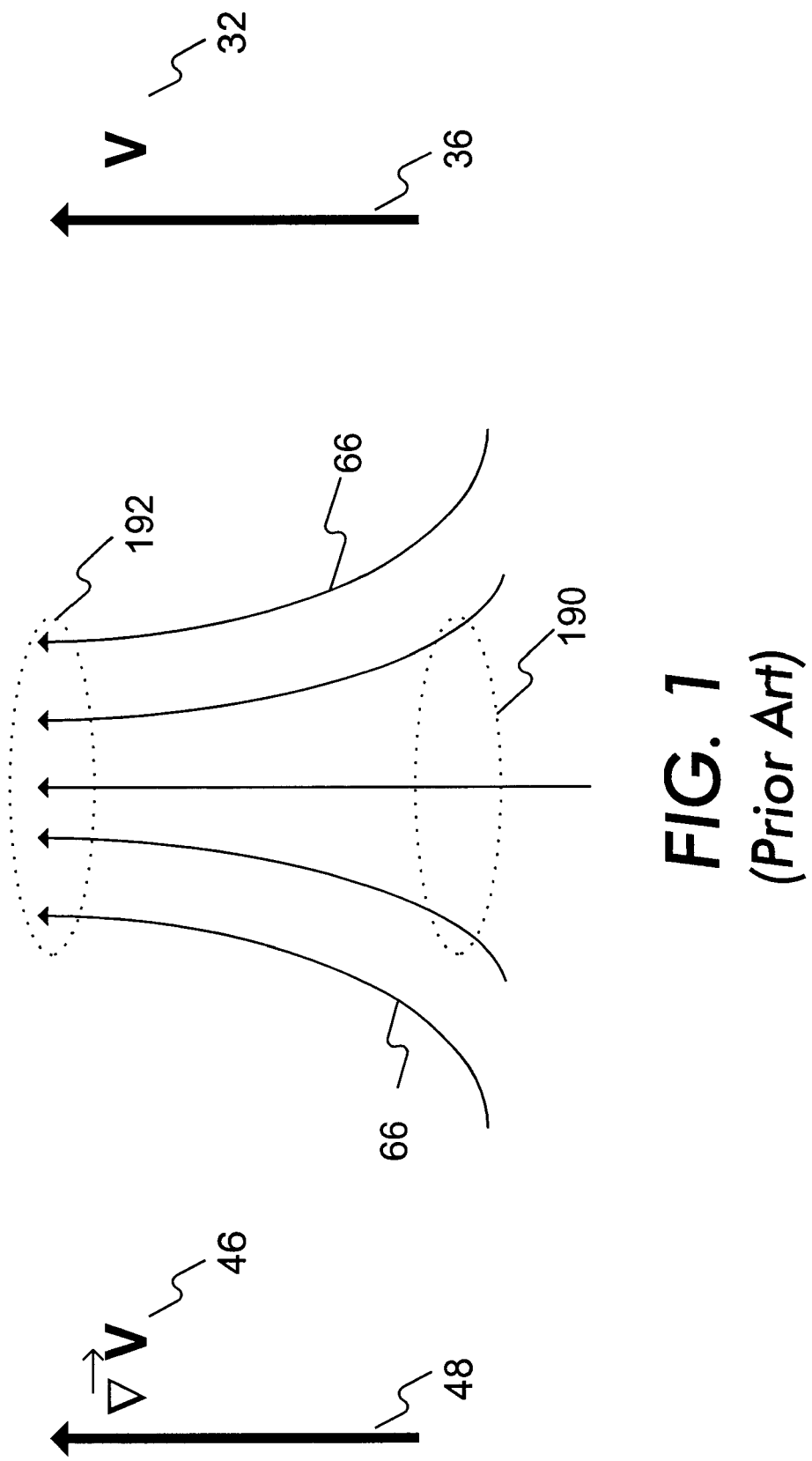
Figure 2:
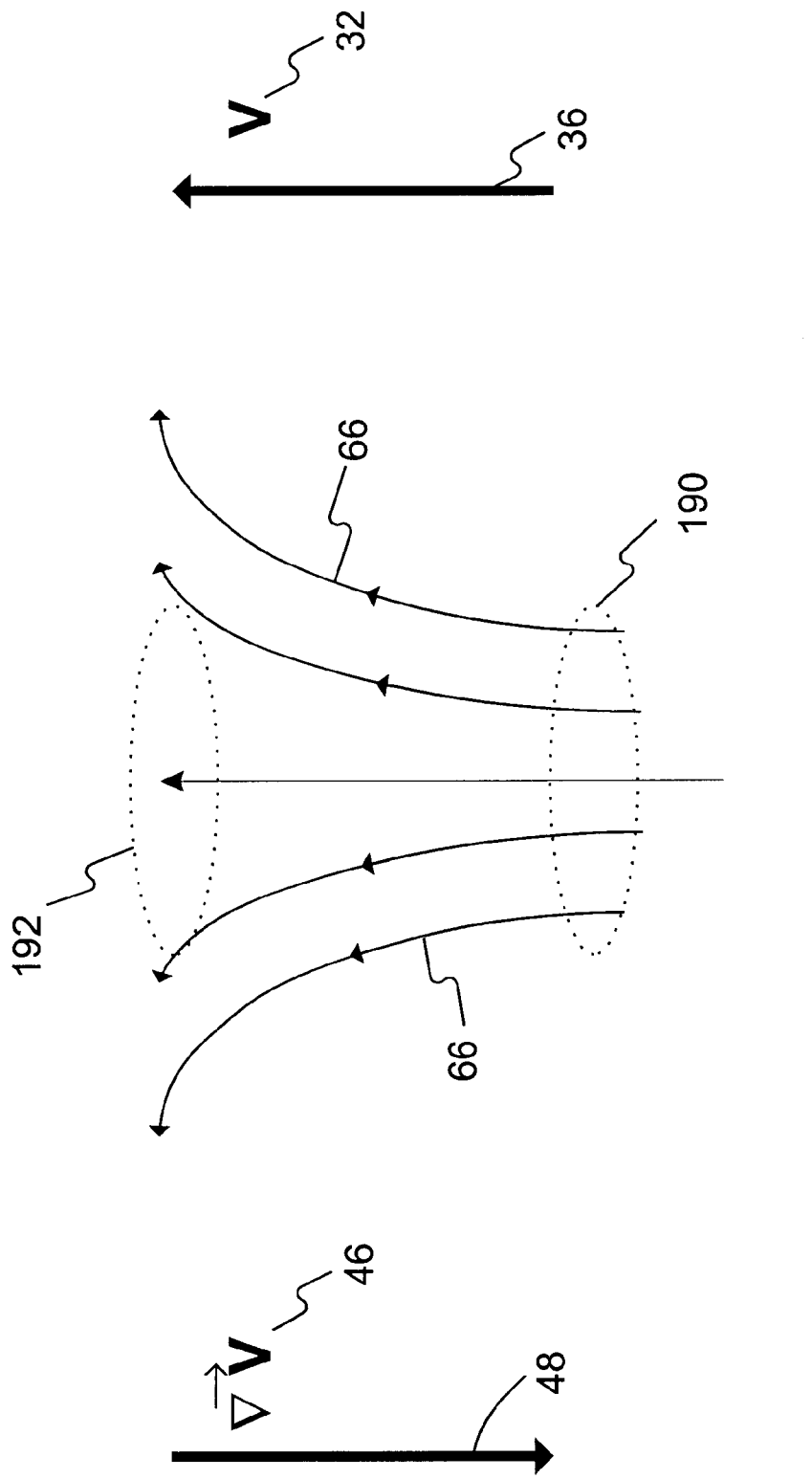
FIG. 2 depicts a vector field where the gradient of the vector field is antiparallel to the vector field.
Figure 3:
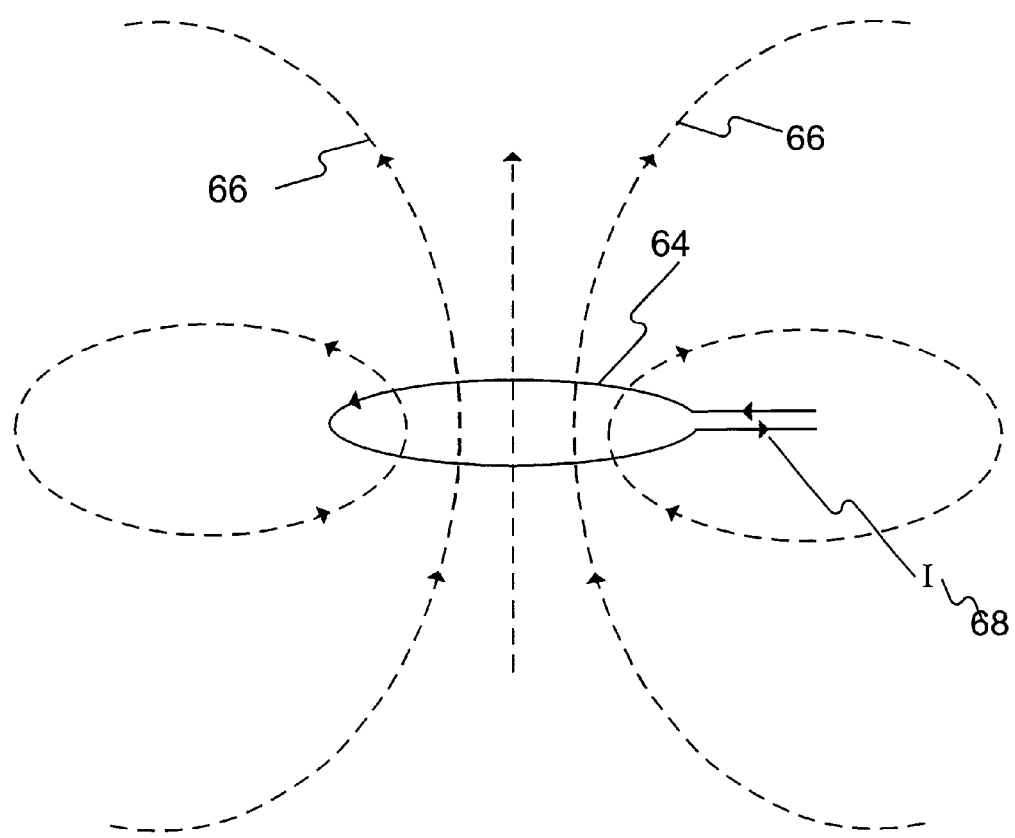
FIG. 3 depicts a current loop for generating a vector field where the gradient may be parallel or antiparallel to the vector field.
Figure 6:
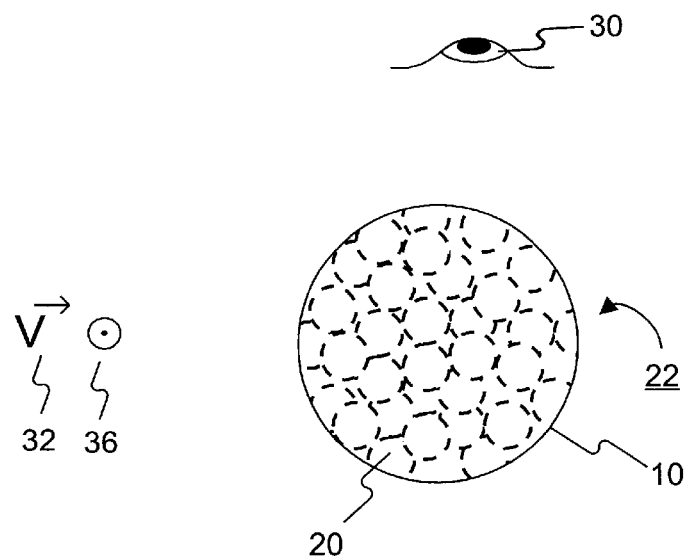
FIG. 6 is a perspective view of second aspect and applied field of the phoretic ink element of FIG. 4.
Figure 7:
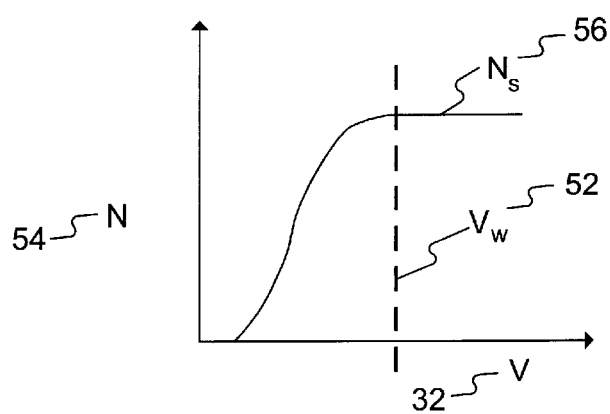
FIG. 7 depicts an exemplary graph of the number of aspect elements displaced as a function of applied field of the prior art, displaying work function and saturation number.
Figure 8:
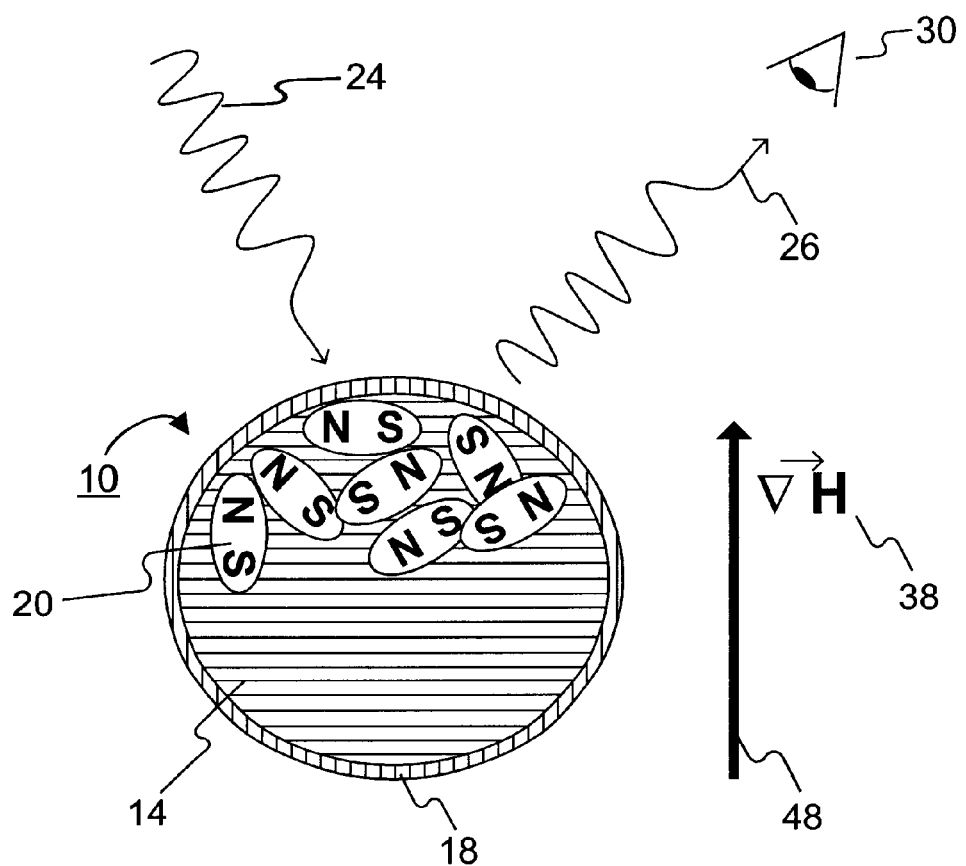
FIG. 8 is a magnetophoretic ink element of the prior art in cross-section view.
Figure 9:
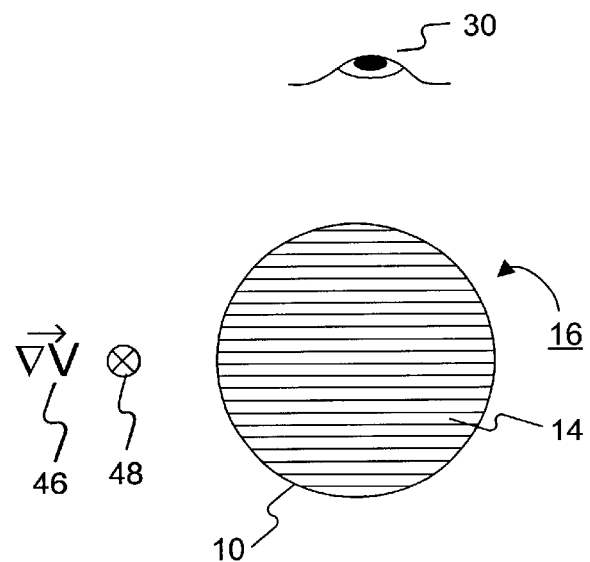
FIG. 9 is a perspective view of first aspect and applied field of the phoretic ink element of FIG. 8.
Figure 10:
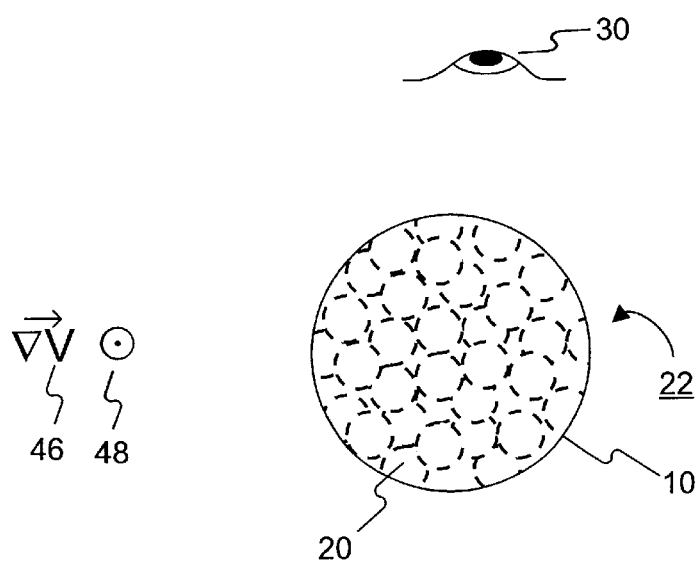
FIG. 10 is a perspective view of second aspect and applied field of the phoretic ink element of FIG. 8.
Figure 11:
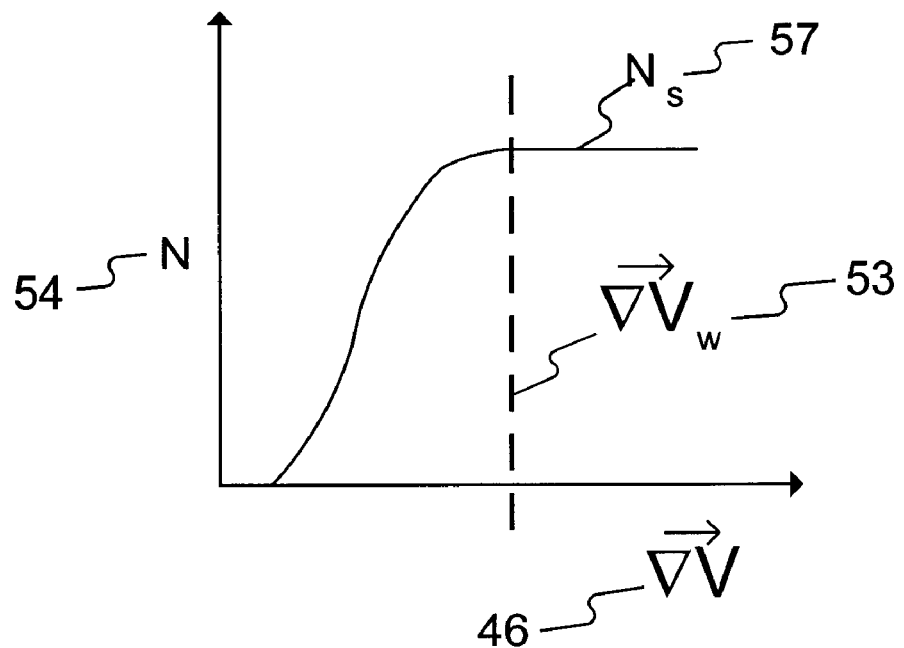
FIG. 11 depicts an exemplary graph of the number of aspect elements displaced as a function of applied field of the prior art, displaying work function and saturation number for the phoretic ink element of FIG. 8.
Figure 12:
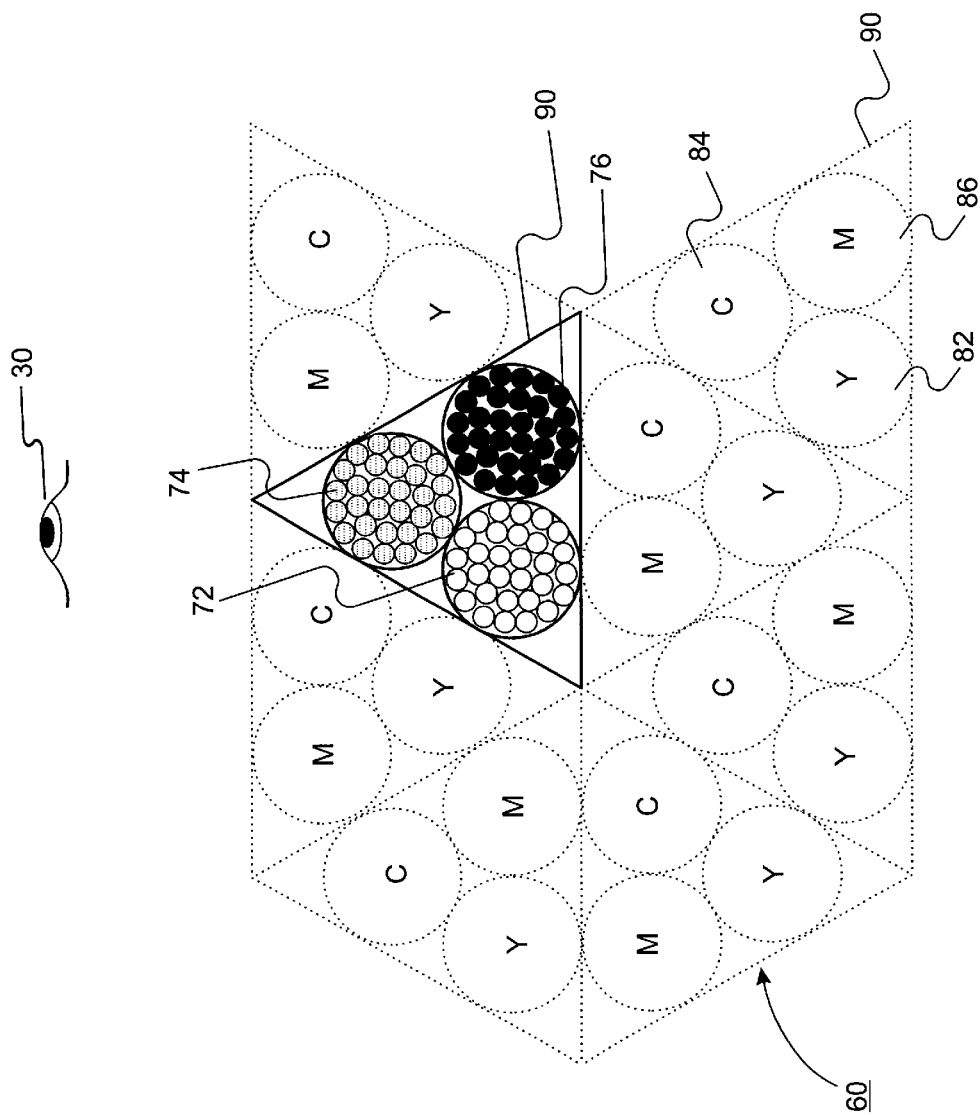
FIG. 12 is a perspective view of a first display array based on two-valued phoretic ink elements of three different aspects of the prior art, where the two-valued phoretic ink elements are applied to precise regions.
Figure 13:
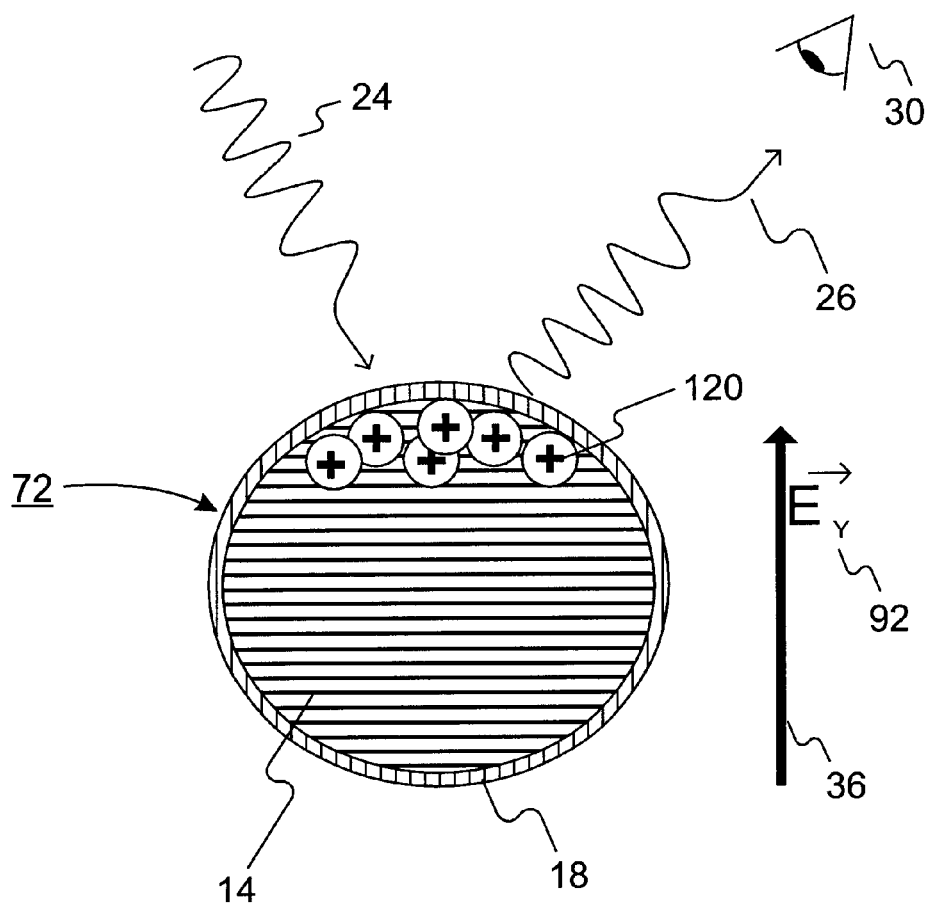
FIG. 13 is a cross section view of first phoretic ink element of FIG. 12.
Figure 14:
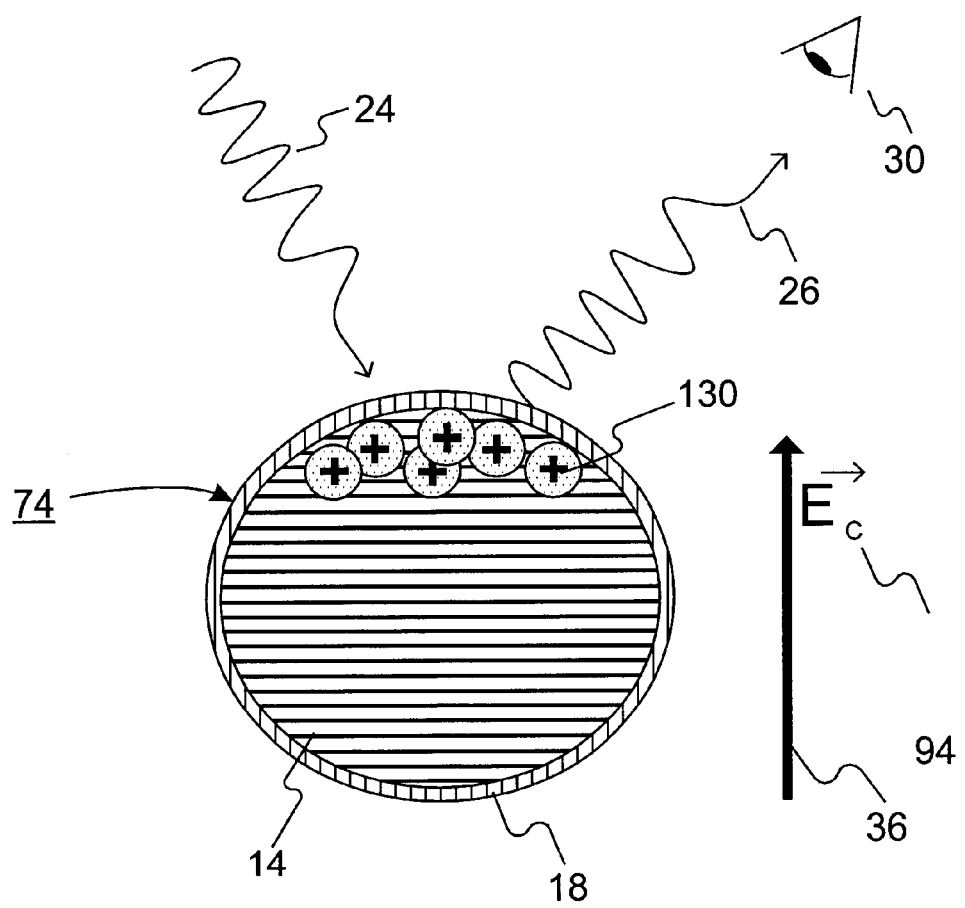
FIG. 14 is a cross section view of second phoretic ink element of FIG. 12.
Figure 15:
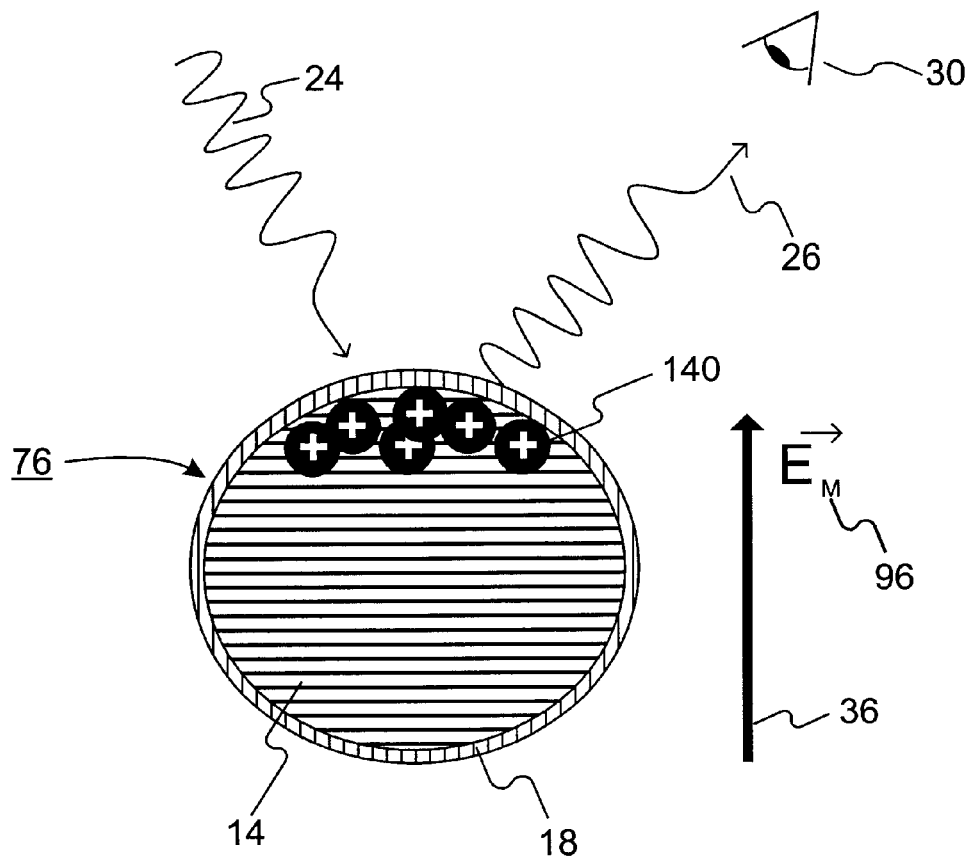
FIG. 15 is a cross section view of third phoretic ink element of FIG. 12.
Figure 16:
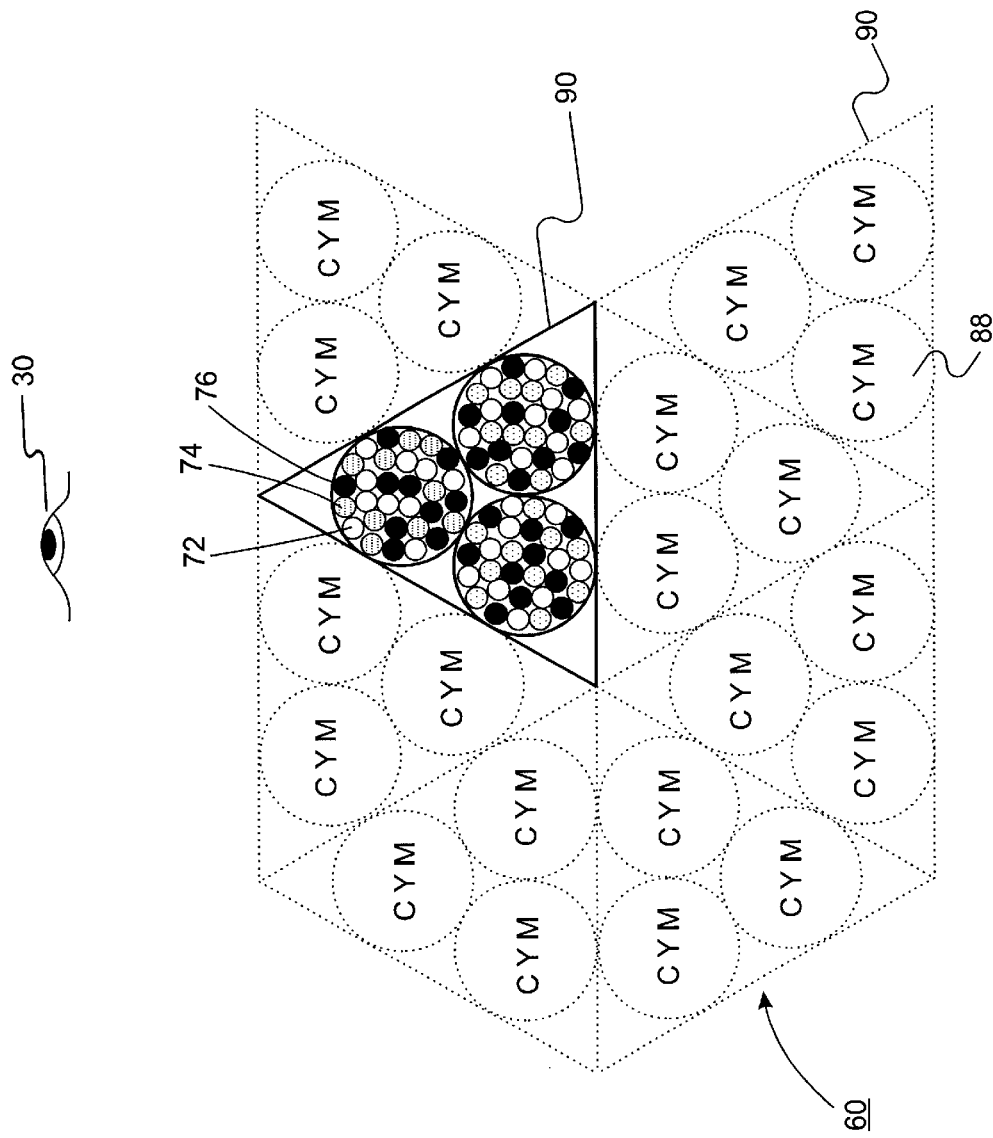
FIG. 16 is a perspective view of a second display array based on two-valued phoretic ink elements of three different aspects of FIGS. 13–15, where the two-valued phoretic ink elements are mixed together into a composite pigment.
Figure 17:
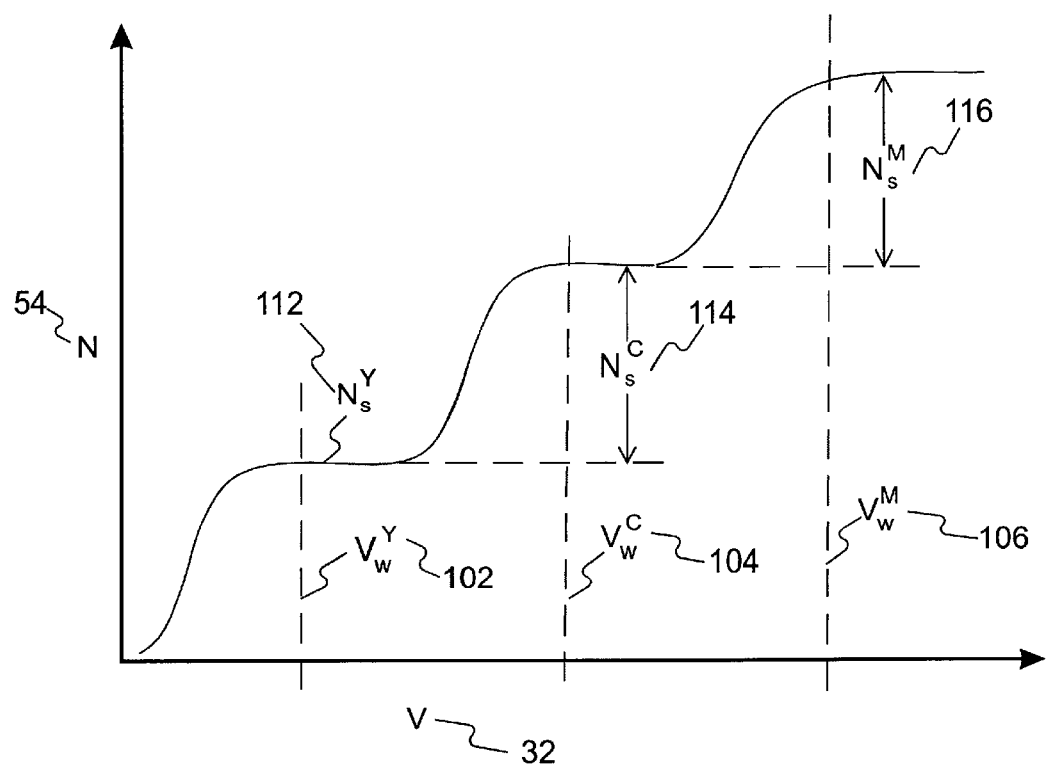
FIG. 17 depicts an exemplary graph of the number of aspect elements displaced as a function of applied field, displaying work function and saturation numbers for a four-valued ink of FIG. 16, or for four-valued phoretic ink of FIG. 18.
Figure 18:
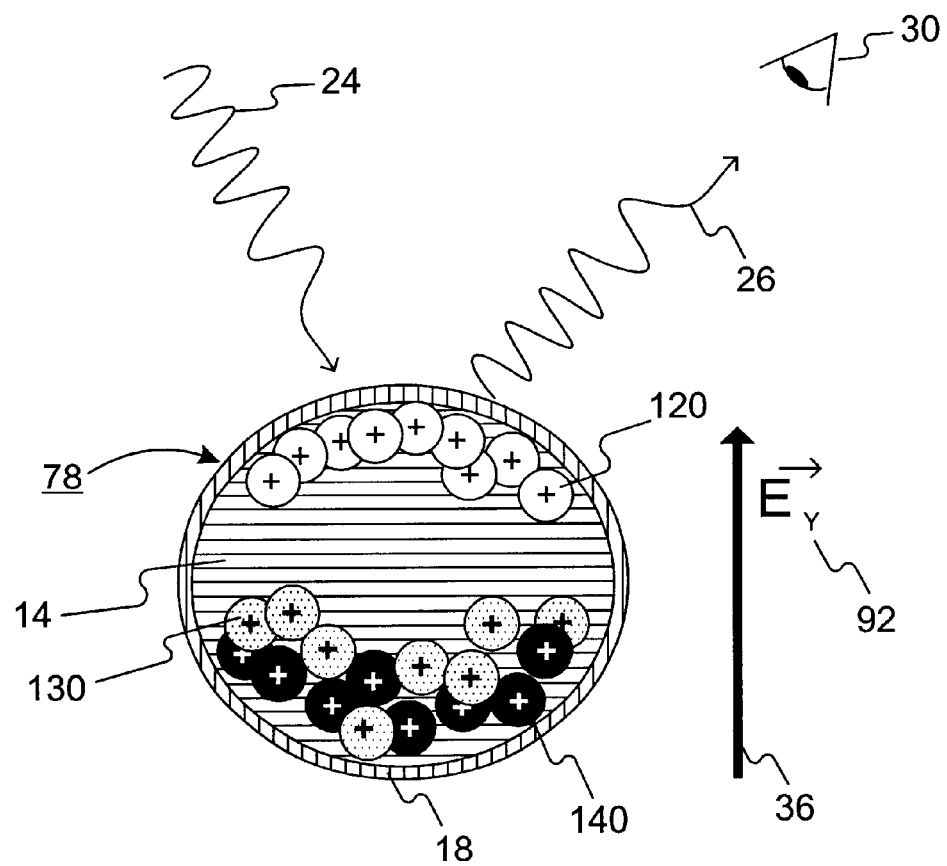
FIG. 18 is a cross section view of a four-valued phoretic ink element of the prior art.
Figure 19:
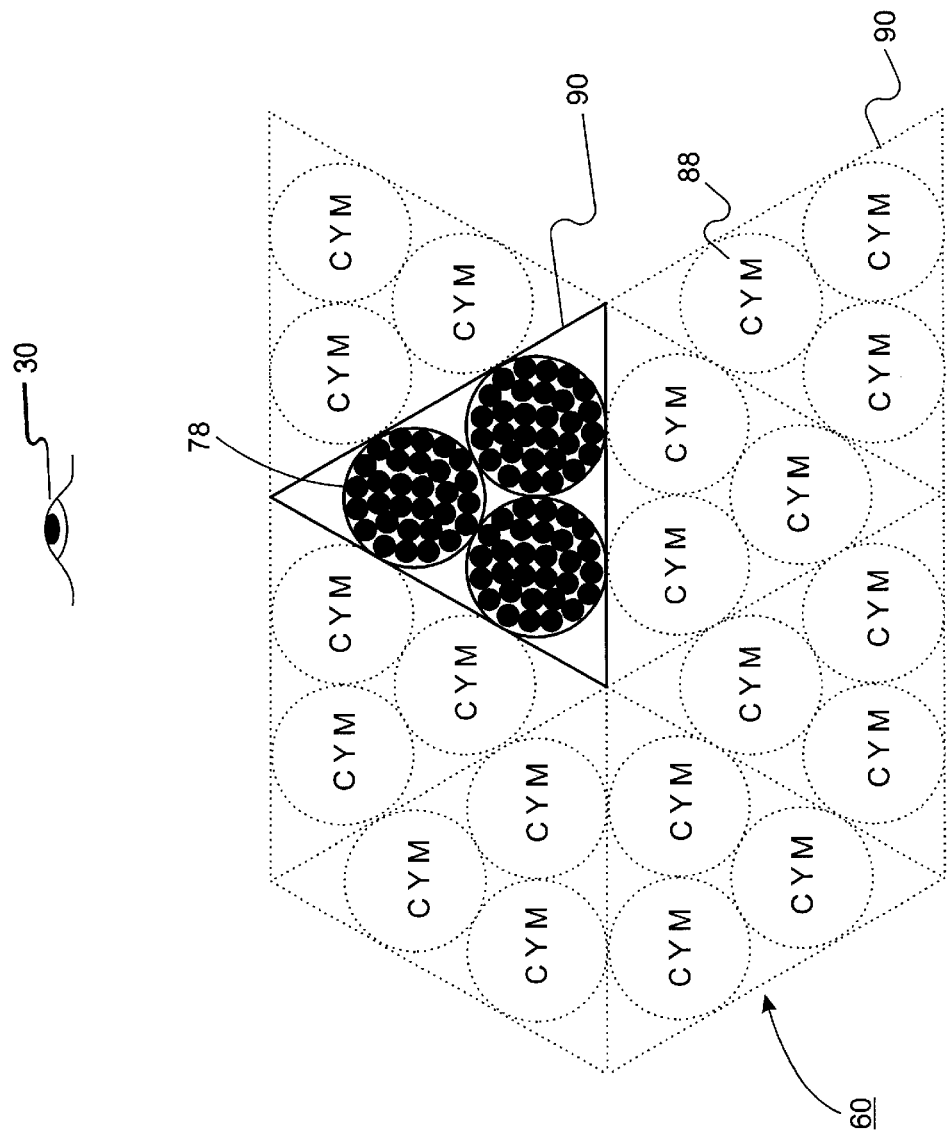
FIG. 19 is a perspective view of a display array based on four-valued phoretic ink elements of FIG. 18.

Reference will now be made in detail to an implementation consistent with the present invention as illustrated in the accompanying drawings. Whenever possible, the same reference number will be used throughout the drawings and the following description to refer to the same or like parts.

V.A. Definitions

As used herein, "aspect" refers to a common response to incident electromagnetic energy of interest. For example, if the incident electromagnetic energy of interest lies in the visible spectrum, then a first aspect may correspond to a black appearance, and a second aspect may correspond to a white appearance. If the incident electromagnetic energy of interest lies in the x-ray region, then a first aspect may correspond to the transmission of the x-ray energy, while a second aspect may correspond to the absorption of the x-ray energy. Furthermore, the "common response" may comprise any of the phenomena of absorption, reflection, polarization, transmission, fluorescence, or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer may refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "nth aspect element" refers to an element contained within the microencapsulation structure of a phoretic ink element (defined below) and which is responsible for presenting the nth aspect to a favorably situated observer.

As used herein, "diameter" refers to an order of magnitude dimension corresponding to any of height, width, and depth of any microencapsulation structure or aspect elements. The use of "diameter" does not imply that circular or spherical geometry only is under consideration.

As used herein, "vector field" refers to a field whose amplitude in space is capable of having a magnitude and a direction. Vector fields of interest in the present invention include electric fields, magnetic fields, or electromagnetic fields.

As used herein, "gradient field" refers to a vector field whose magnitude in a particular displacement direction is not uniform.

As used herein, "applied field" refers to a vector field or a gradient field.

As used herein, "phoretic ink" refers to, collectively, electrophoretic ink, magnetophoretic ink, and electromagnetophoretic ink.

As used herein, "pigment" as applied to phoretic ink refers to a plurality of phoretic ink elements, each element of which is capable of displaying all of the aspects associated with the plurality of phoretic ink elements.

As used herein, "pigment branching" refers to the ability of a pigment of phoretic ink to present more than one aspect to a favorably situated observer. For example, two-valued pigment branching refers to the ability of a pigment of phoretic ink to display two aspects to a favorably situated observer.

As used herein, "composite pigment" refers to a mixture of two or more sets of pigments of phoretic ink as defined above.

As used herein, "n-valued phoretic ink" refers to a pigment of phoretic ink that is capable of n-valued pigment branching, where n is an arbitrary integer.

As used herein, "work function" refers to the amount of energy necessary to overcome the attraction between an aspect element and the microencapsulation structure so as to enable displacement. As mentioned above, a host of factors influence the magnitude of the energy associated with the work function including, but not limited to: surface tension of first aspect medium in contact with second aspect element; the relative specific gravity of first aspect medium to second aspect element; magnitude of charge on second aspect element; relative electronic permittivity of first aspect medium and microencapsulation structure; "stickiness" of microencapsulation structure; and other residual fields that may be present.

V.B. First Embodiment of a Phoretic Ink System

Figure 20:
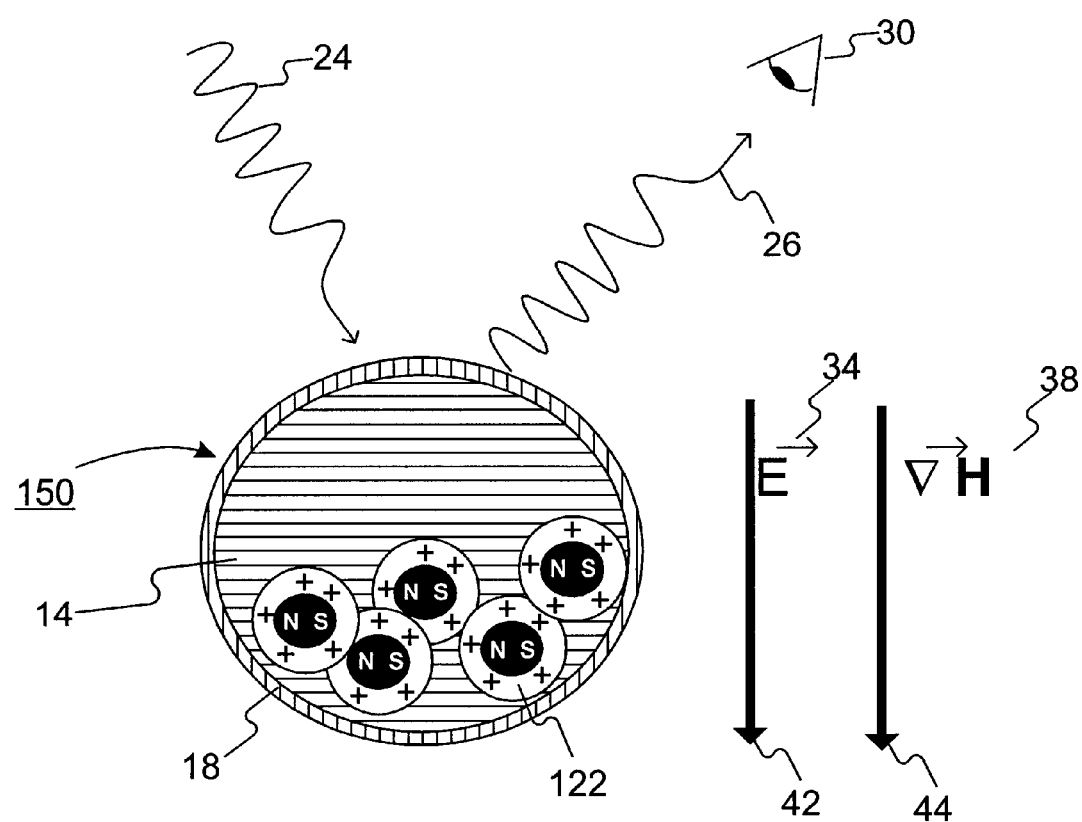
FIG. 20 is a cross section view of a first exemplary phoretic ink element consistent with the present invention.
Figure 21:
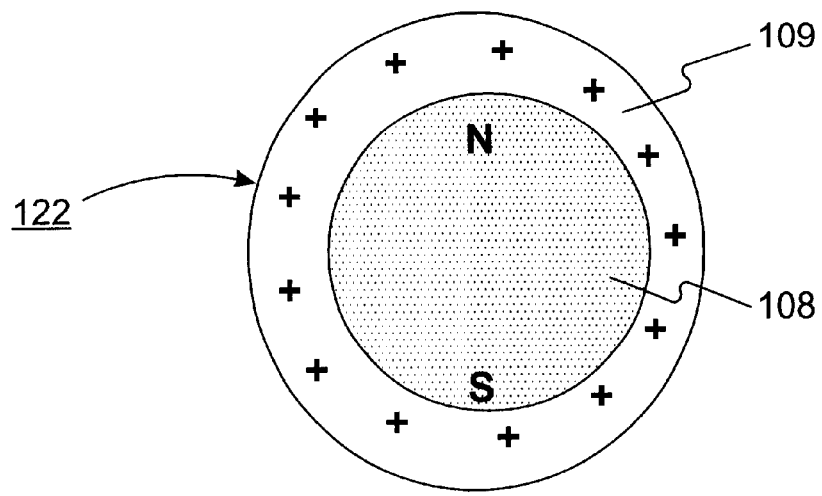
FIG. 21 is a cross section view of an aspect element of the phoretic ink element of FIG. 20.

Exemplary phoretic ink element 150, consistent with a first embodiment of the present invention is depicted in FIG. 20. FIG. 20 depicts phoretic ink element 150 as the encapsulated set of first aspect medium 14 and second aspect elements 122. The encapsulation structure 18 is chosen so as to be transparent to the incident electromagnetic energy of interest 24 and to the transmitted electromagnetic energy of interest 26. Observer 30 is also depicted. An expanded view of the cross section of second aspect 122 is depicted in FIG. 21. In FIG. 21, inner layer 108 corresponds to a magnetic core, and outer layer 109 corresponds to a electrostatically charged shell. One skilled in the art will appreciate that the magnetic dipole as depicted in FIG. 21 may not be a permanent magnetic dipole associated with second aspect element 122. Likewise, the electrostatically charged shell 109 may not be permanently electrically charged. For example, if a ferromagnetic material is coated with a material at a given Zeta potential, then the ferromagnetic material will not have a dipole and the shell will not be charged. When second aspect element 122 is in first aspect medium 14, where first aspect medium 14 is a dielectric liquid, then second aspect element 122 will acquire a charge on the surface. Furthermore, in the presence of an applied magnetic field, inner layer 108 will orient itself appropriately and function as a magnetic dipole.

One skilled in the art will appreciate that the configuration depicted in FIG. 21 is exemplary only, and that other structures incorporating a magnetic layer and an electrostatically charged layer will function as well. In particular, because of the size of second aspect element 122, the electrostatically charged layer can correspond to the inner layer 108, and outer layer 109 can correspond to a magnetically charged shell with the appropriate overall polarity.

In a preferred embodiment of the present invention, inner layer 108, of second aspect element 122 may comprise any magnetite particles or equivalents such as Bayferrox 8600, 8610; Northern Pigments 604, 608; Magnox 104, TMB-100; Columbian Mapico Black; Pfizer CX6368, and CB5600 and the like. One of skill in the art will appreciate, however, that inner layer 108 may comprise any suitable ferromagnetic, paramagnetic, or superparamagnetic material, such as the superparamagnetic material disclosed in U.S. Pat. No. 5,667,924, herein incorporated by reference.

Likewise, outer layer 109 of second aspect element 122, in a preferred embodiment, is a polymeric shell containing anionic, cationic, electron accepting or electron donating groups as described in U.S. Pat. No. 4,877,706 or 5,780,190 which are both herein incorporated by reference. Again, one of skill in the art will appreciate that outer shell 109 may comprise any number of materials. For example, it is well known that small particles in a dielectric liquid acquire an electrical charge that is related to the Zeta potential of the surface coating, thus inner layer 108 may comprise any suitable particle with the appropriate magnetic properties as described above, and outer layer 109 may comprise a coating with a given Zeta potential, where first aspect medium 14 within the respective phoretic ink element is a suitable dielectric liquid. U.S. Pat. No. 5,604,027, herein incorporated by reference, discloses techniques for encapsulating micron-sized elements and dielectric liquid, where the micron-sized elements have coatings that exhibit a Zeta potential when in contact with the dielectric liquid.

A first method of fabricating phoretic ink element 150 includes preparing a mixture of 50 mL of a 10 wt % solution of gelatin (type A, 300 bloom, Aldrich, warmed to 50° C.) and 50 mL of a 10 wt % suspension of second element 122 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, all contained in a 600 mL beaker, where the 600 mL beaker is immersed in a 50° C. water bath. The mixture is stirred at 800 RPM with a 3-bladed impeller. After approximately 5 minutes, 210 mL of warm deionized water is added, followed by 50 mL of a 10 wt % solution of gum arabic, also at 50° C. Glacial acetic acid is added dropwise to lower the pH of the suspension from approximately 4.8 to 4.15. A suitable addition comprises approximately 10 drops. After turning the heating bath off, the reaction is allowed to slowly cool to room temperature over several hours' time. Ice is added to the cooling bath to cool the suspension down to 0° C., and 1.0 mL of gluteraldehyde (50% solution) is added. The reaction is then allowed to stir overnight and warm up to room temperature. The next day, stirring is stopped, and a plurality of phoretic ink elements 150, as coacervated capsules, are allowed to rise to the surface, and are skimmed off by any conventional means known in the art.

A second method of fabricating phoretic ink element 150 includes preparing a mixture of 100 mL of a 10 wt % solution of gelatin (type A, 300 bloom, Aldrich, warmed to 62° C.) and 100 mL of warm distilled water in a 600 mL beaker, where the 600 mL beaker is immersed in a 62° C. water bath. The mixture is stirred at 300 RPM for a few minutes and approximately 1 drop of 1-octanol (an antifoaming agent) is added. At this point, the pH is usually in the approximate range 4.5–4.6. Next, a freshly prepared solution of 20% sodium polyphosphate is added. Acetic acid is slowly added by pipette to lower the pH to approximately 4.5. After increasing the stir rate to 900 RPM, 50 mL of a 10 wt % suspension of second aspect element 122 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, is added slowly. The mixture is stirred at 800 RPM with a 3-bladed impeller. After turning the heating bath off, the reaction is allowed to slowly cool to room temperature over several hours' time. Ice is added to the cooling bath to cool the suspension down to 5° C., and 2.5 mL of gluteraldehyde (50% solution) is added. The reaction is then allowed to stir overnight and warm up to room temperature. The next day, stirring is stopped, and a plurality of phoretic ink elements 150, as coacervated capsules, are allowed to rise to the surface, and are skimmed off by any conventional means known in the art.

A third method of fabricating phoretic ink element 150 includes preparing capsules as described above in the second fabrication method, with the exception that a further crosslinking treatment is applied as follows. The plurality of phoretic ink elements 150 are skimmed off and rinsed with distilled water. Next, the plurality of phoretic ink elements 150 are dispersed in distilled water. Approximately 100 mL of distilled water is added for every 10 g of wet plurality of phoretic ink elements 150. A freshly prepared 1.4 M solution of 1:1 urea:formaldehyde solution is then added to the dispersion (using 1 mL of urea-formaldehyde solution per gram of wet plurality of phoretic ink elements 150). One of skill in the art will appreciate that the crosslinking treatment increases the robustness of the encapsulation structure, but may alter the ability of the structure to transmit the incident electromagnetic energy of interest, as, for example, causing the encapsulation structure to be less transparent.

The exemplary phoretic ink element 150 functions as two-valued phoretic ink. The appropriate applied fields for producing a certain aspect to an appropriately situated observer are depicted in FIGS. 22 and 23, described below.

Phoretic ink element 150 may be configured to exhibit a high aspect stability due to the presence of the magnetic core. Furthermore, phoretic ink element 150 may be configured to exhibit a high aspect stability associated with the improved work function due to the presence of the electric charge, as well as a natural tendency to avoid agglomeration.

V.C. First Embodiment of a Phoretic ink Addressing Method

Figure 22:
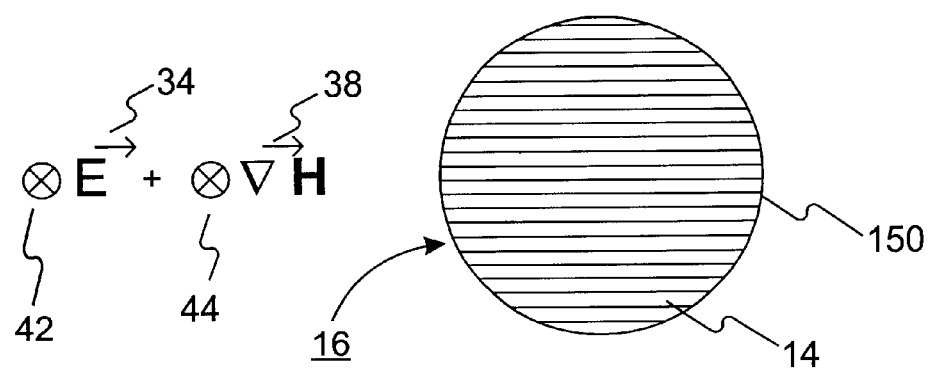
FIG. 22 is a perspective view of first aspect and the addressing electric and magnetic fields of the phoretic ink element of FIG. 20.
Figure 23:
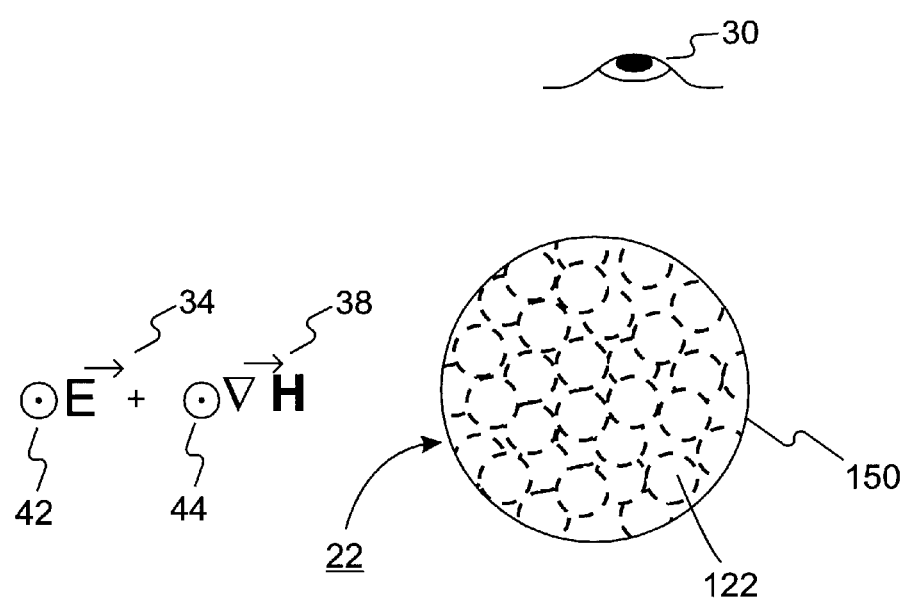
FIG. 23 is a perspective view of second aspect and the addressing electric and magnetic fields of the phoretic ink element of FIG. 20.

In a first embodiment of a phoretic ink addressing system and method consistent with the present invention, the method of addressing phoretic ink element 150 is depicted in FIGS. 22 and 23. The symbol $\otimes$ indicates an arrow directed into the plane of the figure, and the symbol $\odot$ indicates an arrow directed out of the plane of the figure.

In FIG. 22, first aspect 16 is depicted. In order to address phoretic ink element 150 to produce the desired aspect, the appropriately oriented fields are also indicated. Thus, electric field 34 is directed into the plane of the figure, indicated by first arrow 42, and gradient magnetic field 38 is also directed into the plane of the figure, as indicated by second arrow 44. The effect of both fields is to cause the second aspect elements 122 to translate away from the portion of phoretic ink element 150 being viewed.

In FIG. 23, second aspect 22 is depicted. In order to address phoretic ink element 150 to produce second aspect 22, the appropriately oriented fields are also indicated. Thus, electric field 34 is directed out of the plane of the figure, indicated by first arrow 42, and gradient magnetic field 38 is also directed out of the plane of the figure, as indicated by second arrow 44. The effect of both fields is to cause the second aspect elements 122 to translate towards the portion of phoretic ink element 150 being viewed.

The method of addressing phoretic ink element 150 is summarized in Table 1. In Table 1, the columns are divided according to applied electric field 34 or gradient magnetic field 38, and the columns are further subdivided according to whether the orientation of electric field 34 or gradient magnetic field 38 is into the plane of the figure, $\otimes$, or out of the plane of the figure, $\odot$. The letter "Y" indicates that an applied field of magnitude or gradient suitable to overcome the appropriate work function is present in that particular orientation, and the letter "N" indicates that an applied field with insufficient magnitude or gradient to overcome the work function, or no applied field is present in that orientation. An additional column that indicates the number of steps necessary to obtain the desired aspect from a previous different aspect is also indicated. The row labeled "First Aspect" corresponds to FIG. 22, and the row labeled "Second Aspect" corresponds to FIG. 23.

TABLE 1

| Aspect at figure plane | $\odot \vec{\nabla} H$ | $\otimes \vec{\nabla} H$ | $\odot E$ | $\otimes E$ | Number of steps |
|---|---|---|---|---|---|
| First aspect | N | Y | N | Y | 1 |
| Second aspect | Y | N | Y | N | 1 |

Figure 24:
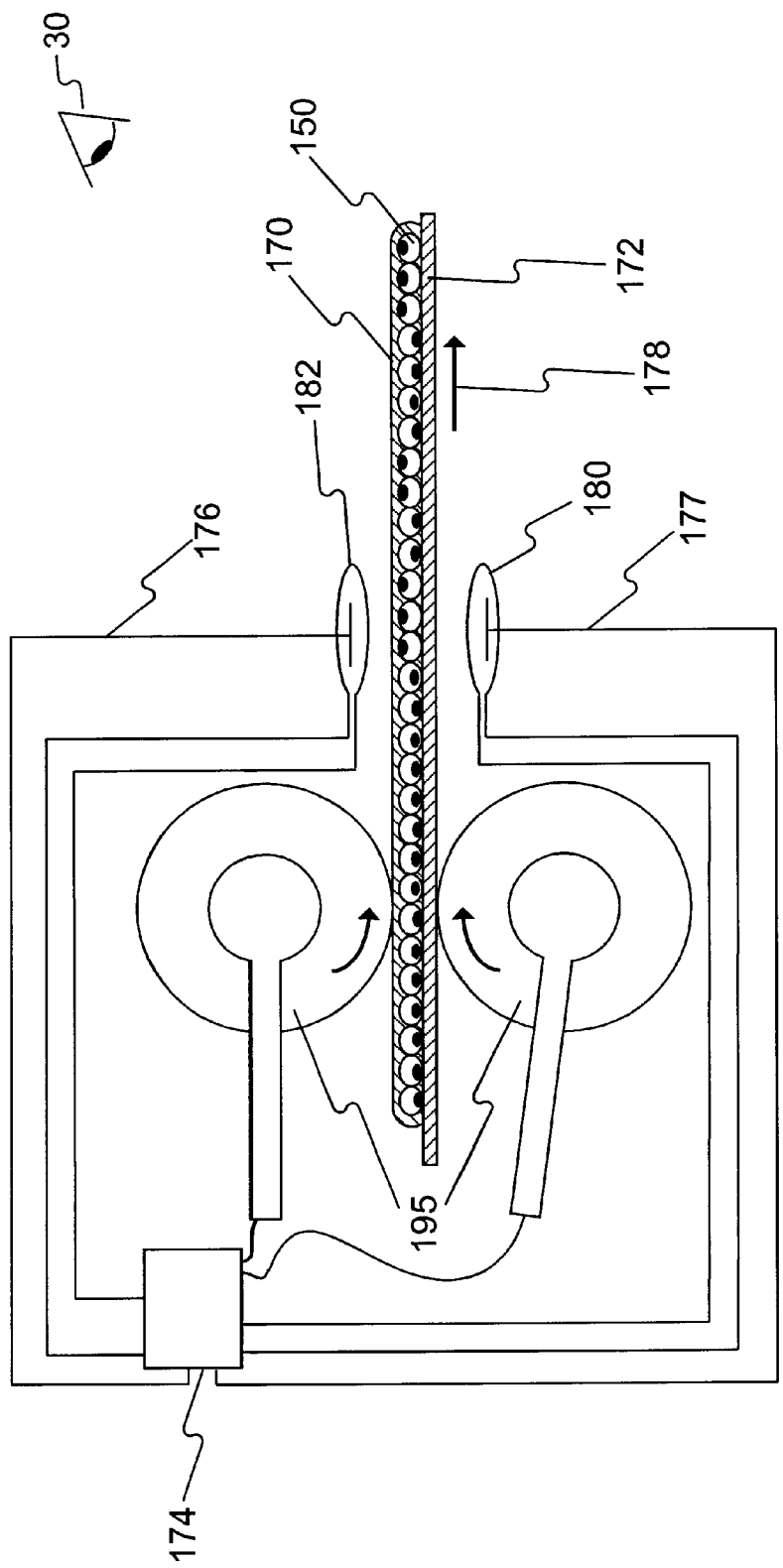
FIG. 24 depicts an exemplary addressing mechanism consistent with the present invention.

A exemplary system for addressing phoretic ink element 150 in one embodiment of the present invention is depicted in FIG. 24. The exemplary system and process includes applying a plurality of phoretic ink elements 150 dispersed in binder 170 to a surface 172, where binder 170 is preferably capable of being applied to surface 172 as with a conventional printing process (not shown), and where binder 170 restricts the plurality of phoretic ink elements 150 to positions on surface 172. Surface 172 may comprise the surface of conventional paper, or another suitable surface. Surface 172 may then be fed through a microprinter, where the microprinter comprises a feed mechanism 195 for introducing the surface bearing a plurality of phoretic elements 150 to a printhead. The printhead comprises both magnetic image elements 182 and 180 on the top and bottom, respectively (for example electromagnets) as well as elements 176 and 177 that can be electrostatically charged. As the plurality of phoretic elements 150 are fed through the microprinter, a combination of electrostatic potential and a gradient magnetic field may be used to selectively bring second aspect elements 122 within the plurality of phoretic ink elements 150 to the viewing surface and so present a selected aspect to observer 30.

Alternatively, one of skill in the art will appreciate that a pixel-driven combination of an array of electromagnets and an array of elements capable of introducing an electric potential across a pixel region may be used to dynamically address such a surface, where the array is located adjacent to and spans a preferred region of the surface. Such an addressing system is well known in the art for selectively introducing electric potentials across a plurality of pixel regions, as in conventional cathode ray tubes, or liquid crystal displays.

Further still, one of skill in the art will appreciate that the plurality of phoretic ink elements 150 may be dispersed in a carrier fluid where the carrier fluid is contained between glass or plastic sheets including, again, a pixel-driven combination of an array of electromagnets and an array of elements capable of introducing an electric potential across a pixel region. Again, such an addressing system is well known in the art for selectively introducing electric potentials across a plurality of pixel regions, as in conventional cathode ray tubes, or liquid crystal displays.

V.D. Second Embodiment of a Phoretic ink System

Figure 25:
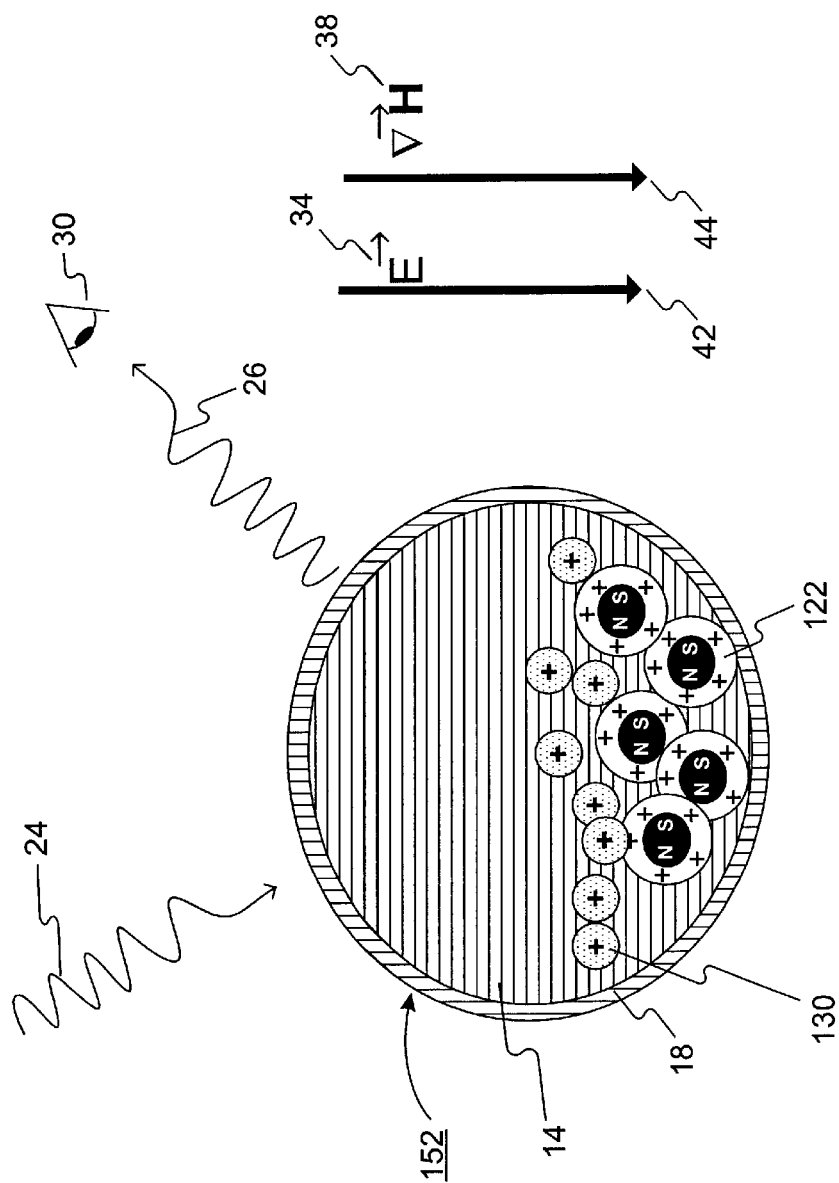
FIG. 25 is a cross section view of a second exemplary phoretic ink element consistent with the present invention.

Exemplary phoretic ink element 152, consistent with a second embodiment of the present invention is depicted in FIG. 25. FIG. 25 depicts phoretic ink element 152 as the encapsulated set of first aspect medium 14 and second aspect elements 122, and third aspect elements 130. The encapsulation structure 18 is chosen so as to be transparent to the incident electromagnetic energy of interest 24 and to the transmitted electromagnetic energy of interest 26. Observer 30 is also depicted. An expanded view of the cross section of second aspect 122 is depicted in FIG. 21. As described above, in FIG. 21, inner layer 108 corresponds to a magnetic core, and outer layer 109 corresponds to a electrostatically charged shell.

As above, in a preferred embodiment of the present invention, inner layer 108, of second aspect element 122 may comprise any magnetite particles or equivalents such as Bayferrox 8600, 8610; Northern Pigments 604, 608; Magnox 104, TMB-100; Columbian Mapico Black; Pfizer CX6368, and CB5600 and the like. One of skill in the art will appreciate, however, that inner layer 108 may comprise any suitable ferromagnetic, paramagnetic, or superparamagnetic material, such as the superparamagnetic material disclosed in U.S. Pat. No. 5,667,924, hereinabove incorporated by reference.

Likewise, outer layer 109 of second aspect element 122, in a preferred embodiment, is a polymeric shell containing anionic, cationic, electron accepting or electron donating groups as described in U.S. Pat. No. 4,877,706 or 5,780,190 which are both hereinabove incorporated by reference. Again, one of skill in the art will appreciate that outer layer 109 may comprise any number of materials. For example, it is well known that small particles in a dielectric liquid acquire an electrical charge that is related to the Zeta potential of the surface coating, thus inner layer 108 may comprise any suitable particle with the appropriate magnetic properties as described above, and outer layer 109 may comprise a coating with a given Zeta potential, where first aspect medium 14 within the respective phoretic ink element is a suitable dielectric liquid. Again, U.S. Pat. No. 5,604,027, hereinabove incorporated by reference, discloses techniques for encapsulating micron-sized elements and dielectric liquid, where the micron-sized elements have coatings that exhibit a Zeta potential when in contact with the dielectric liquid.

Third aspect element 130, in a preferred embodiment of the present invention, comprises a conventional electrophoretic aspect element, and may be fabricated by any conventional means known in the art, such as those disclosed in U.S. Pat. No. 5,961,804, hereinabove incorporated by reference. Again, it is well known that small particles in a dielectric liquid acquire an electrical charge that is related to the Zeta potential of the surface coating, thus third aspect element 130 may comprise any suitable microparticle with a coating at a given Zeta potential, where first aspect medium 14 within the respective phoretic ink element is a suitable dielectric liquid.

A first method of fabricating phoretic ink element 152 includes preparing a mixture of 50 mL of a 10 wt % solution of gelatin (type A, 300 bloom, Aldrich, warmed to 50° C.) and 50 mL of a 10 wt % suspension (1:1 by weight) of second aspect element 122 and third aspect element 130 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, all contained in a 600 mL beaker, where the 600 mL beaker is immersed in a 50° C. water bath. The mixture is stirred at 800 RPM with a 3-bladed impeller. After approximately 5 minutes, 210 mL of warm deionized water is added, followed by 50 mL of a 10 wt % solution of gum arabic, also at 50° C. Glacial acetic acid is added dropwise to lower the pH of the suspension from approximately 4.8 to 4.15. A suitable addition comprises approximately 10 drops. After turning the heating bath off, the reaction is allowed to slowly cool to room temperature over several hours' time. Ice is added to the cooling bath to cool the suspension down to 0° C., and 1.0 mL of gluteraldehyde (50% solution) is added. The reaction is then allowed to stir overnight and warm up to room temperature. The next day, stirring is stopped, and a plurality of phoretic ink elements 152, as coacervated capsules, are allowed to rise to the surface, and are skimmed off by any conventional means known in the art.

A second method of fabricating phoretic ink element 152 includes preparing a mixture of 100 mL of a 10 wt % solution of gelatin (type A, 300 bloom, Aldrich, warmed to 62° C.) and 100 mL of warm distilled water in a 600 mL beaker, where the 600 mL beaker is immersed in a 62° C. water bath. The mixture is stirred at 300 RPM for a few minutes and approximately 1 drop of 1-octanol (an antifoaming agent) is added. At this point, the pH is usually in the approximate range 4.5–4.6. Next, a freshly prepared solution of 20% sodium polyphosphate is added. Acetic acid is slowly added by pipette to lower the pH to approximately 4.5. After increasing the stir rate to 900 RPM, a 10 wt % suspension of a mixture (1:1 by weight) of second aspect element 122 and third aspect element 130 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, is added slowly. The mixture is stirred at 800 RPM with a 3-bladed impeller. After turning the heating bath off, the reaction is allowed to slowly cool to room temperature over several hours' time. Ice is added to the cooling bath to cool the suspension down to 5° C., and 2.5 mL of gluteraldehyde (50% solution) is added. The reaction is then allowed to stir overnight and warm up to room temperature. The next day, stirring is stopped, and the plurality of phoretic ink elements 152, as coacervated capsules, are allowed to rise to the surface, and are skimmed off.

A third method of fabricating phoretic ink element 152 includes preparing capsules as described above in the second fabrication method, with the exception that a further crosslinking treatment is applied as follows. The plurality of phoretic ink elements 152 are skimmed off and rinsed with distilled water. Next, the plurality of phoretic ink elements 152 are dispersed in distilled water. Approximately 100 mL of distilled water is added for every 10 g of wet plurality of phoretic ink elements 152. A freshly prepared 1.4 M solution of 1:1 urea:formaldehyde solution is added to the dispersion (using 1 mL of urea-formaldehyde solution per gram of wet plurality of phoretic ink elements 152). Again, one of skill in the art will appreciate that the crosslinking treatment increases the robustness of the encapsulation structure, but may alter the ability of the structure to transmit the incident electromagnetic energy of interest, as, for example, causing the encapsulation structure to be less transparent.

The exemplary phoretic ink element 152 functions as three-valued phoretic ink. The appropriate applied fields for producing a certain aspect to an appropriately situated observer are depicted in FIGS. 26, 27, and 28, described below.

V.E. Second Embodiment of a Phoretic ink Addressing Method

Figure 26:
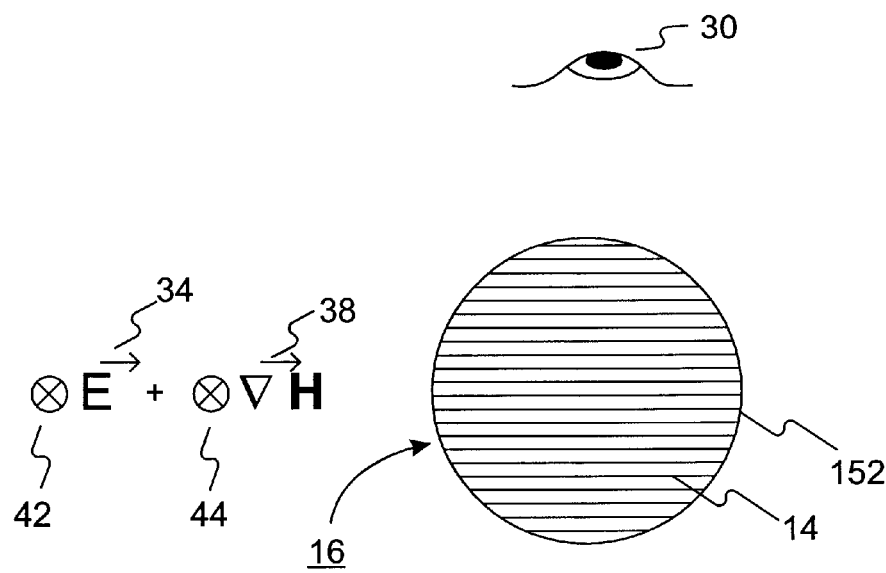
FIG. 26 is a perspective view of first aspect and the addressing electric and magnetic fields of the phoretic ink element of FIG. 25.
Figure 27:
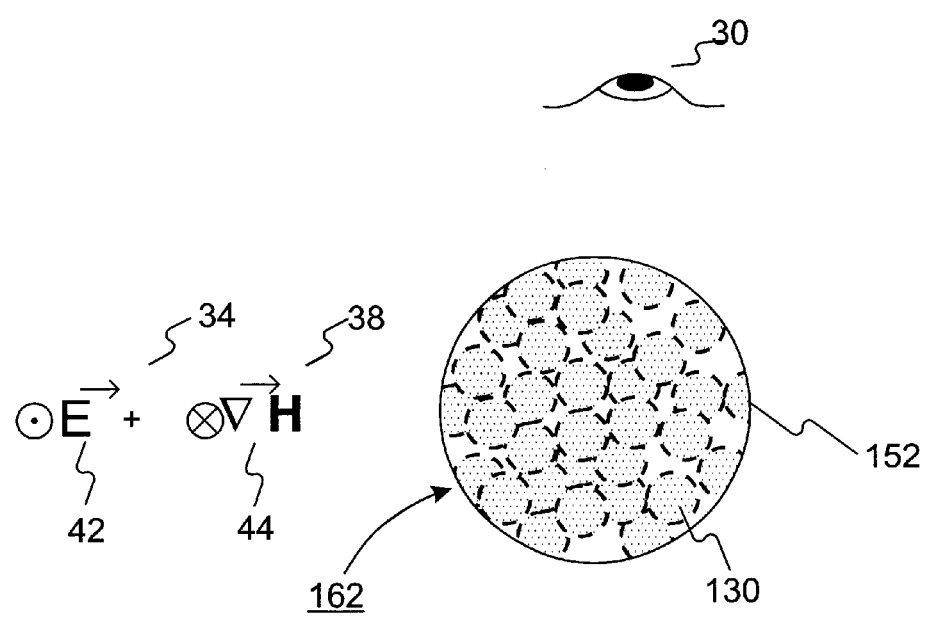
FIG. 27 is a perspective view of third aspect and the addressing electric and magnetic fields of the phoretic ink element of FIG. 25.
Figure 28:
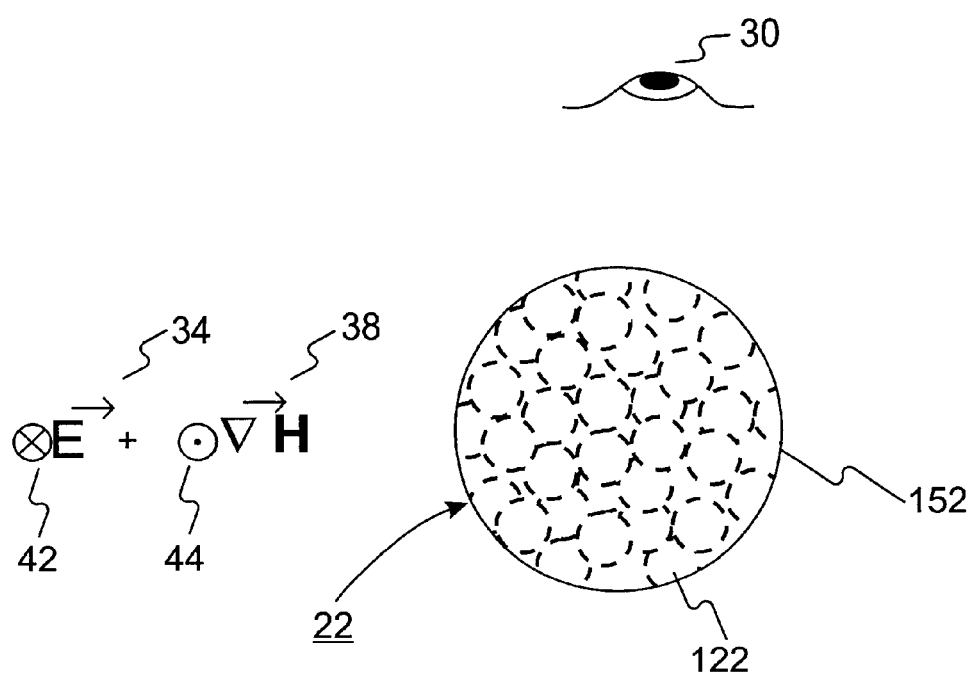
FIG. 28 is a perspective view of second aspect and the addressing electric and magnetic fields of the phoretic ink element of FIG. 25.

In a second embodiment of a phoretic ink addressing system and method consistent with the present invention, the method of addressing phoretic ink element 152 is given in FIGS. 26, 27, and 28. The symbol ⊗ indicates an arrow directed into the plane of the figure, and the symbol ⊙ indicates an arrow directed out of the plane of the figure.

In FIG. 26, first aspect 16 is depicted. In order to address phoretic ink element 152 to produce the desired aspect, the appropriately oriented fields are also indicated. Thus, electric field 34 is directed into the plane of the figure, indicated by first arrow 42, and gradient magnetic field 38 is also directed into the plane of the figure, as indicated by second arrow 44. The effect of both fields is to cause the second aspect elements 122 and third aspect elements 130 to translate away from the portion of phoretic ink element 152 being viewed.

In FIG. 27, third aspect 162 is depicted. In order to address phoretic ink element 152 to produce third aspect 162, the appropriately oriented fields are also indicated. Thus, electric field 34 is directed out of the plane of the figure, indicated by first arrow 42, and gradient magnetic field 38 is directed into the plane of the figure, as indicated by second arrow 44. The effect of the fields is to cause the second aspect elements 122 to translate away from the portion of phoretic ink element 152 being viewed; and third aspect elements 130 to translate towards the portion of phoretic ink element 152 being viewed.

In FIG. 28, second aspect 22 is depicted. In order to address phoretic ink element 152 to produce second aspect 22, the appropriately oriented fields are also indicated. Thus, electric field 34 is directed into the plane of the figure, indicated by first arrow 42, and gradient magnetic field 38 is directed out of the plane of the figure, as indicated by second arrow 44. The effect of the fields is to cause: the second aspect elements 122 to translate towards the portion of phoretic ink element 152 being viewed; and third aspect elements 130 to translate away from the portion of phoretic ink element 152 being viewed.

The method of addressing phoretic ink element 152 consistent with one embodiment of the present invention is summarized in Table 2. In Table 2, the columns are divided according to applied electric field 34 or gradient magnetic field 38, and the columns are further subdivided according to whether the orientation of electric field 34 or gradient magnetic field 38 is into the plane of the figure, ⊗, or out of the plane of the figure, ⊙. The letter "Y" indicates that an applied field of magnitude or gradient suitable to overcome the appropriate work function is present in that particular orientation, and the letter "N" indicates that an applied field of insufficient magnitude or gradient is present in that orientation, or that no applied field is present in that orientation. An additional column that indicates the number of steps necessary to obtain the desired aspect from a previous different aspect is also indicated. The row labeled "First Aspect" corresponds to FIG. 26, the row labeled "Second Aspect" corresponds to FIG. 28, and the row labeled "Third Aspect" corresponds to FIG. 27.

TABLE 2

| Aspect at figure plane | ⊙ $\vec{\nabla}$ H | ⊗ $\vec{\nabla}$ H | ⊙ E | ⊗ E | Number of steps |
|---|---|---|---|---|---|
| First aspect | N | Y | N | Y | 1 |
| Second aspect | Y | N | N | Y | 1 |
| Third aspect | N | Y | Y | N | 1 |

Phoretic ink element 152 may be addressed to present a multi-valued aspect in a single step, rather than using the multi-threshold technique described above.

As above and depicted in FIG. 24, a system for addressing phoretic ink element 152 in one embodiment of the present invention includes applying a plurality of phoretic ink elements 152 dispersed in a binder to a surface, where the binder is preferably capable of being applied to the surface as with a conventional printing process, and that restricts the plurality of phoretic ink elements 152 to positions on the surface. The surface may comprise the surface of conventional paper, or another suitable surface. The surface may then be fed through a microprinter, where the microprinter comprises a feed mechanism for introducing the surface bearing a plurality of phoretic elements 152 to a printhead. The printhead comprises both magnetic image elements on the top and bottom (for example electromagnets) as well as elements that can be electrostatically charged. As the phoretic element is fed through the microprinter, a combination of electrostatic potential and a gradient magnetic field may be used to selectively bring second aspect elements 122 and third aspect elements 130 within the plurality of phoretic ink elements 152 to the viewing surface and so present a selected aspect to observer 30.

Alternatively, one of skill in the art will appreciate that a pixel-driven combination of an array of electromagnets and an array of elements capable of introducing an electric potential across a pixel region may be used to dynamically address such a surface, where the array is located adjacent to and spans a preferred region of the surface. Such an addressing system is well known in the art for selectively introducing electric potentials across a plurality of pixel regions, as in conventional cathode ray tubes, or liquid crystal displays.

Further still, one of skill in the art will appreciate that the plurality of phoretic ink elements 152 may be dispersed in a carrier fluid where the carrier fluid is contained between glass or plastic sheets including, again, a pixel-driven combination of an array of electromagnets and an array of elements capable of introducing an electric potential across a pixel region. Again, such an addressing system is well known in the art for selectively introducing electric potentials across a plurality of pixel regions, as in conventional cathode ray tubes, or liquid crystal displays.

V.F. Third Embodiment of a Phoretic ink System

Figure 29:
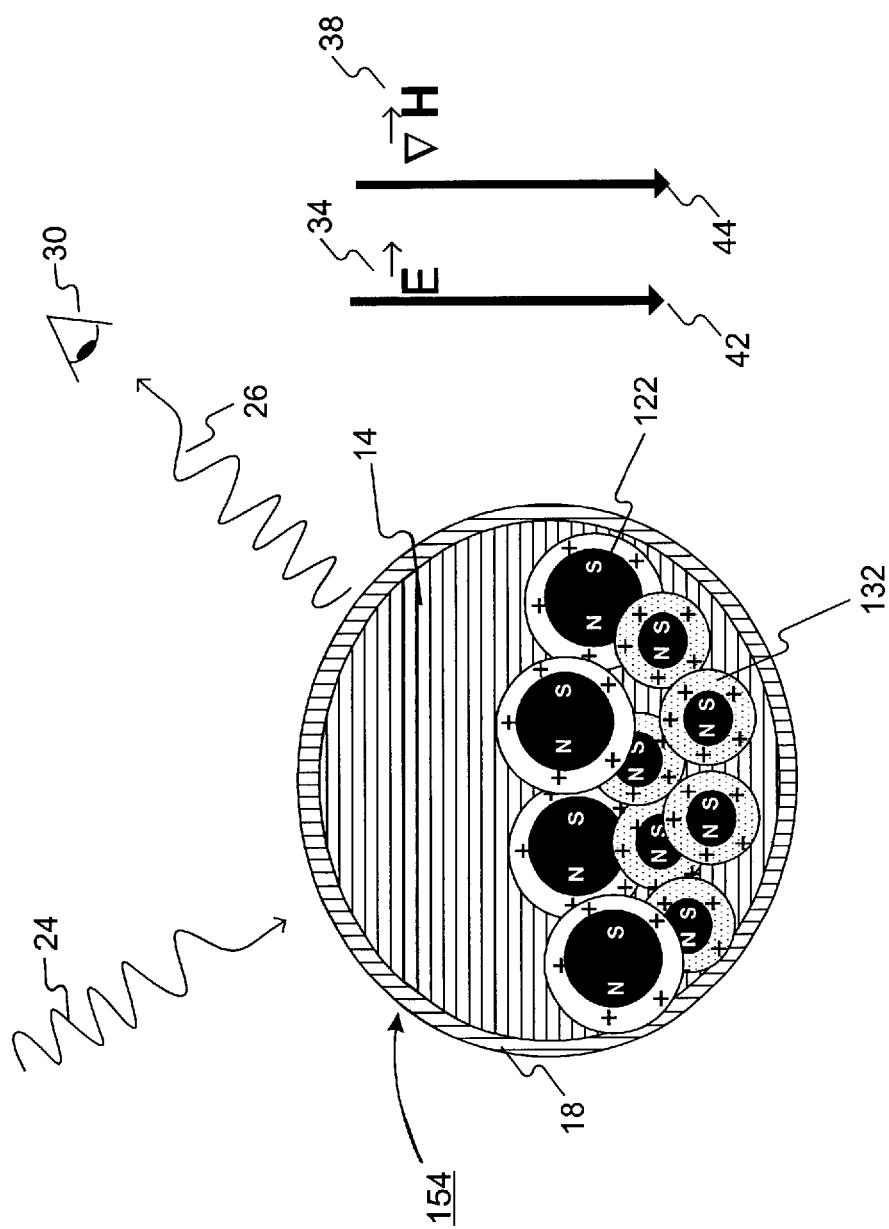
FIG. 29 is a cross section view of a third exemplary phoretic ink element consistent with the present invention.

Exemplary phoretic ink element 154, consistent with a third embodiment of the present invention, is depicted in FIG. 29. FIG. 29 depicts phoretic ink element 154 as the encapsulated set of first aspect medium 14, second aspect elements 122, and third aspect elements 132. The encapsulation structure 18 is chosen so as to be transparent to the incident electromagnetic energy of interest 24 and to the transmitted electromagnetic energy of interest 26. Observer 30 is also depicted. An expanded view of the cross section of second aspect 122 is depicted in FIG. 21. One skilled in the art will appreciate that the structure of third aspect element 132 is the same as the structure of second aspect element 122 depicted in FIG. 21. As described above, in FIG. 21, inner layer 108 corresponds to a magnetic core, and outer layer 109 corresponds to a electrostatically charged shell.

As above, in a preferred embodiment of the present invention, inner layer 108, of second aspect element 122 and the corresponding inner layer of third aspect element 132 may comprise any magnetite particles or equivalents such as Bayferrox 8600, 8610; Northern Pigments 604, 608; Magnox 104, TMB-100; Columbian Mapico Black; Pfizer CX6368, and CB5600 and the like. One of skill in the art will appreciate, however, that the respective inner layer may comprise any suitable ferromagnetic, paramagnetic, or superparamagnetic material, such as the superparamagnetic material disclosed in U.S. Pat. No. 5,667,924, hereinabove incorporated by reference.

Likewise, outer layer 109 of second aspect element 122 and the corresponding outer layer of third aspect element 132, in a preferred embodiment, is a polymeric shell containing anionic, cationic, electron accepting or electron donating groups as described in U.S. Pat. No. 4,877,706 or 5,780,190 which are both hereinabove incorporated by reference. Again, one of skill in the art will appreciate that the corresponding outer layer may comprise any number of materials. For example, it is well known that small particles in a dielectric liquid acquire an electrical charge that is related to the Zeta potential of the surface coating, thus the inner layer may comprise any suitable particle with the appropriate magnetic properties as described above, and the outer layer may comprise a coating with a given Zeta potential, where first aspect medium 14 within the respective phoretic ink element is a suitable dielectric liquid. Again, U.S. Pat. No. 5,604,027, hereinabove incorporated by reference, discloses techniques for encapsulating micron-sized elements and dielectric liquid, where the micron-sized elements have coatings that exhibit a Zeta potential when in contact with the dielectric liquid.

A first method of fabricating phoretic ink element 154 includes preparing a mixture of 50 mL of a 10 wt % solution of gelatin (type A, 300 bloom, Aldrich, warmed to 50° C.) and 50 mL of a 10 wt % suspension (1:1 by weight) of second aspect element 122 and third aspect element 132 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, all contained in a 600 mL beaker, where the 600 mL beaker is immersed in a 50° C. water bath. The mixture is stirred at 800 RPM with a 3-bladed impeller. After approximately 5 minutes, 210 mL of warm deionized water is added, followed by 50 mL of a 10 wt % solution of gum arabic, also at 50° C. Glacial acetic acid is added dropwise to lower the pH of the suspension from approximately 4.8 to 4.15. A suitable addition comprises approximately 10 drops. After turning the heating bath off, the reaction is allowed to slowly cool to room temperature over several hours' time. Ice is added to the cooling bath to cool the suspension down to 0° C., and 1.0 mL of gluteraldehyde (50% solution) is added. The reaction is then allowed to stir overnight and warm up to room temperature. The next day, stirring is stopped, and a plurality of phoretic ink elements 154, as coacervated capsules, are allowed to rise to the surface, and are skimmed off by any conventional means known in the art.

A second method of fabricating phoretic ink element 154 includes preparing a mixture of 100 mL of a 10 wt % solution of gelatin (type A, 300 bloom, Aldrich, warmed to 62° C.) and 100 mL of warm distilled water in a 600 mL beaker, where the 600 mL beaker is immersed in a 62° C. water bath. The mixture is stirred at 300 RPM for a few minutes and approximately 1 drop of 1-octanol (an antifoaming agent) is added. At this point, the pH is usually in the approximate range 4.5–4.6. Next, a freshly prepared solution of 20% sodium polyphosphate is added. Acetic acid is slowly added by pipette to lower the pH to approximately 4.5. After increasing the stir rate to 900 RPM, a 10 wt % suspension of a mixture (1:1 by weight) of second aspect element 122 and third aspect element 132 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, is added slowly. The mixture is stirred at 800 RPM with a 3-bladed impeller. After turning the heating bath off, the reaction is allowed to slowly cool to room temperature over several hours' time. Ice is added to the cooling bath to cool the suspension down to 5° C., and 2.5 mL of gluteraldehyde (50% solution) is added. The reaction is then allowed to stir overnight and warm up to room temperature. The next day, stirring is stopped, and the plurality of phoretic ink elements 154, as coacervated capsules, are allowed to rise to the surface, and are skimmed off.

A third method of fabricating phoretic ink element 154 includes preparing capsules as described above in the second fabrication method, with the exception that a further crosslinking treatment is applied as follows. The plurality of phoretic ink elements 154 are skimmed off and rinsed with distilled water. Next, the plurality of phoretic ink elements 154 are dispersed in distilled water. Approximately 100 mL of distilled water is added for every 10 g of wet plurality of phoretic ink elements 154. A freshly prepared 1.4 M solution of 1:1 urea: formaldehyde solution is added to the dispersion (using 1 mL of urea-formaldehyde solution per gram of wet plurality of phoretic ink elements 154). Again, one of skill in the art will appreciate that the crosslinking treatment increases the robustness of the encapsulation structure, but may alter the ability of the structure to transmit the incident electromagnetic energy of interest, as, for example, causing the encapsulation structure to be less transparent.

The exemplary phoretic ink element 154 functions as three-valued phoretic ink. The appropriate applied fields for producing a certain aspect to an appropriately situated observer are depicted in FIGS. 30, 31, and 32, described below.

The magnetic response of second aspect element 122 and third aspect element 132 is driven by the volume of the magnetic material, while the electrostatic response is driven by the surface charge. Thus, element size may be used to select either second aspect element 122 or third aspect element 132 for migration. This is described in more detail below. Typical values for the radius of second aspect element 122 and third aspect element 132 include dimensions in the tens of microns down to the tens of nanometers, such as 15 microns down to 30 nanometers, respectively.

V.G. Third Embodiment of a Phoretic ink Addressing Method

Figure 30:
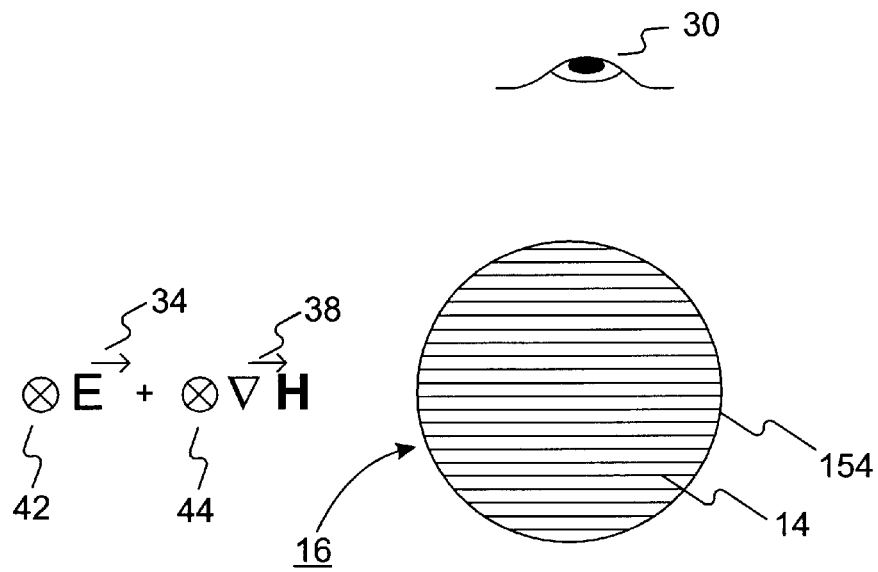
FIG. 30 is a perspective view of first aspect and the addressing electric and magnetic fields of the phoretic ink element of FIG. 29.
Figure 31:
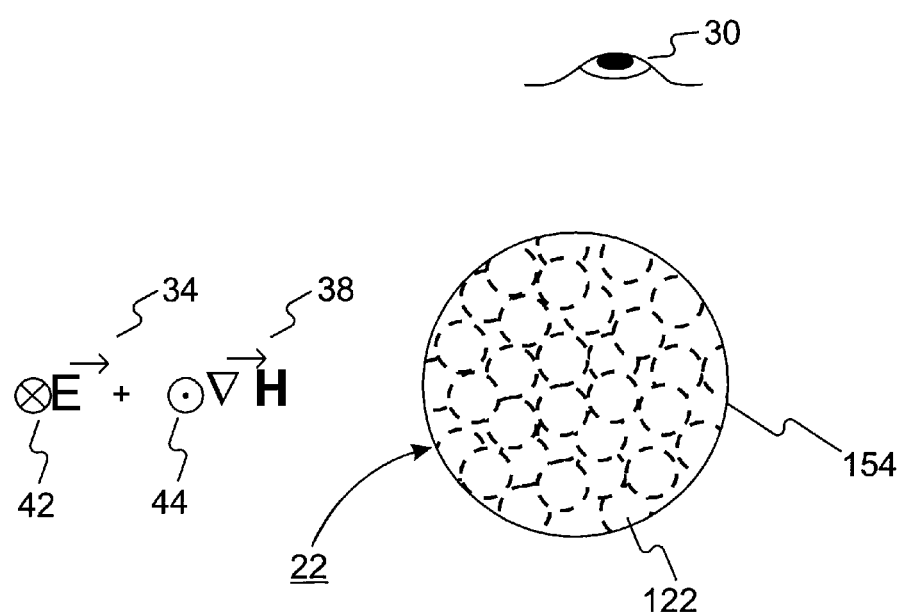
FIG. 31 is a perspective view of second aspect and the addressing electric and magnetic fields of the phoretic ink element of FIG. 29.
Figure 32:
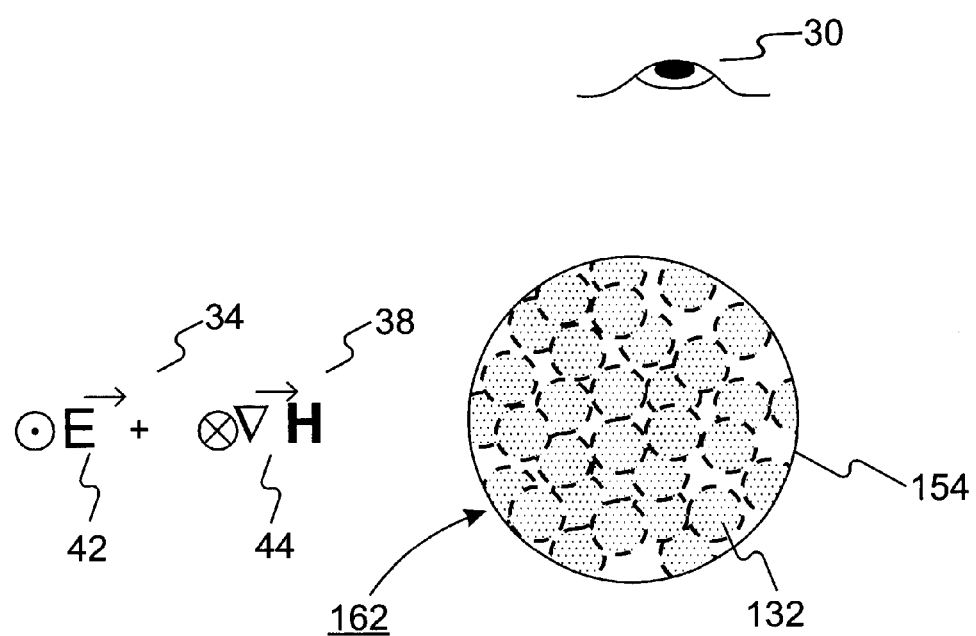
FIG. 32 is a perspective view of third aspect and the addressing electric and magnetic fields of the phoretic ink element of FIG. 29.

In a third embodiment of a phoretic ink addressing system and method consistent with the present invention, the method of addressing phoretic ink element 154 is given in FIGS. 30, 31, and 32. The symbol ⊗ indicates an arrow directed into the plane of the figure, and the symbol ⊙ indicates an arrow directed out of the plane of the figure.

In FIG. 30, first aspect 16 is depicted. In order to address phoretic ink element 154 to produce the desired aspect, the appropriately oriented fields are also indicated. Thus, electric field 34 is-directed into the plane of the figure, indicated by first arrow 42, and gradient magnetic field 38 is also directed into the plane of the figure, as indicated by second arrow 44. The effect of both fields is to cause the second aspect elements 122 and third aspect elements 132 to translate away from the portion of phoretic ink element 154 being viewed.

In FIG. 31, second aspect 22 is depicted. In order to address phoretic ink element 154 to produce second aspect 22, the appropriately oriented fields are also indicated. Thus, electric field 34 is directed into the plane of the figure, indicated by first arrow 42, and gradient magnetic field 38 is directed out of the plane of the figure, as indicated by second arrow 44. The effect of the fields is to cause: the second aspect elements 122 to translate towards the portion of phoretic ink element 154 being viewed; and third aspect elements 132 to translate away from the portion of phoretic ink element 154 being viewed.

In FIG. 32, third aspect 162 is depicted. In order to address phoretic ink element 154 to produce third aspect 162, the appropriately oriented fields are also indicated. Thus, electric field 34 is directed out of the plane of the figure, indicated by first arrow 42, and gradient magnetic field 38 is directed into the plane of the figure, as indicated by second arrow 44. The effect of the fields is to cause: the second aspect elements 122 to translate away from the portion of phoretic ink element 154 being viewed; and third aspect elements 132 to translate towards the portion of phoretic ink element 154 being viewed.

The method of addressing phoretic ink element 154 consistent with one embodiment of the present invention is summarized in Table 3. In Table 3, the columns are divided according to applied electric field 34 or gradient magnetic field 38, and the columns are further subdivided according to whether the orientation of electric field 34 or gradient magnetic field 38 is into the plane of the figure, ⊗, or out of the plane of the figure, ⊙. The letter "Y" indicates that an applied field of magnitude or gradient suitable to overcome the appropriate work function is present in that particular orientation, and the letter "N" indicates that an applied field of magnitude or gradient insufficient to overcome the appropriate work function is present in that particular orientation, or that no applied field is present in that orientation. An additional column that indicates the number of steps necessary to obtain the desired aspect from a previous different aspect is also indicated. The row labeled "First Aspect" corresponds to FIG. 30, the row labeled "Second Aspect" corresponds to FIG. 31, and the row labeled "Third Aspect" corresponds to FIG. 32.

TABLE 3

| Aspect at figure plane | ⊙$\vec{\nabla}$H | ⊗$\vec{\nabla}$H | ⊙E | ⊗E | Number of steps |
|---|---|---|---|---|---|
| First aspect | N | Y | N | Y | 1 |
| Second aspect | Y | N | N | Y | 1 |
| Third aspect | N | Y | Y | N | 1 |

Again, phoretic ink element 154 may be addressed to present a multi-valued aspect in a single step, rather than using the multi-threshold technique described above.

As above and depicted in FIG. 24, a system for addressing phoretic ink element 154 in one embodiment of the present invention includes applying a plurality of phoretic ink elements 154 dispersed in a binder to a surface, where the binder is preferably capable of being applied to the surface as with a conventional printing process, and that restricts the plurality of phoretic ink elements 154 to positions on the surface. The surface may comprise the surface of conventional paper, or another suitable surface. The surface may then be fed through a microprinter, where the microprinter comprises a feed mechanism for introducing the surface bearing a plurality of phoretic elements 154 to the printhead. The printhead comprises both magnetic image elements on the top and bottom (for example electromagnets) as well as elements that can be electrostatically charged. As the phoretic element is fed through the microprinter, a combination of electrostatic potential and a gradient magnetic field may be used to selectively bring second aspect elements 122 and third aspect elements 132 within the plurality of phoretic ink elements 154 to the viewing surface and so present a selected aspect to observer 30.

Alternatively, one of skill in the art will appreciate that a pixel-driven combination of an array of electromagnets and an array of elements capable of introducing an electric potential across a pixel region may be used to dynamically address such a surface, where the array is located adjacent to and spans a preferred region of the surface. Such an addressing system is well known in the art for selectively introducing electric potentials across a plurality of pixel regions, as in conventional cathode ray tubes, or liquid crystal displays.

Further still, one of skill in the art will appreciate that the plurality of phoretic ink elements 154 may be dispersed in a carrier fluid where the carrier fluid is contained between glass or plastic sheets including, again, a pixel-driven combination of an array of electromagnets and an array of elements capable of introducing an electric potential across a pixel region. Again, such an addressing system is well known in the art for selectively introducing electric potentials across a plurality of pixel regions, as in conventional cathode ray tubes, or liquid crystal displays.

As mentioned above, one means of achieving discrimination between second aspect elements 122 and third aspect elements 132 consistent with the present invention is based solely on the dimensions associated with second aspect elements 122 and third aspect elements 132. Specifically, any choice of aspect element geometry whereby the volume of an aspect element scales differently from the surface area of the aspect element will allow for discrimination. For example, in the case where both third aspect elements 132 and second aspect elements 122 are spheroid and where third aspect element 132 is smaller than second aspect element 122, then the surface area of both second aspect element 122 and third aspect element 132 scale as diameter to the second power and the volume of both second aspect element 122 and third aspect element 132 scale as diameter to the third power. Thus, for an electric field at a given strength, and a gradient magnetic field at a given strength, the effect of electric field 34 and the surface charge of third aspect element 132 will dominate over the effect of gradient magnetic field 38 and volume of magnetic material in third aspect element 132. On the other hand, the effect of gradient magnetic field 38 and volume of magnetic material in second aspect element 122 will dominate over the effect of the electric field 34 and surface charge of second aspect element 122. Such a construction of second aspect element 122 and third aspect element 132 will allow for the method of addressing discussed above and depicted in FIGS. 30, 31, and 32.

V.H. Fourth Embodiment of a Phoretic ink System

Figure 33:
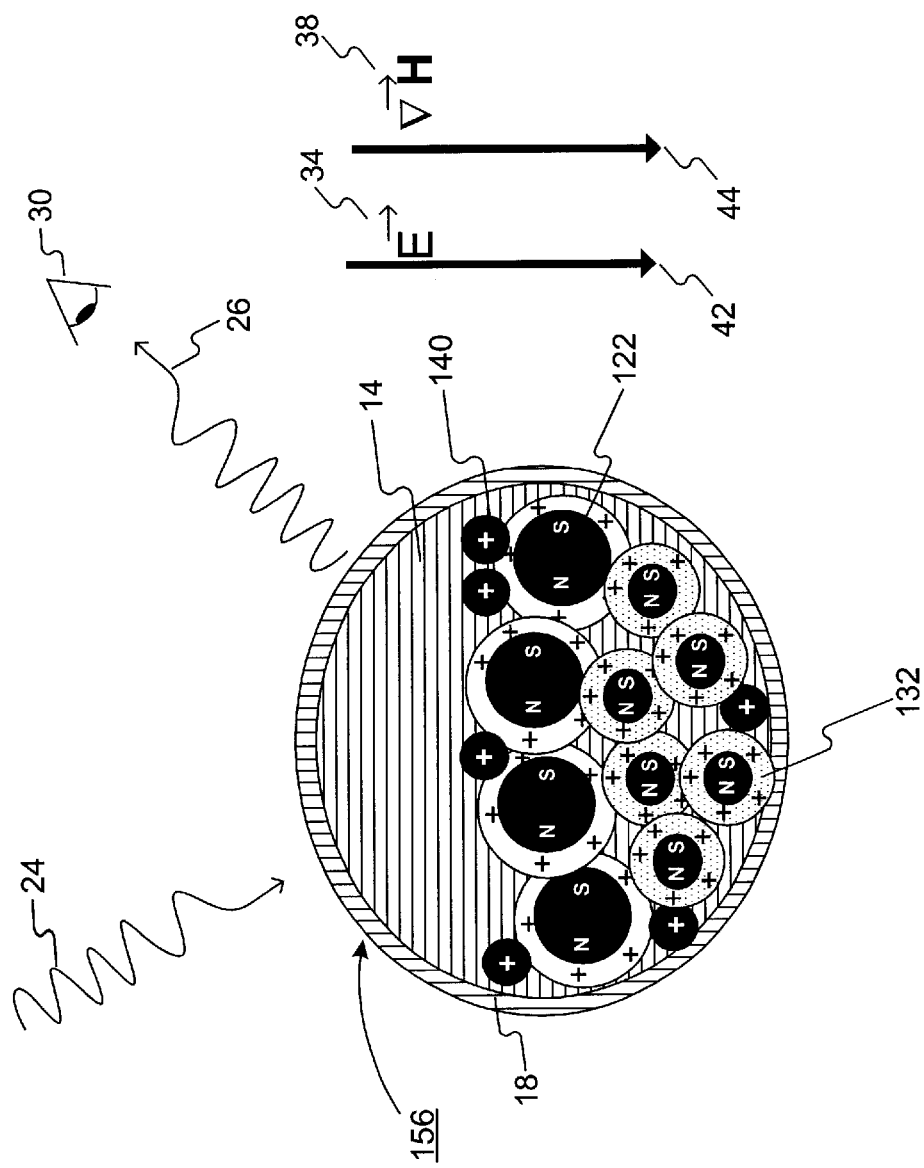
FIG. 33 is a cross section view of a fourth exemplary phoretic ink element consistent with the present invention.

Exemplary phoretic ink element 156, consistent with a fourth embodiment of the present invention, is depicted in FIG. 33. FIG. 33 depicts phoretic ink element 156 as the encapsulated set of first aspect medium 14, second aspect elements 122, third aspect elements 132, and fourth aspect elements 140. The encapsulation structure 18 is chosen so as to be transparent to the incident electromagnetic energy of interest 24 and to the transmitted electromagnetic energy of interest 26. Observer 30 is also depicted. An expanded view of the cross section of second aspect element 122 is depicted in FIG. 21. One skilled in the art will appreciate that the structure, of third aspect element 132 is the same as the structure of second aspect element 122 depicted in FIG. 21. As described above, in FIG. 21, inner layer 108 corresponds to a magnetic core, and outer layer 109 corresponds to a electrostatically charged shell.

As above, in a preferred embodiment of the present invention, inner layer 108, of second aspect element 122 and the corresponding inner layer of third aspect element 132 may comprise any magnetite particles or equivalents such as Bayferrox 8600, 8610; Northern Pigments 604, 608; Magnox 104, TMB-100; Columbian Mapico Black; Pfizer CX6368, and CB5600 and the like. One of skill in the art will appreciate, however, that the respective inner layer may comprise any suitable ferromagnetic, paramagnetic, or superparamagnetic material, such as the superparamagnetic material disclosed in U.S. Pat. No. 5,667,924, hereinabove incorporated by reference.

Likewise, outer layer 109 of second aspect element 122 and the corresponding outer layer of third aspect element 132, in a preferred embodiment, is a polymeric shell containing anionic, cationic, electron accepting or electron donating groups as described in U.S. Pat. No. 4,877,706 or 5,780,190 which are both hereinabove incorporated by reference. Again, one of skill in the art will appreciate that the corresponding outer layer may comprise any number of materials. For example, it is well known that small particles in a dielectric liquid acquire an electrical charge that is related to the Zeta potential of the surface coating, thus the inner layer may comprise any suitable particle with the appropriate magnetic properties as described above, and the outer layer may comprise a coating with a given Zeta potential, where first aspect medium 14 within the respective phoretic ink element is a suitable dielectric liquid. Again, U.S. Pat. No. 5,604,027, hereinabove incorporated by reference, discloses techniques for encapsulating micron-sized elements and dielectric liquid, where the micron-sized elements have coatings that exhibit a Zeta potential when in contact with the dielectric liquid.

Fourth aspect element 140, in a preferred embodiment of the present invention, comprises a conventional electrophoretic aspect element, and may be fabricated by any conventional means known in the art, such as those disclosed in U.S. Pat. No. 5,961,804, hereinabove incorporated by reference. Again, it is well known that small particles in a dielectric liquid acquire an electrical charge that is related to the Zeta potential of the surface coating, thus third aspect element 130 may comprise any suitable microparticle with a coating at a given Zeta potential, where first aspect medium 14 within the respective phoretic ink element is a suitable dielectric liquid.

A first method of fabricating phoretic ink element 156 includes preparing a mixture of 50 mL of a 10 wt % solution of gelatin (type A, 300 bloom, Aldrich, warmed to 50° C.) and 50 mL of a 10 wt % mixture (1:1:1 by weight) of second aspect element 122, third aspect element 132, and fourth aspect element 140 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, all contained in a 600 mL beaker, where the 600 mL beaker is immersed in a 50° C. water bath. The mixture is stirred at 800 RPM with a 3-bladed impeller. After approximately 5 minutes, 210 mL of warm deionized water is added, followed by 50 mL of a 10 wt % solution of gum arabic, also at 50° C. Glacial acetic acid is added dropwise to lower the pH of the suspension from approximately 4.8 to 4.15. A suitable addition comprises approximately 10 drops. After turning the heating bath off, the reaction is allowed to slowly cool to room temperature over several hours' time. Ice is added to the cooling bath to cool the suspension down to 0° C., and 1.0 mL of gluteraldehyde (50% solution) is added. The reaction is then allowed to stir overnight and warm up to room temperature. The next day, stirring is stopped, and a plurality of phoretic ink elements 156, as coacervated capsules, are allowed to rise to the surface, and are skimmed off by any conventional means known in the art.

A second method of fabricating phoretic ink element 156 includes preparing a mixture of 100 mL of a 10 wt % solution of gelatin (type A, 300 bloom, Aldrich, warmed to 62° C.) and 100 mL of warm distilled water in a 600 mL beaker, where the 600 mL beaker is immersed in a 62° C. water bath. The mixture is stirred at 300 RPM for a few minutes and approximately 1 drop of 1-octanol (an antifoaming agent) is added. At this point, the pH is usually in the approximate range 4.5–4.6. Next, a freshly prepared solution of 20% sodium polyphosphate is added. Acetic acid is slowly added by pipette to lower the pH to approximately 4.5. After increasing the stir rate to 900 RPM, a 10 wt % suspension of a mixture (1:1:1 by weight) of second aspect element 122, third aspect element 132, and fourth aspect element 140 in any relatively nonpolar solvent 110 (first aspect medium 14), such as silicon oils, chlorinated hydrocarbons, or hydrocarbon solvents such as ISOPAR (Exxon Mobil Corporation, Irving, Tex.) or equivalents, is added slowly. The mixture is stirred at 800 RPM with a 3-bladed impeller. After tuning the heating bath off, the reaction is allowed to slowly cool to room temperature over several hours' time. Ice is added to the cooling bath to cool the suspension down to 5° C., and 2.5 mL of gluteraldehyde (50% solution) is added. The reaction is then allowed to stir overnight and warm up to room temperature. The next day, stirring is stopped, and the plurality of phoretic ink elements 156, as coacervated capsules, are allowed to rise to the surface, and are skimmed off.

A third method of fabricating phoretic ink element 156 includes preparing capsules as described above in the second fabrication method, with the exception that a further crosslinking treatment is applied as follows. The plurality of phoretic ink elements 156 are skimmed off and rinsed with distilled water. Next, the plurality of phoretic ink elements 156 are dispersed in distilled water. Approximately 100 mL of distilled water is added for every 10 g of wet plurality of phoretic ink elements 156. A freshly prepared 1.4 M solution of 1:1 urea:formaldehyde solution is added to the dispersion (using 1 mL of urea-formaldehyde solution per gram of wet plurality of phoretic ink elements 156). Again, one of skill in the art will appreciate that the crosslinking treatment increases the robustness of the encapsulation structure, but may alter the ability of the structure to transmit the incident electromagnetic energy of interest, as, for example, causing the encapsulation structure to be less transparent.

The exemplary phoretic ink element 156 functions as four-valued phoretic ink. The appropriate applied fields for producing a certain aspect to an appropriately situated observer are depicted in FIGS. 34–37, described below.

Again, the magnetic response of second aspect element 122 and third aspect element 132 is driven by the volume of the magnetic material, while the electrostatic response is driven by the surface charge. Thus, element size may be used to select either second aspect element 122 or third aspect element 132 for migration. This is described in more detail below. Typical values for the radius of second aspect element 122, third aspect element 132 and fourth aspect element 140 include dimensions in the tens of microns down to the tens of nanometers, such as 15 microns, 3 microns, and 30 nanometers, respectively.

V.I. Fourth Embodiment of a Phoretic ink Addressing Method

In a fourth embodiment of a phoretic ink addressing system and method consistent with the present invention, the method of addressing phoretic ink element 156 is given in FIGS. 34–37. The symbol ⊗ indicates an arrow directed into the plane of the figure, and the symbol ⊙ indicates an arrow directed out of the plane of the figure.

Figure 34:
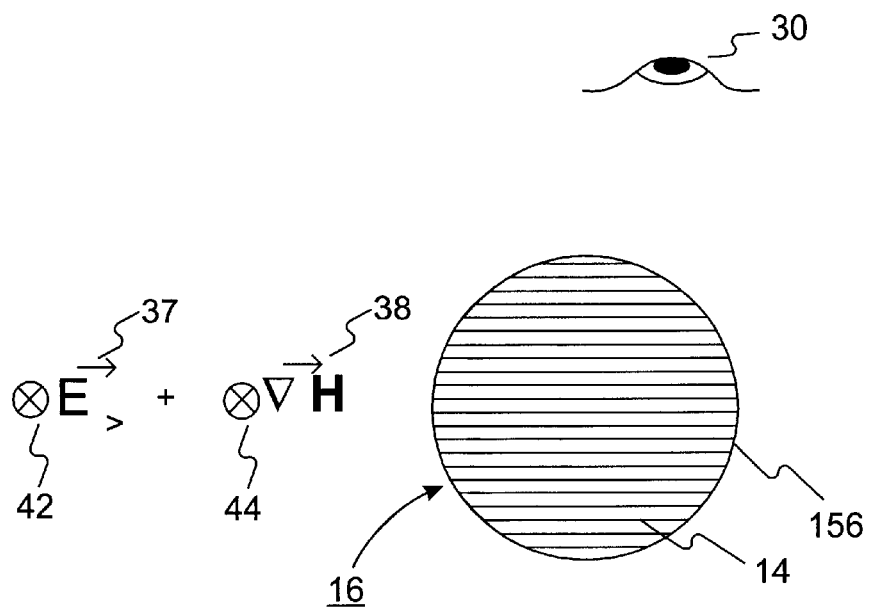
FIG. 34 is a perspective view of first aspect and the addressing electric and magnetic fields of the phoretic ink element of FIG. 33.

In FIG. 34, first aspect 16 is depicted. In order to address phoretic ink element 154 to produce the desired aspect, the appropriately oriented fields are also indicated. Thus, first electric field 37 (with magnitude $E_>$ greater than the magnitude of second electric field 35, $E_<$) is directed into the plane of the figure, indicated by first arrow 42, and gradient magnetic field 38 is also directed into the plane of the figure, as indicated by second arrow 44. The effect of both fields is to cause the second aspect elements 122, third aspect elements 132, and fourth aspect elements 140 to translate away from the portion of phoretic ink element 156 being viewed.

Figure 35:
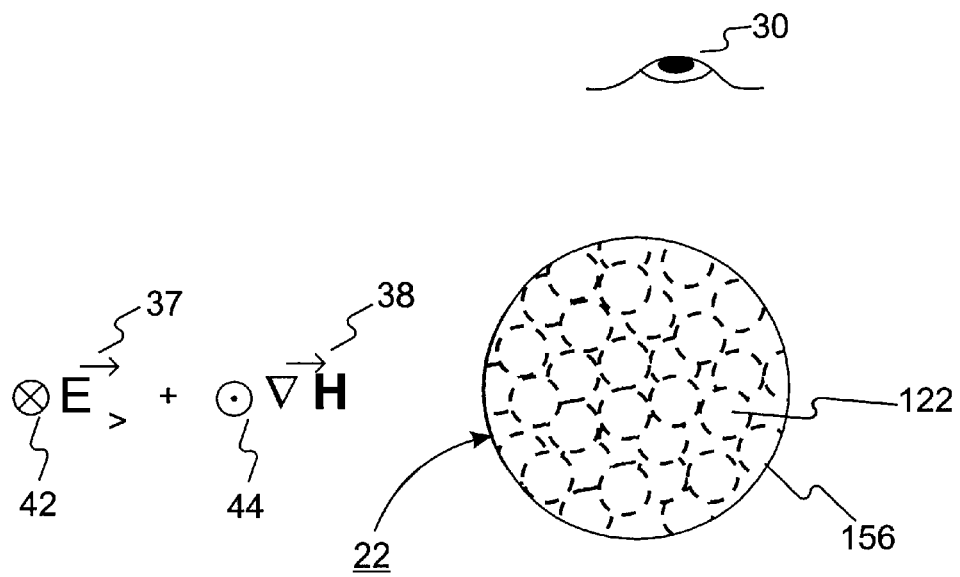
FIG. 35 is a perspective view of second aspect and the addressing electric and magnetic fields of the phoretic ink element of FIG. 33.

In FIG. 35, second aspect 22 is depicted. In order to address phoretic ink element 156 to produce second aspect 22, the appropriately oriented fields are also indicated. Thus, first electric field 37 (with magnitude $E_>$ greater than the magnitude of second electric field 35, $E_<$) is directed into the plane of the figure, indicated by first arrow 42, and gradient magnetic field 38 is directed out of the plane of the figure, as indicated by second arrow 44. The effect of the fields is to cause: the second aspect elements 122 to translate towards the portion of phoretic ink element 156 being viewed; third aspect elements 132 to translate away from the portion of phoretic ink element 156 being viewed; and fourth aspect elements 140 to translate away from the portion of phoretic ink element 156 being viewed.

Figure 36:
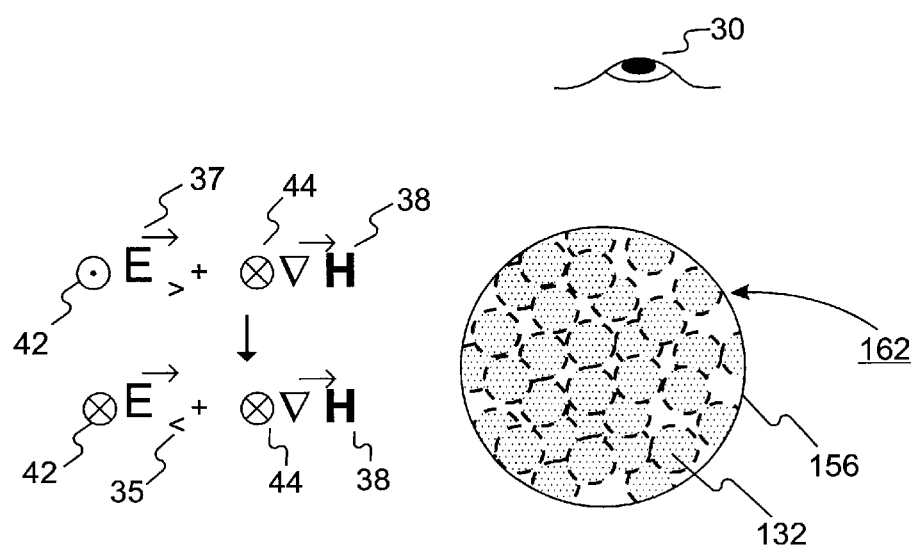
FIG. 36 is a perspective view of third aspect and the addressing electric and magnetic fields of the phoretic ink element of FIG. 33.

In FIG. 36, third aspect 162 is depicted. In order to address phoretic ink element 156 to produce third aspect 162, the appropriately oriented fields are also indicated. Here it is a two-step process, much like the multi-threshold technique discussed earlier. Thus, first electric field 37 (with magnitude $E_>$) is first directed out of the plane of the figure, indicated by first arrow 42, and gradient magnetic field 38 is first directed into the plane of the figure, as indicated by second arrow 44. Secondly, second electric field 35 (with magnitude $E_<$ less than the magnitude of first electric field 37, $E_>$) is directed towards into the plane of the figure, indicated by first arrow 42, and gradient magnetic field 38 is also directed into the plane of the figure, indicated by second arrow 44. The net effect of the fields is to cause: the second aspect elements 122 to translate away from the portion of phoretic ink element 156 being viewed; third aspect elements 132 to translate towards the portion of phoretic ink element 156 being viewed; and fourth aspect elements 140 to translate away from the portion of phoretic ink element 156 being viewed.

Figure 37:
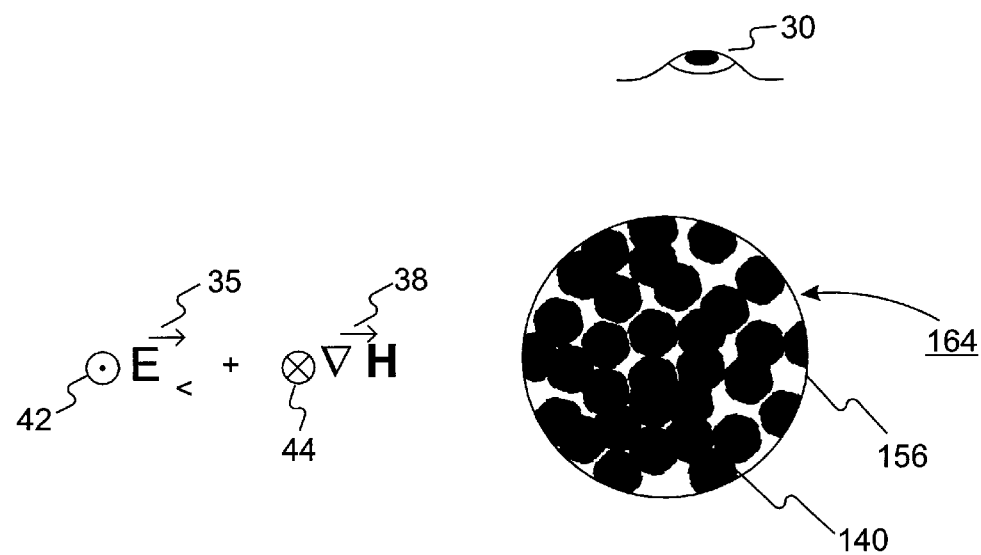
FIG. 37 is a perspective view of fourth aspect and the addressing electric and magnetic fields of the phoretic ink element of FIG. 33.

Finally, in FIG. 37, fourth aspect 164 is depicted. In order to address phoretic ink element 156 to produce fourth aspect 164, the appropriately oriented fields are also indicated. Thus, second electric field 35 (with magnitude $E_<$ less than the magnitude of first electric field 37, $E_>$) is directed out of the plane of the figure, indicated by first arrow 42, and gradient magnetic field 38 is directed into the plane of the figure, as indicated by second arrow 44. The effect of the fields is to cause: the second aspect elements 122 to translate away from the portion of phoretic ink element 156 being viewed; third aspect elements 132 to translate away from the portion of phoretic ink element 156 being viewed; and fourth aspect elements 140 to translate towards the portion of phoretic ink element 156 being viewed.

The method of addressing phoretic ink element 156 consistent with one embodiment of the present invention is summarized in Table 4. In Table 4, the columns are divided according to applied first electric field 37, second electric field 35, or gradient magnetic field 38, and the columns are further subdivided according to whether the orientation of first electric field 37, second electric field 35, or gradient magnetic field 38 is into the plane of the figure, ⊗, or out of the plane of the figure, ⊙. The letter "Y" indicates that an applied field of magnitude or gradient suitable to overcome the appropriate work function is present in that particular orientation, and the letter "N" indicates that an applied field of magnitude or gradient insufficient to overcome the appropriate work function is present in that particular orientation, or that no applied field is present in that orientation. The use of "Y-1st" indicates the first step of a two-step process, and the use of "Y-2nd" indicates the second step of a two-step process. The use of "n/a" implies that an entry in that column is not applicable. An additional column that indicates the number of steps necessary to obtain the desired aspect from a previous different aspect is also indicated.

The row labeled "First Aspect" corresponds to FIG. 34, the row labeled "Second Aspect" corresponds to FIG. 35, the row labeled "Third Aspect" corresponds to FIG. 36, and the row labeled "Fourth Aspect" corresponds to FIG. 37.

TABLE 4

| Aspect at figure plane | ⊙ $\vec{\nabla}$ H | ⊗ $\vec{\nabla}$ H | ⊙ E> | ⊗ E> | ⊙ E< | ⊗ E< | Number of steps |
|---|---|---|---|---|---|---|---|
| First aspect | N | Y | N | Y | N | n/a | 1 |
| Second aspect | Y | N | N | Y | N | n/a | 1 |
| Third aspect | N | Y | Y-1st | N | N | Y-2nd | 2 |

TABLE 4-continued

| Aspect at figure plane | ⊙ ∇⃗ H | ⊗ ∇⃗ H | ⊙ E> | ⊗ E> | ⊙ E< | ⊗ E< | Number of steps |
|---|---|---|---|---|---|---|---|
| Fourth aspect | N | Y | n/a | N | Y | Na | 1 |

Thus, phoretic ink element 156 may be addressed to present a multi-valued aspect in a single step for three of four aspects available.

As above and depicted in FIG. 24, a system for addressing phoretic ink element 156 in one embodiment of the present invention includes applying a plurality of phoretic ink elements 156 dispersed in a binder to a surface, where the binder is preferably capable of being applied to the surface as with a conventional printing process, and that restricts the plurality of phoretic ink elements 156 to positions on the surface. The surface may comprise the surface of conventional paper, or another suitable surface. The surface may then be fed through a microprinter, where the microprinter comprises a feed mechanism for introducing the surface bearing a plurality of phoretic elements 156 to two printheads. Both printheads comprises both magnetic image elements on the top and bottom (for example electromagnets) as well as elements that can be electrostatically charged. The first printhead is correlated with the first step of a two-step addressing process, and may be correlated with the only step of a single step addressing process. Likewise, the second printhead is correlated with the second step of a two-step addressing process, and, again, may be correlated with the only step of a single step addressing process. As the phoretic element is fed through the microprinter, a combination of electrostatic potential and a gradient magnetic field may be used to selectively bring second aspect elements 122, third aspect elements 132, and fourth aspect elements 140 within the plurality of phoretic ink elements 156 to the viewing surface in a two-step addressing process, and so present a selected aspect to observer 30.

Alternatively, one of skill in the art will appreciate that a pixel-driven combination of an array of electromagnets and an array of elements capable of introducing an electric potential across a pixel region may be used to dynamically address such a surface, where the array is located adjacent to and spans a preferred region of the surface. Such an addressing system is well known in the art for selectively introducing electric potentials across a plurality of pixel regions, as in conventional cathode ray tubes, or liquid crystal displays, and can suitably incorporate the two-step addressing process described above.

Further still, one of skill in the art will appreciate that the plurality of phoretic ink elements 156 may be dispersed in a carrier fluid where the carrier fluid is contained between glass or plastic sheets including, again, a pixel-driven combination of an array of electromagnets and an array of elements capable of introducing an electric potential across a pixel region.

Again, such an addressing system is well known in the art for selectively introducing electric potentials across a plurality of pixel regions, as in conventional cathode ray tubes, or liquid crystal displays, and can suitably incorporate the two-step addressing process described above. Again, as mentioned above, one means of achieving discrimination between second aspect elements 122, third aspect elements 132, and fourth aspect elements 140 consistent with the present invention is based solely on the dimensions associated with second aspect elements 122, third aspect elements 132, and fourth aspect elements 140. Specifically, any choice of aspect element geometry whereby the volume of an aspect element scales differently from the surface area of the aspect element will allow for discrimination. For example, in the case where fourth aspect elements 140, third aspect elements 132, and second aspect elements 122 are spheroid and where fourth aspect element 140 is smaller than third aspect element 132, which is smaller than second aspect element 122, then the surface area of second aspect element 122, third aspect element 132, and fourth aspect element 140 scale as diameter to the second power, and the volume of both second aspect element 122 and third aspect element 132 scale as diameter to the third power.

In a preferred embodiment of the present invention, first electric field 37 at a first strength $E_>$ is greater in magnitude than second electric field 35 at a second strength, $E_<$. Thus, for first electric field 37 at a first strength $E_>$, and a gradient magnetic field 38 at a given strength, the effect of first electric field 37 and the surface charge of third aspect element 132 will dominate over the effect of gradient magnetic field 38 and volume of magnetic material in third aspect element 132. On the other hand, the effect of gradient magnetic field 38 and volume of magnetic material in second aspect element 122 will dominate over the effect of the first electric field 37 and surface charge of second aspect element 122. Next, using second electric field 35 at a second strength, $E_<$, the effect of volume of magnetic material and gradient magnetic field 38 will dominate over the effect of second electric field 35 and the surface charge on both second aspect elements 122 and third aspect elements 132. This will allow fourth aspect elements 140 to be addressed based on second electric field 35 at second strength, $E_<$. Such a construction of second aspect elements 122, third aspect elements 132, and fourth aspect elements 140 will allow for the method of addressing discussed above and depicted in FIGS. 34–37.

V.J. Fifth Embodiment of a Phoretic ink System

Figure 38:
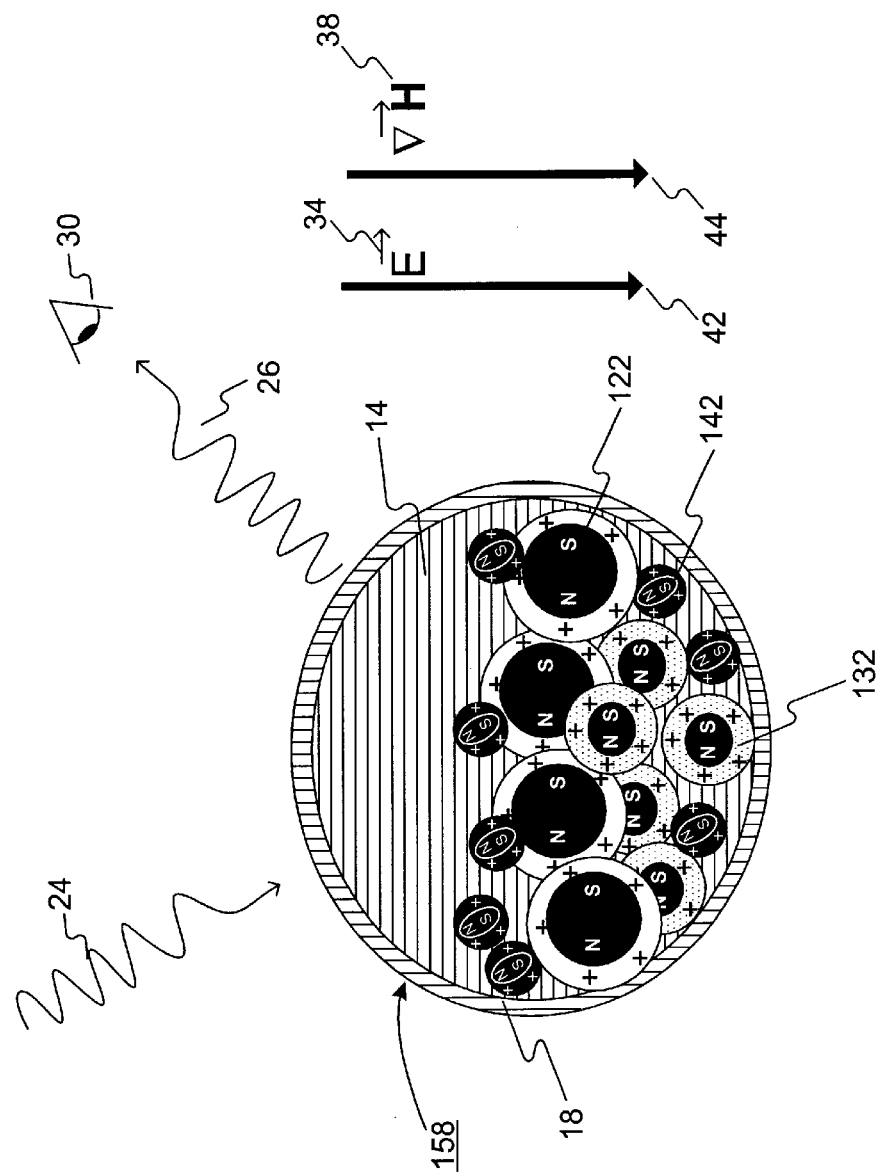
FIG. 38 is a cross section view of a fifth exemplary phoretic ink element consistent with the present invention.

Exemplary phoretic ink element 158, consistent with a fifth embodiment of the present invention, is depicted in FIG. 38. FIG. 38 depicts phoretic ink element 158 as the encapsulated set of first aspect medium 14, second aspect elements 122, third aspect elements 132, and fourth aspect elements 142. The encapsulation structure 18 is chosen so as to be transparent to the incident electromagnetic energy of interest 24 and to the transmitted electromagnetic energy of interest 26. Observer 30 is also depicted. An expanded view of the cross section of second aspect 122 is depicted in FIG. 21. One skilled in the art will appreciate that the structure of third aspect element 132 and fourth aspect element 142 are the same as the structure of second aspect element 122 depicted in FIG. 21. As described above, in FIG. 21, inner layer 108 corresponds to a magnetic core, and outer layer 109 corresponds to a electrostatically charged shell.

As above, in a preferred embodiment of the present invention, inner layer 108, of second aspect element 122, the corresponding inner layer of third aspect element 132, and the corresponding inner layer of fourth aspect element 142 may comprise any magnetite particles or equivalents such as Bayferrox 8600, 8610; Northern Pigments 604, 608; Magnox 104, TMB-100; Columbian Mapico Black; Pfizer CX6368, and CB5600 and the like. One of skill in the art will appreciate, however, that the respective inner layer may comprise any suitable ferromagnetic, paramagnetic, or superparamagnetic material, such as the superparamagnetic material disclosed in U.S. Pat. No. 5,667,924, hereinabove incorporated by reference.

Likewise, outer layer 109 of second aspect element 122, the corresponding outer layer of third aspect element 132, and the corresponding outer layer of fourth aspect element 142, in a preferred embodiment, is a polymeric shell containing anionic, cationic, electron accepting or electron donating groups as described in U.S. Pat. No. 4,877,706 or 5,780,190 which are both hereinabove incorporated by reference. Again, one of skill in the art will appreciate that the corresponding outer layer may comprise any number of materials. For example, it is well known that small particles in a dielectric liquid acquire an electrical charge that is related to the Zeta potential of the surface coating, thus the inner layer may comprise any suitable particle with the appropriate magnetic properties as described above, and the outer layer may comprise a coating with a given Zeta potential, where first aspect medium 14 within the respective phoretic ink element is a suitable dielectric liquid. Again, U.S. Pat. No. 5,604,027, hereinabove incorporated by reference, discloses techniques for encapsulating micron-sized elements and dielectric liquid, where the micron-sized elements have coatings that exhibit a Zeta potential when in contact with the dielectric liquid.

A first method of fabricating phoretic ink element 158 includes preparing a mixture of 50 mL of a 10 wt % solution of gelatin (type A, 300 bloom, Aldrich, warmed to 50° C.) and 50 mL of a 10 wt % mixture (1:1:1 by weight) of second aspect element 122, third aspect element 132, and fourth aspect elements 142 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, all contained in a 600 mL beaker, where the 600 mL beaker is immersed in a 50° C. water bath. The mixture is stirred at 800 RPM with a 3-bladed impeller. After approximately 5 minutes, 210 mL of warm deionized water is added, followed by 50 mL of a 10 wt % solution of gum arabic, also at 50° C. Glacial acetic acid is added dropwise to lower the pH of the suspension from approximately 4.8 to 4.15. A suitable addition comprises approximately 10 drops. After turning the heating bath off, the reaction is allowed to slowly cool to room temperature over several hours' time. Ice is added to the cooling bath to cool the suspension down to 0° C., and 1.0 mL of gluteraldehyde (50% solution) is added. The reaction is then allowed to stir overnight and warm up to room temperature. The next day, stirring is stopped, and a plurality of phoretic ink elements 158, as coacervated capsules, are allowed to rise to the surface, and are skimmed off by any conventional means known in the art.

A second method of fabricating phoretic ink element 158 includes preparing a mixture of 100 mL of a 10 wt % solution of gelatin (type A, 300 bloom, Aldrich, warmed to 62° C.) and 100 mL of warm distilled water in a 600 mL beaker, where the 600 mL beaker is immersed in a 62° C. water bath. The mixture is stirred at 300 RPM for a few minutes and approximately 1 drop of 1-octanol (an antifoaming agent) is added. At this point, the pH is usually in the approximate range 4.5–4.6. Next, a freshly prepared solution of 20% sodium polyphosphate is added. Acetic acid is slowly added by pipette to lower the pH to approximately 4.5. After increasing the stir rate to 900 RPM, a 10 wt % suspension of a mixture (1:1:1 by weight) of second aspect element 122, third aspect element 132, and fourth aspect element 142 in any relatively nonpolar solvent (first aspect medium 14), such as silicon oils, chlorinated hydrocarbons, or hydrocarbon solvents such as ISOPAR (Exxon Mobil Corporation, Irving, Tex.) or equivalents, is added slowly. The mixture is stirred at 800 RPM with a 3-bladed impeller. After turning the heating bath off, the reaction is allowed to slowly cool to room temperature over several hours' time. Ice is added to the cooling bath to cool the suspension down to 5° C., and 2.5 mL of gluteraldehyde (50% solution) is added. The reaction is then allowed to stir overnight and warm up to room temperature. The next day, stirring is stopped, and the plurality of phoretic ink elements 158, as coacervated capsules, are allowed to rise to the surface, and are skimmed off.

A third method of fabricating phoretic ink element 158 includes preparing capsules as described above in the second fabrication method, with the exception that a further crosslinking treatment is applied as follows. The plurality of phoretic ink elements 158 are skimmed off and rinsed with distilled water. Next, the plurality of phoretic ink elements 158 are dispersed in distilled water. Approximately 100 mL of distilled water is added for every 10 g of wet plurality of phoretic ink elements 158. A freshly prepared 1.4 M solution of 1:1 urea:formaldehyde solution is added to the dispersion (using 1 mL of urea-formaldehyde solution per gram of wet plurality of phoretic ink elements 158). Again, one of skill in the art will appreciate that the crosslinking treatment increases the robustness of the encapsulation structure, but may alter the ability of the structure to transmit the incident electromagnetic energy of interest, as, for example, causing the encapsulation structure to be less transparent.

The exemplary phoretic ink element 158 functions as four-valued phoretic ink. The appropriate applied fields for producing a certain aspect to an appropriately situated observer are depicted in FIGS. 39–42, described below.

Again, the magnetic response of second aspect element 122, third aspect element 132, and fourth aspect element 142 is driven by the volume of the magnetic material, while the electrostatic response is driven by the surface charge. Thus, element size may be used to select either second aspect element 122, third aspect element 132, or fourth aspect element 142 for migration. This is described in more detail below. Typical values for the radius of second aspect element 122, third aspect element 132 and fourth aspect element 142 include dimensions in the tens of microns down to the tens of nanometers, such as 15 microns, 3 microns, and 50 nanometers, respectively.

V.K. Fifth Embodiment of a Phoretic ink Addressing Method

In one embodiment of the present invention, the method of addressing phoretic ink element 158 is given in FIGS. 39–42. The symbol ⊗ indicates an arrow directed into the plane of the figure, and the symbol ⊙ indicates an arrow directed out of the plane of the figure.

Figure 39:
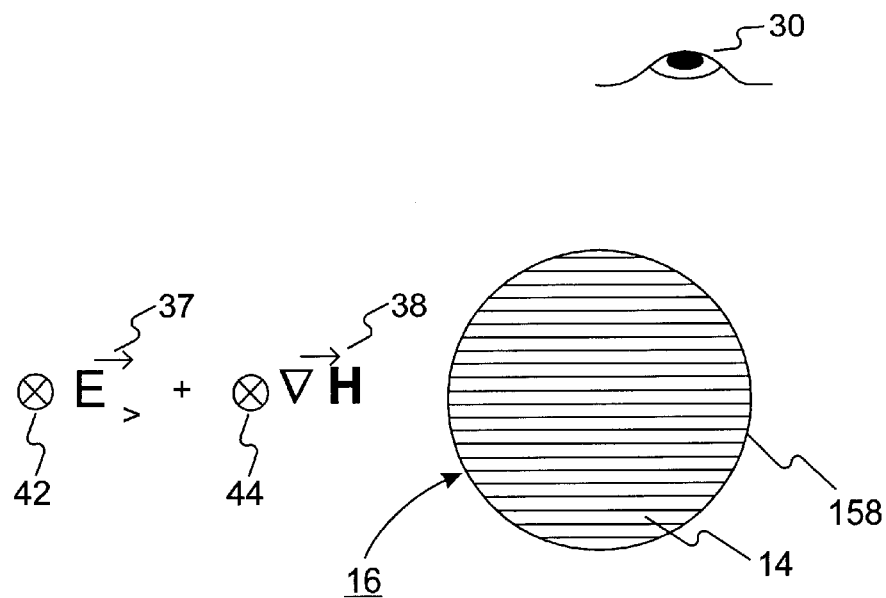
FIG. 39 is a perspective view of first aspect and the addressing electric and magnetic fields of the phoretic ink element of FIG. 38.

In FIG. 39, first aspect 16 is depicted. In order to address phoretic ink element 158 to produce the desired aspect, the appropriately oriented fields are also indicated. Thus, first electric field 37 (with magnitude $E_>$ greater than the magnitude of second electric field 35, $E_<$) is directed into the plane of the figure, indicated by first arrow 42, and gradient magnetic field 38 is also directed into the plane of the figure, as indicated by second arrow 44. The effect of both fields is to cause the second aspect elements 122, third aspect elements 132, and fourth aspect elements 142 to translate away from the portion of phoretic ink element 158 being viewed.

Figure 40:
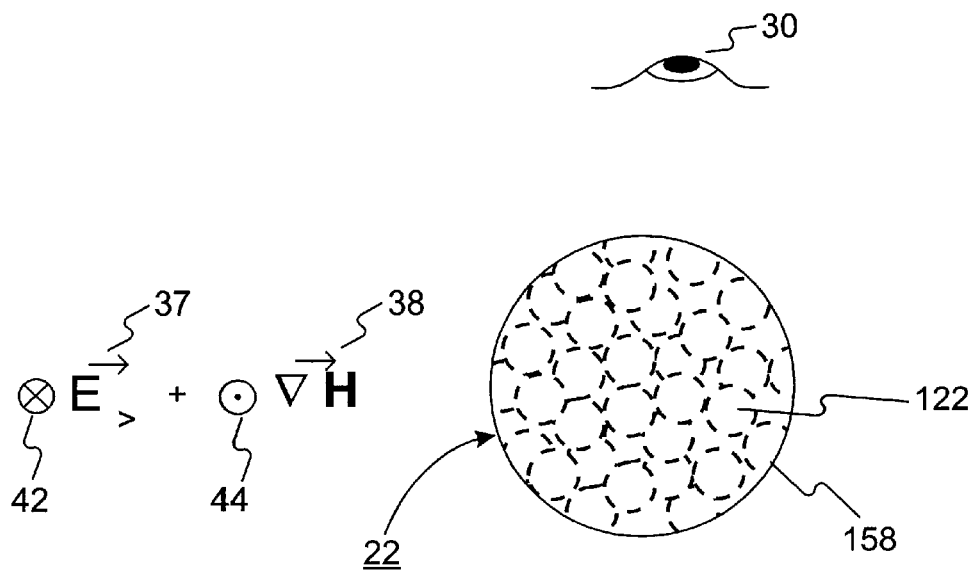
FIG. 40 is a perspective view of second aspect and the addressing electric and magnetic fields of the phoretic ink element of FIG. 38.

In FIG. 40, second aspect 22 is depicted. In order to address phoretic ink element 158 to produce second aspect 22, the appropriately oriented fields are also indicated. Thus, first electric field 37 (with magnitude $E_>$ greater than the magnitude of second electric field 35, $E_<$) is directed into the plane of the figure, indicated by first arrow 42, and gradient magnetic field 38 is directed out of the plane of the figure, as indicated by second arrow 44. The effect of the fields is to cause: the second aspect elements 122 to translate towards the portion of phoretic ink element 158 being viewed; third aspect elements 132 to translate away from the portion of phoretic ink element 158 being viewed; and fourth aspect elements 142 to translate away from the portion of phoretic ink element 158 being viewed.

Figure 41:
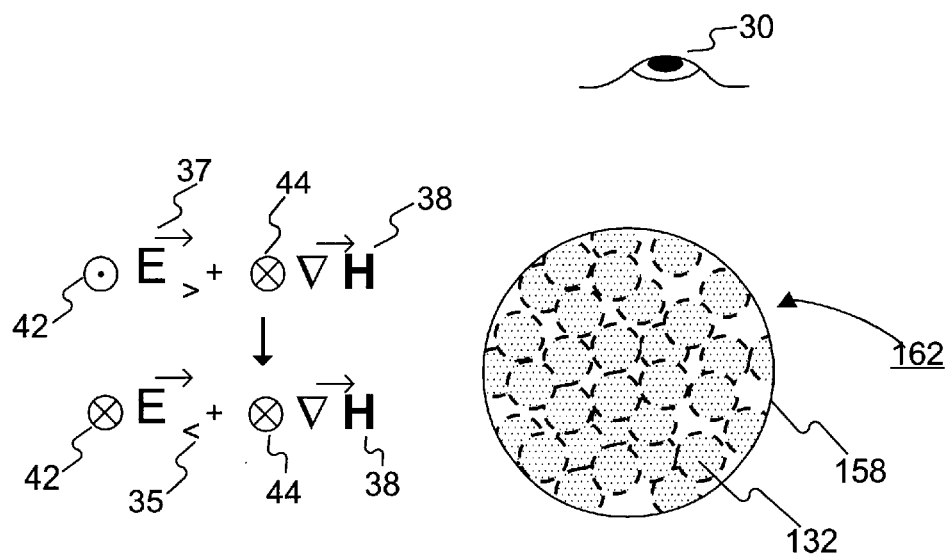
FIG. 41 is a perspective view of third aspect and the addressing electric and magnetic fields of the phoretic ink element of FIG. 38.

In FIG. 41, third aspect 162 is depicted. In order to address phoretic ink element 158 to 10 produce third aspect 162, the appropriately oriented fields are also indicated. Here it is a two-step process, much like the multi-threshold technique discussed earlier. Thus, first electric field 37 (with magnitude $E_>$) is first directed out of the plane of the figure, indicated by first arrow 42, and gradient magnetic field 38 is first directed into the plane of the figure, as indicated by second arrow 44. Secondly, second electric field 35 (with magnitude $E_<$ less than the magnitude of first electric field 37, $E_>$) is directed into the plane of the figure, as indicated by first arrow 42, and gradient magnetic field 38 is also directed into the plane of the figure, as indicated by arrow 44. The net effect of the fields is to cause: the second aspect elements 122 to translate away from the portion of phoretic ink element 158 being viewed; third aspect elements 132 to translate towards the portion of phoretic ink element 158 being viewed; and fourth aspect elements 142 to translate away from the portion of phoretic ink element 158 being viewed.

Figure 42:
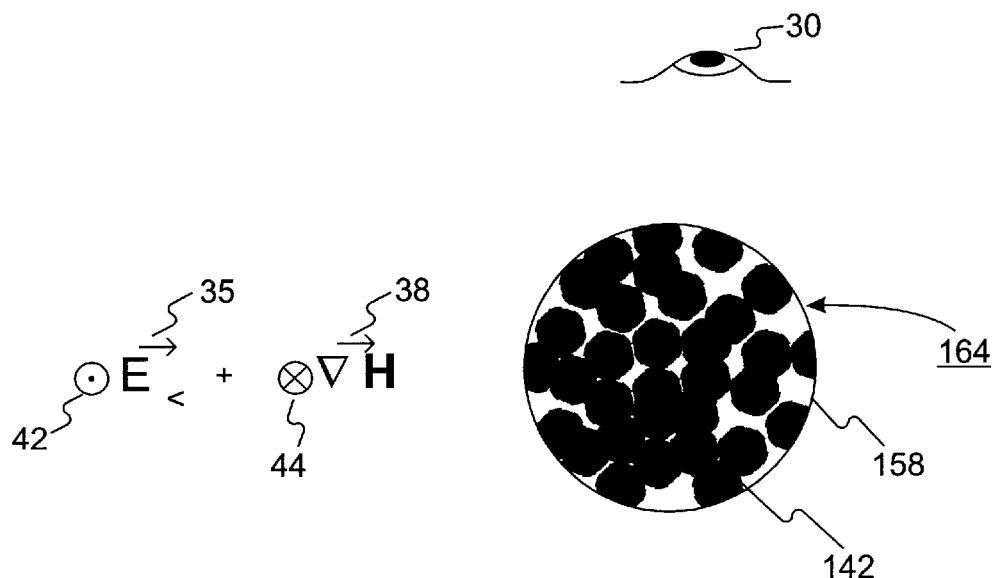
FIG. 42 is a perspective view of fourth aspect and the addressing electric and magnetic fields of the phoretic ink element of FIG. 38.

Finally, in FIG. 42, fourth aspect 164 is depicted. In order to address phoretic ink element 158 to produce fourth aspect 164, the appropriately oriented fields are also indicated. Thus, second electric field 35 (with magnitude $E_<$ less than the magnitude of first electric field 37, $E_>$) is directed out of the plane of the figure, indicated by first arrow 42, and gradient magnetic field 38 is directed into the plane of the figure, as indicated by second arrow 44. The effect of the fields is to cause: the second aspect elements 122 to translate away from the portion of phoretic ink element 158 being viewed; third aspect elements 132 to translate away from the portion of phoretic ink element 158 being viewed; and fourth aspect elements 142 to translate towards the portion of phoretic ink element 158 being viewed.

The method of addressing phoretic ink element 158 consistent with one embodiment of the present invention is summarized in Table 5. In Table 5, the columns are divided according to applied first electric field 37, second electric field 35, or gradient magnetic field 38, and the columns are further subdivided according to whether the orientation of first electric field 37, second electric field 35, or gradient magnetic field 38 is into the plane of the figure, ⊗, or out of the plane of the figure, ⊙. The letter "Y" indicates that an applied field of magnitude or gradient suitable to overcome the appropriate work function is present in that particular orientation, and the letter "N" indicates that that an applied field of magnitude or gradient insufficient to overcome the appropriate work function is present in that particular orientation, or that no applied field is present in that orientation. The use of "Y-1st" indicates the first step of a two-step process, and the use of "Y-2nd" indicates the second step of a two-step process. The use of "n/a" implies that an entry in that column is not applicable. An additional column that indicates the number of steps necessary to obtain the desired aspect from a previous different aspect is also indicated. The row labeled "First Aspect" corresponds to FIG. 39, the row labeled "Second Aspect" corresponds to FIG. 40, the row labeled "Third Aspect" corresponds to FIG. 41, and the row labeled "Fourth Aspect" corresponds to FIG. 42.

TABLE 5

| Aspect at figure plane | ⊙$\vec{\nabla}$H | ⊗$\vec{\nabla}$H | ⊙E> | ⊗E> | ⊙E< | ⊗E< | Number of steps |
|---|---|---|---|---|---|---|---|
| First aspect | N | Y | N | Y | N | n/a | 1 |
| Second aspect | Y | N | N | Y | N | n/a | 1 |
| Third aspect | N | Y | Y-1st | N | N | Y-2$^{nd}$ | 2 |
| Fourth aspect | N | Y | n/a | N | Y | Na | 1 |

Thus, phoretic ink element 158 may be addressed to present a multi-valued aspect in a single step for three of four aspects available.

As above and depicted in FIG. 24, a system for addressing phoretic ink element 158 in one embodiment of the present invention includes applying a plurality of phoretic ink elements 158 dispersed in a binder to a surface, where the binder is preferably capable of being applied to the surface as with a conventional printing process, and that restricts the plurality of phoretic ink elements 158 to positions on the surface. The surface may comprise the surface of conventional paper, or another suitable surface. The surface may then be fed through a microprinter, where the microprinter comprises a feed mechanism for introducing the surface bearing a plurality of phoretic elements 158 to two printheads. Both printheads comprises both magnetic image elements on the top and bottom (for example electromagnets) as well as elements that can be electrostatically charged. The first printhead is correlated with the first step of a two-step addressing process, and may be correlated with the only step of a single step addressing process. Likewise, the second printhead is correlated with the second step of a two-step addressing process, and, again, may be correlated with the only step of a single step addressing process. As the phoretic element is fed through the microprinter, a combination of electrostatic potential and a gradient magnetic field may be used to selectively bring second aspect elements 122, third aspect elements 132; and fourth aspect elements 142 within the plurality of phoretic ink elements 158 to the viewing surface in a two-step addressing process, and so present a selected aspect to observer 30.

Alternatively, one of skill in the art will appreciate that a pixel-driven combination of an array of electromagnets and an array of elements capable of introducing an electric potential across a pixel region may be used to dynamically address such a surface, where the array is located adjacent to and spans a preferred region of the surface. Such an addressing system is well known in the art for selectively introducing electric potentials across a plurality of pixel regions, as in conventional cathode ray tubes, or liquid crystal displays, and can suitably incorporate the two-step addressing process described above.

Further still, one of skill in the art will appreciate that the plurality of phoretic ink elements 158 may be dispersed in a carrier fluid where the carrier fluid is contained between glass or plastic sheets including, again, a pixel-driven combination of an array of electromagnets and an array of elements capable of introducing an electric potential across a pixel region. Again, such an addressing system is well known in the art for selectively introducing electric potentials across a plurality of pixel regions, as in conventional cathode ray tubes, or liquid crystal displays, and can suitably incorporate the two-step addressing process described above.

Again, and as mentioned above, one means of achieving discrimination between second aspect elements 122, third aspect elements 132, and fourth aspect elements 142 consistent with the present invention is based solely on the dimensions associated with second aspect elements 122, third aspect elements 132, and fourth aspect elements 142. Specifically, any choice of aspect element geometry whereby the volume of an aspect element in relation scales differently from the surface area of the aspect element will allow for discrimination. For example, in the case where fourth aspect elements 142, third aspect elements 132, and second aspect elements 122 are spheroid and where fourth aspect element 142 is smaller than third aspect element 132, which is smaller than second aspect element 122, then the surface area of second aspect element 122, third aspect element 132, and fourth aspect element 142 scale as diameter to the second power and the volume of second aspect element 122, third aspect element 132, and fourth aspect element 142 scale as diameter to the third power.

In a preferred embodiment of the present invention, first electric field 37 at a first strength $E_>$ is greater in magnitude than second electric field 35 at a second strength, $E_<$. Thus, for first electric field 37 at a first strength, $E_>$, and gradient magnetic field 38 at a given strength, the effect of first electric field 37 and the surface charge of third aspect element 132 will dominate over the effect of gradient magnetic field 38 and volume of magnetic material in third aspect element 132. On the other hand, the effect of gradient magnetic field 38 and volume of magnetic material in second aspect element 122 and first electric field 37 will dominate over the effect of first electric field 37 and surface charge of second aspect element 122. Finally, at second electric field 35 at second strength, $E_<$, the effect of volume of magnetic material and gradient magnetic field 38 will dominate over the effect of second electric field and the surface charge on both second aspect elements 122 and third aspect elements 132. This will allow fourth aspect elements 142 to be addressed based on second electric field 35 at second strength, $E_<$. Such a construction of second aspect elements 122, third aspect elements 132, and fourth aspect elements 142 will allow for the method of addressing discussed above and depicted in FIGS. 39–42.

V.L. Conclusion

Methods and apparatus consistent with the present invention prepare electromagnetophoretic ink for use as electronic and magnetic display elements. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. Furthermore, the methods for fabricating the phoretic ink elements recited pH concentrations and temperatures. However, one of skill in the art will appreciate that the recited concentration and temperatures correspond to phase separation points, and hence different pH concentrations and different temperatures may be utilized to achieve the same result without departing from the scope of the invention. Furthermore, the methods for fabricating the phoretic ink elements recited relative mixtures of "1:1 by weight" and "1:1:1 by weight." However, one of skill in the art will appreciate that such combinations may be altered according to a preferred ratio of relative aspects, so as to achieve a richer hue of a preferred aspect. Further still, the method for fabricating and addressing the phoretic ink elements took advantage of the dipole nature of the magnetic field interaction and the monopole nature of the electric field interaction. However, one of skill in the art will appreciate that the gradient field may be the same field as the vector field, and comprise an electric field. This may be accomplished since the vector properties of a field may be separate from the gradient properties of the field, and accordingly act on a charge dipole present in the aspect element. Accordingly, the invention is not limited to the above described embodiments, but instead is defined by the appended claims in light of their full scope of equivalents.

What is claimed is:

1. An electromagnetophoretic ink material comprising an encapsulating structure;

a first aspect medium within said encapsulating structure, and a plurality of second aspect elements within said encapsulating structure;

wherein each of said plurality of second aspect elements is configured to translationally displace within said encapsulating structure under the influence of an applied gradient field, and wherein each of said plurality of second aspect elements is further configured to translationally displace within said encapsulating structure under the influence of an applied vector field.

2. The electromagnetophoretic ink material of claim 1, further comprising a plurality of third aspect elements within said encapsulating structure;

wherein each of said plurality of third aspect elements is configured to translationally displace within said encapsulating structure under the influence of said applied vector field.

3. The electromagnetophoretic ink material of claim 2, wherein each of said plurality of third aspect elements is further configured to translationally displace within said encapsulating structure under the influence of said applied gradient field.

4. The electromagnetophoretic ink material of claim 3, further comprising a plurality of fourth aspect elements within said encapsulating structure;

wherein each of said plurality of fourth aspect elements is configured to translationally displace within said encapsulating structure under the influence of said applied vector field.

5. The electromagnetophoretic ink material of claim 4, wherein said each of said plurality of fourth aspect elements is further configured to translationally displace within said encapsulating structure under the influence of said applied gradient field.

6. The electromagnetophoretic ink material of claim 5, wherein said each of said plurality of second aspect elements comprises a second aspect inner layer, and a second aspect outer layer, and wherein said each of said plurality of third aspect elements comprises a third aspect inner layer, and a third aspect outer layer, and wherein said each of said plurality of fourth aspect elements comprises a fourth aspect inner layer, and a fourth aspect outer layer.

7. The electromagnetophoretic ink material of claim 6, wherein each of said plurality of second aspect elements has more volume than each of said plurality of third aspect elements, and wherein each of said plurality of third aspect elements has more volume than each of said plurality of fourth aspect elements.

8. The electromagnetophoretic ink material of claim 6, wherein said second aspect inner layer is selected from the group consisting of magnetite particles, ferromagnetic particles, paramagnetic particles, and superparamagnetic particles;

said third aspect inner layer is selected from the group consisting of magnetite particles, ferromagnetic particles, paramagnetic particles, and superparamagnetic particles; and said fourth aspect inner layer is selected from the group consisting of magnetite particles, ferromagnetic particles, paramagnetic particles, and superparamagnetic particles.

9. The electromagnetophoretic ink material of claim 8, wherein said second aspect outer layer, said third aspect outer layer, and said fourth aspect outer layer comprises a polymeric shell containing material, where said material is selected from the group consisting of anionic, cationic, electron accepting, and electron donating groups.

10. The electromagnetophoretic ink material of claim 8, wherein said second aspect outer layer comprises a first coating with a Zeta potential, said third aspect outer layer comprises a second coating with a Zeta potential, said fourth aspect outer layer comprises a third coating with a Zeta potential, and said first aspect medium comprises a dielectric liquid, wherein said first coating acquires an electrostatic charge when in contact with said dielectric liquid, wherein said second coating acquires an electrostatic charge when in contact with said dielectric liquid, and wherein said third coating acquires an electrostatic charge when in contact with said dielectric liquid.

11. The electromagnetophoretic ink material of claim 1, wherein said gradient field is a magnetic field.

12. The electromagnetophoretic ink material of claim 1, wherein said vector field is an electric field.

13. A display system comprising a plurality of electromagnetophoretic ink material of claim 1, supporting material, and an addressing system, wherein said plurality of electromagnetophoretic ink material are bounded by said supporting material, and wherein said addressing system is configured to introduce a first vector field and a first gradient field to a subset of said plurality of electromagnetophoretic ink material.

14. A method of addressing electromagnetophoretic ink material to present an aspect, said method comprising introducing a vector field to said electromagnetophoretic ink material in a first direction, and introducing a gradient field to said electromagnetophoretic ink material in said first direction.

15. A method of addressing electromagnetophoretic ink material to present an aspect, said method comprising introducing a vector field to said electromagnetophoretic ink material in a first direction, and introducing a gradient field to said electromagnetophoretic ink material in a second direction, wherein said second direction is antiparallel to said first direction.

16. A method of addressing electromagnetophoretic ink material to present an aspect, said method comprising introducing a first vector field to said electromagnetophoretic ink material in a first direction, introducing a gradient field to said electromagnetophoretic ink material in said second direction, and then introducing a second vector field to said electromagnetophoretic ink material in said second direction, wherein said second direction is antiparallel to said first direction, and wherein the magnitude of said second vector field is less than the magnitude of said first vector field.

17. The method of claim 15, wherein said vector field is an electric field.

18. The method of claim 15, wherein said gradient field is a magnetic field.

19. The method of claim 16, wherein said first vector field is an electric field, and wherein said second vector field is an electric field.

20. The method of claim 16, wherein said gradient field is a magnetic field.

* * * * *